US012283184B2

(12) United States Patent
Wiegel et al.

(10) Patent No.: US 12,283,184 B2
(45) Date of Patent: Apr. 22, 2025

(54) TRAFFIC ALERT DEVICES AND METHODS OF USING THE SAME

(71) Applicant: Rite-Hite Holding Corporation, Milwaukee, WI (US)

(72) Inventors: Aaron J. Wiegel, Benton, WI (US); David Swift, Dubuque, IA (US); Garret Wernecke, Coeur d'Alene, ID (US); Jason Dondlinger, Bellevue, IA (US); Joe Korman, Dubuque, IA (US); Lucas I. Paruch, Dubuque, IA (US); Matthew R. Dwyer, Dubuque, IA (US); Tony Duesing, Bellevue, IA (US); John Lightbody, Dubuque, IA (US); Emily C. Runbeck, Fox Point, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 391 days.

(21) Appl. No.: 17/513,772

(22) Filed: Oct. 28, 2021

(65) Prior Publication Data

US 2022/0130241 A1 Apr. 28, 2022

Related U.S. Application Data

(60) Provisional application No. 63/106,708, filed on Oct. 28, 2020.

(51) Int. Cl.

| | |
|---|---|
| ***G08G 1/07*** | (2006.01) |
| ***G09F 13/00*** | (2006.01) |
| ***G09F 13/04*** | (2006.01) |

(52) U.S. Cl.

CPC ............. *G08G 1/07* (2013.01); *G09F 13/005* (2013.01); *G09F 13/0404* (2013.01); *G09F 13/0413* (2013.01)

(58) Field of Classification Search

CPC ........ G08G 1/07; G08G 1/095; G09F 13/005; G09F 13/0404; G09F 13/0413

See application file for complete search history.

(56) References Cited

U.S. PATENT DOCUMENTS

| | | |
|---|---|---|
| 3,178,568 A | 4/1965 | Hendershot |
| D236,191 S | 8/1975 | Dowding |

(Continued)

FOREIGN PATENT DOCUMENTS

| | | |
|---|---|---|
| CN | 101019160 | 8/2007 |
| CN | 202632531 | 12/2012 |

(Continued)

OTHER PUBLICATIONS

Japanese Patent Office, "Notice of Reasons for Rejection" issued in connection with Japanese patent application No. 2018-542124 issued on Aug. 6, 2019, 6 pages.

(Continued)

*Primary Examiner* — Daryl C Pope

(74) *Attorney, Agent, or Firm* — Hanley, Flight & Zimmerman, LLC

(57) ABSTRACT

Traffic alert devices and methods of using the same are disclosed. A traffic alert device includes a housing having a first surface to face in a first direction toward a first area, and a directional motion sensor carried by the housing. The sensor monitors motion in a second area different than the first area, the second area being in a second direction angled relative to the first direction. The traffic alert device further includes a light emitter carried by the housing, the light emitter positioned to emit light that emanates from the first surface. The light emitter generates a visual signal in response to the sensor detecting an object in the second area approaching the sensor.

17 Claims, 24 Drawing Sheets

(56) References Cited

U.S. PATENT DOCUMENTS

| | | | |
|---|---|---|---|
| D256,898 S | 9/1980 | Barr | |
| 4,746,910 A | 5/1988 | Pfister et al. | |
| D304,019 S | 10/1989 | Carsello | |
| 4,928,101 A | 5/1990 | Favors | |
| 5,461,231 A | 10/1995 | Sugimoto et al. | |
| D365,091 S | 12/1995 | Hofmann-Igl | |
| 5,572,202 A | 11/1996 | Regel et al. | |
| D377,004 S | 12/1996 | Timms | |
| 6,005,491 A | 12/1999 | Kopchak et al. | |
| 6,307,484 B1 | 10/2001 | Sasaki et al. | |
| 6,762,689 B2 | 7/2004 | Dechape | |
| 6,784,800 B2 | 8/2004 | Orzechowski | |
| D524,834 S | 7/2006 | Dozier et al. | |
| D559,423 S | 1/2008 | Hochendoner | |
| 7,408,479 B2 | 8/2008 | Johnson | |
| 8,006,811 B2 | 8/2011 | Anderson et al. | |
| D764,460 S | 8/2016 | Veja et al. | |
| D805,236 S | 12/2017 | Exley | |
| 9,896,282 B2 | 2/2018 | Boston et al. | |
| D813,868 S | 3/2018 | Jou et al. | |
| 10,055,986 B2 | 8/2018 | Paruch et al. | |
| D836,474 S | 12/2018 | Cannell et al. | |
| D846,174 S | 4/2019 | Yu | |
| 10,276,042 B2 | 4/2019 | Paruch et al. | |
| D876,264 S | 2/2020 | Van Landingham, Jr. et al. | |
| 10,665,098 B2 | 5/2020 | Paruch et al. | |
| D890,049 S | 7/2020 | Zhang | |
| D938,638 S | 12/2021 | Chen | |
| D945,677 S | 3/2022 | Xiao | |
| D952,538 S | 5/2022 | Sparks | |
| 11,355,010 B2 | 6/2022 | Paruch et al. | |
| D970,374 S | 11/2022 | Paruch et al. | |
| 2002/0190849 A1 | 12/2002 | Orzechowski | |
| 2005/0151670 A1 | 7/2005 | Johnson | |
| 2005/0280553 A1 | 12/2005 | DiPiazza | |
| 2006/0137261 A1 | 6/2006 | Maly | |
| 2006/0146520 A1 | 7/2006 | Vitense et al. | |
| 2007/0229308 A1 | 10/2007 | Stalp et al. | |
| 2007/0276600 A1 | 11/2007 | King et al. | |
| 2009/0256721 A1 | 10/2009 | Glatfelter | |
| 2009/0278465 A1 | 11/2009 | Farmer et al. | |
| 2010/0283631 A1 | 11/2010 | Bryant | |
| 2010/0288321 A1 | 11/2010 | Dwyer | |
| 2011/0199231 A1 | 8/2011 | Loiselle et al. | |
| 2011/0260846 A1 | 10/2011 | Mochizuki et al. | |
| 2011/0260888 A1 | 10/2011 | Fossier et al. | |
| 2012/0025964 A1* | 2/2012 | Beggs | G08G 1/166 340/435 |
| 2013/0063282 A1 | 3/2013 | Baldwin et al. | |
| 2013/0253816 A1 | 9/2013 | Caminiti et al. | |
| 2013/0257607 A1 | 10/2013 | Rigby et al. | |
| 2014/0118553 A1 | 5/2014 | Diba | |
| 2014/0177228 A1 | 6/2014 | Ellingson et al. | |
| 2014/0309789 A1 | 10/2014 | Ricci | |
| 2015/0153016 A1 | 6/2015 | Lee | |
| 2015/0154863 A1 | 6/2015 | Fossier et al. | |
| 2015/0294569 A1* | 10/2015 | Ryan | G01R 33/10 340/909 |
| 2017/0124867 A1 | 5/2017 | Paruch et al. | |
| 2018/0247531 A1 | 8/2018 | Paruch et al. | |
| 2019/0251839 A1 | 8/2019 | Paruch et al. | |
| 2020/0191327 A1 | 6/2020 | Goeders | |
| 2020/0286375 A1 | 9/2020 | Paruch et al. | |
| 2022/0130241 A1 | 4/2022 | Wiegel et al. | |

FOREIGN PATENT DOCUMENTS

| | | |
|---|---|---|
| CN | 204066387 | 12/2014 |
| CN | 104851304 | 8/2015 |
| CN | 307291782 | 4/2022 |
| EP | 1775692 | 4/2007 |
| GB | 2119987 | 11/1983 |
| JP | H07105500 | 4/1995 |
| JP | H07127022 | 5/1995 |
| JP | 2003016596 | 1/2003 |
| JP | 2011175560 | 9/2011 |
| JP | 2013016039 | 1/2013 |
| KR | 20130066389 | 6/2013 |
| WO | 2005020180 | 3/2005 |

OTHER PUBLICATIONS

International Searching Authority, "Invitation to Pay Additional Fees and, Where Applicable, Protest Fee," issued in connection with PCT application No. PCT/US2016/050565, issued on Dec. 12, 2016, 8 pages.
Collision Awareness, "Look Out—Leaders of Intersection Protection," Brochure, 12 pages.
Shurestar, "Traffic Caution Systems," 2015, [http://shurestar.com/traffice-caution-systems/], retrieved on Sep. 28, 2015, 2 pages.
Zone Safe, "Walkway Alert Pedestrian Warning System," retrieved from [https://www.zonesafe.net/proximity-warning-system-applications/walkway-alert-system/] on May 31, 2018, 2 pages.
Hit-Not, "Hit-Not Proximity Detection Parts Catalog," retrieved from [https://hitnot.com/wp-content/uploads/2016/08/Parts-CatalogCurrent2-11-16.pdf] on May 31, 2018, 21 pages, 2016.
Cisco-Eagle, "AisleAlert Forklift Safety Warning Systems," retrieved from [http://www.cisco-eagle.com/catalog/category/9174/aislealert-traffic-floor-light-systems] on May 31, 2018, 8 pages.
Save-ty, "Save'ty Yellow Products," retrieved from [https://safety-products.save-ty.com/category/roducts-collision-awareness-look-outs-look-out-3-4], on May 31, 2018, 3 pages, 2017.
Sky-Trax, "Fork Alert," retrieved from [http://www.totaltraxinc.com/attachments/article/35/forkalertspecs.pdf] on May 31, 2018, 2 pages.
Tapco, "Forklift Traffic Warning System," retrieved from [https://www.tapconet.com/solar-led-division/industrial-forklift-traffic-blinkersign/] on May 31, 2018, 2 pages.
Sentry Protection Products, "Collision Sentry Always on Guard," retrieved from [http://www.sentrypro.com/pages/support_files/2013-CollisionSentry_Brochure.pdf] on May 31, 2018, 4 pages, 2013.
Crossing Guard, "Crossing Guard Forklift Collision Alert System," retrieved from [http://crossingguardsafety.com/2012-02-24-17-41-10/finish/1-click-for-crossing-guard-pdf-files/2-crossing-guard-4-page-brochure/0.html] on May 31, 2018, 4 pages.
Canadian Intellectual Property Office, "Examination Report," issued in connection with Canadian Application No. 3,004,289, mailed on Feb. 14, 2019, 4 pages.
European Patent Office, "Invitation Pursuant to Rule 137(4) EPC and Article 94(3) EPC)," issued in connection with European Application No. 16767113.0, mailed on Feb. 11, 2019, 3 pages.
Canadian Intellectual Property Office, "Examination Search Report," issued in connection with Canadian Application No. 3,004,289, mailed on Jan. 30, 2020, 4 pages.
Korean Intellectual Property Office, "Notice of Preliminary Rejection" issued in connection with Korean patent application No. 10-2018-7015513 issued on Oct. 21, 2019, 10 pages.
European Patent Office, "Communication Pursuant to Rule 94(3) EPC," issued in connection with European Application No. 16767113.0, mailed on Nov. 18, 2019, 6 pages.
International Searching Authority, "Notification of Transmittal of the International Search Report and the Written Opinion of the International Search Authority, or the Declaration," issued in connection with PCT application No. PCT/US2016/050565, issued on Feb. 2, 2017, 20 pages.
United States Patent and Trademark Office, "Non-Final Office Action," issued in connection with U.S. Appl. No. 16/397,806, issued on Sep. 18, 2019, 17 pages.
United States Patent and Trademark Office, "Notice of Allowance and Fee(s) Due," issued in connection with U.S. Appl. No. 16/397,806, issued on September Jan. 12, 2020, 48 pages.
National Intellectual Property Administration of the People's Republic of China, "Notification of the First Office Action," issued in connection with Chinese Patent Application No. 201680075930.0, issued on Sep. 8, 2020.

(56) References Cited

OTHER PUBLICATIONS

Korean Intellectual Property Office, "Notice of Final Rejection," issued in connection with Korean Patent Application No. 10-2018-7015513, issued on Apr. 23, 2020, 8 pages.
Japanese Patent Office, "Notice of Allowance," issued in connection with Japanese Patent Application No. 2018-542124, issued on May 12, 2020, 5 pages.
Korean Intellectual Property Office, "Notice of Preliminary Rejection," issued in connection with Korean Patent Application No. 10-2018-7015513, issued on Jul. 25, 2020, 13 pages.
IP Australia, "Examination Report No. 1 for Standard Patent Application," issued in connection with Australian Patent Application No. 2019206005, issued on Jul. 16, 2020, 6 pages.
United States Patent and Trademark Office, "Requirement for Restriction and/or Election," issued in connection with U.S. Appl. No. 16/397,806, dated Jun. 27, 2019, 7 pages.
United States Patent and Trademark Office, "Requirement for Restriction and/or Election," issued in connection with U.S. Appl. No. 14/931,844, dated Nov. 14, 2017, 7 pages.
United States Patent and Trademark Office, "Notice of Allowance and Fee(s) Due," issued in connection with U.S. Appl. No. 14/931,844, dated Feb. 8, 2018, 15 pages.
United States Patent and Trademark Office, "Non-Final Office Action," issued in connection with U.S. Appl. No. 15/967,123, dated Jul. 6, 2018, 42 pages.
United States Patent and Trademark Office, "Notice of Allowance and Fee(s) Due," issued in connection with U.S. Appl. No. 15/967,123, dated Dec. 12, 2018, 46 pages.
National Intellectual Property Administration of the People's Republic of China, "Notification of the First Office Action," issued in connection with Chinese Patent Application No. 20168007593.0, issued on Sep. 8, 2020, 20 pages.
Canadian Intellectual Property Office, "Commissioner's Notice—Application Found Allowable," issued in connection with Canadian application No. 3,004,289, dated Jan. 25, 2021, 1 page.
IP Australia, "Notice of Acceptance," issued in connection with Australian application No. 2019206005, dated Mar. 22, 2021, 3 pages.
European Patent Office, "Communication under Rule 71(3) EPC," issued in connection with European Patent Application No. 16767113.0, dated Dec. 11, 2021, 51 pages.
Korean Itellectual Property Office, "Notice of Allowance," issued in connection with Korean Patent Application No. 10-2018-7015513, dated Dec. 2, 2020, 5 pages.
National Intellectual Property Administration of the People's Republic of China, "Office Action" issued on Apr. 9, 2021 in connection with Chinese Patent Application No. 201680075930.0, 21 pages. (English Translation Included).
National Intellectual Property Administration of the People's Republic of China, "Office Action" issued on Sep. 1, 2021 in connection with Chinese Patent Application No. 201680075930.0, 24 pages. (English Translation Included).
Mexican Institute of Industrial Property, "Office Action" issued on Mar. 30, 2021 in connection with Mexican Patent Application No. 2018005563, 7 pages. (Machine Translation Included).
Mexican Institute of Industrial Property, "Office Action" issued on Sep. 24, 2021 in connection with Mexican Patent Application No. 2018005563, 7 pages. (Machine Translation Included).
European Patent Office, "Invitation Pursuant to Rule 63(1) EPC," issued in connection with European Patent Application No. 21175057.5, issued on Aug. 16, 2021, 4 pages.
European Patent Office, "Extended European Search Report," issued in connection with European patent application No. 21175057.5, issued on Dec. 16, 2021, 14 pages.
Mexican Patent Office, "Notice of Allowance," issued in connection with Mexican patent application No. MX/a/2018/005563, issued on Feb. 10, 2022, 4 pages. (English Machine Translation Included).
National Intellectual Property Administration of the People's Republic of China, "Notice of Completing Formalities for Patent Registration" issued on Mar. 16, 2022 in connection with Chinese Patent Application No. 201680075930.0, 8 pages. (English Translation Included).
CISCI Eagle, "Warehouse Traffic Sensor-Single Light, Rack Mounted", Sep. 24, 2022, 6 pages.
Sentry Protection Products, "Collision Sentry Corner Pro", Sep. 24, 2022, 2 pages.
iOSH, "A-Safe Launching A New Generation of Intelligent 24/7 Rack Protection at IMHX", Oct. 2, 2019, 7 pages.
Save-Ty Yellow Products, "Safety Products > Collision Awareness Sensor Alert Warning System > Collision Awareness Sensor Alert Warning System—Interior Units > Look Out 1 & 2 > Look Out 1 > View Items" Sep. 24, 2022.
Shure Star, "Traffic Caution Systems", Sep. 24, 2020, 2 pages.
United States Patetn and Trademark Office, "Non Final Office Action," issued in connection with U.S. Appl. No. 16/882,738, issued on Sep. 22, 2021, 16 pages.
United States Patent and Trademark Office, "Notice of Allowance and Fee(s) Due," issued in connection with U.S. Appl. No. 16/882,738, issued on Feb. 3, 2022, 11 pages.
PRC National Intellectual Property Administration, "Office Action," issued in connection with Chinese Patent Application No. 202130251116.3, issued on Aug. 12, 2021, 2 pages. (English Machine Translation Included.).
PRC National Intellectual Property Administration, "Notice of Completing Formalities for Patent Registration," issued in connection with Chinese Patent Application No. 202130251116.3, issued on Jan. 20, 2022, 5 pages.
International Searching Authority, "Invitation to Pay Additional Fees", issued in connection with PCT Application No. PCT/US2016/0157127, issued on Feb. 16, 2022,24 pages.
IP Australia, "Examination Report No. 1," issued on Apr. 4, 2019, issued in connection with application No. AU 2016350618, issued on Apr. 4, 2019, 2 pages.
IP Australia, "Notice of Acceptance," issued in connection with application No. AU 2016350618, issued on Jul. 23, 2019, 3 pages.
PRC National Intellectual Property Administration, "Notice of Completing Formalities for Patent Registration," issued in connection with Chinese Patent Application No. 202230188009.5, issued on Aug. 1, 2022, 4 pages. (English Translation Included.).
Material Handling Wholsesaler, "Warning System uses Flashing LED to alert workers of approaching traffic", retrieved Aug. 15, 2022, 3 pages.
United States Patent and Trademark Office, "Notice of Allowance and Fee(s) Due," issued in connection with U.S. Appl. No. 29/756,430, dated Jul. 14, 2022, 7 pages.
Mexican Patent Office, "Office Action", issued on connection with Mexican Patent Application No. MX/f/2021/001250, issued on Jul. 7, 2022, 10 pages. (English Translation Included).
International Searching Authority, "International Search Report and Written Opinion", issued in connection with PCT Application No. PCT/US2016/0157127, issued on May 24, 2022, 24 pages.
International Searching Authority, "International Preliminary Report on Patentability," issued in connection with PCT Application No. PCT/US2021/057127, dated May 11, 2023, 19 pages.
Australian Government, IP Australia, "Examination Report No. 1," issued in connection with Australian Patent Application No. 2021371313, issued on Apr. 22, 2024, 7 pages.
The State Intellectual Property Office of People's Republic of China, "The Second Office Action," issued in connection with Chinese Patent Application No. 202210612898.2, dated May 25, 2024, 8 pages. [English translation included.].
European Patent Office, "Communication pursuant to Rules 161(1) and 162 EPC—Invitation to Correct Deficiencies," issued in connection with European Patent Application No. 21811648.1, dated Jun. 12, 2023, 3 pages.
The State Intellectual Property Office of the People's Republic of China, "Notice to Grant Patent Right for Invention," issued in connection with Application No. 202210612898.2, dated Aug. 14, 2024, 3 pages [English translation included].
IP Australia, "Notice of Acceptance," issued in connection with AU Application No. 2021371313, issued on Oct. 16, 2024, 3 pages.

(56) References Cited

OTHER PUBLICATIONS

European Patent Office, "Communication Under Rule 71(3) EPC," issued in connection with European Patent Application No. 21175057.5, dated Oct. 28, 2024, 5 pages.
Canadian Intellectual Property Office, "Examination Report," issued in connection with Canadian Appln. No. 202948, dated Oct. 27, 2022, 2 pages.
China National Intellectual Property Administration, "First Notification on Correction of Deficiencies," Issued in connection with Chinese Appln. No. 202130251116.3, dated Oct. 15, 2021, 2 pages. (English Summary Included).
International Searching Authority, "International Preliminary Report on Patentability," issued in connection with PCT Application No. PCT/US2016/050565, dated May 8, 2018, 12 pages.
Mexican Institute of Industrial Property, "Notice of Allowance," issued in connection with Mexican Appln. No. MX/f/2022/002623, dated Jan. 16, 2023, 6 pages. (Machine Translation Included).
Mexican Institute of Industrial Property, "Notice of Allowance," issued in connection with Mexican Patent Application No. MX/f/2021/001250, issued on Oct. 11, 2022, 6 pages. (Machine Translation Included).
United States Patent and Trademark Office, "Notice of Allowance and Fee(s) Due," issued in connection with U.S. Appl. No. 14/931,844, mailed on Jun. 26, 2018, 5 pages.
United States Patent and Trademark Office, "Corrected Notice of Allowability," issued in connection with U.S. Appl. No. 16/397,806, mailed on Mar. 9, 2020, 8 pages.
United States Patent and Trademark Office, "Corrected Notice of Allowability," issued in connection with U.S. Appl. No. 16/882,738, mailed on Apr. 29, 2022, 2 pages.
Material Handling Wholesaler, "Warning System uses Flashing LED to alert workers of approaching traffic," May 21, 2021, <https://www.mhwmag.com/products/warning-system-uses-flashing-led-to-alert-workers-of-approaching-traffic/>, 3 pages.
European Patent Office, "Communication pursuant to Article 94(3) EPC," issued in connection with European Patent Application No. 21175057.5, issued on Jun. 27, 2023, 5 pages.
China National Intellectual Property Administration, "First Office Action," issued in connection with Chinese Patent Application No. 202210612898.2, issued on Aug. 29, 2023, 12 pages. English translation attached.
Japanese Patent Office, "Search Report by Registered Search Organization," issued in connecton with Japanese Application No. 2018-542124, dated Jul. 31, 2019, 69 pages.
Japenese Patent Office, "Written Opinion," issued in connection with Japanese Patent Application No. 2018-542124, dated Nov. 1, 2019, 14 pages.
European Patent Office, "Decision to Grant a European Patent Pursuant to Article 97(1) EPC," issued in connection with European Patent Application No. 16767113, issued on May 7, 2021, 2 pages.
United States Patent and Trademark Office, "Corrected Notice of Allowability," issued in connection with U.S. Appl. No. 29/756,430, mailed on Aug. 29, 2022, 2 pages.
Shurestar, "You Are Now Entering the Safety Zone Intersection Caution Systems & Alerts," Brochure, (2015), 5 pages.
United States Patent and Trademark Office, "Non-Final Office Action," issued in connection with U.S. Appl. No. 29/860,651, dated Dec. 30, 2024, 14 pages.

* cited by examiner

TRAFFIC ALERT DEVICES AND METHODS OF USING THE SAME

RELATED APPLICATIONS

This patent claims priority to U.S. Provisional Application No. 63/106,708, which was filed on Oct. 28, 2020. U.S. Provisional Application No. 63/106,708 is incorporated herein by reference in its entirety.

FIELD OF THE DISCLOSURE

This disclosure relates generally to traffic signals, and, more particularly, to traffic alert devices and methods of using the same.

BACKGROUND

Warehouses, factories, and other material handling facilities often include racks arranged in rows to define multiple aisles extending therebetween. These aisles may be used for both pedestrian traffic as well as vehicles (e.g., fork trucks).

Figure 1:
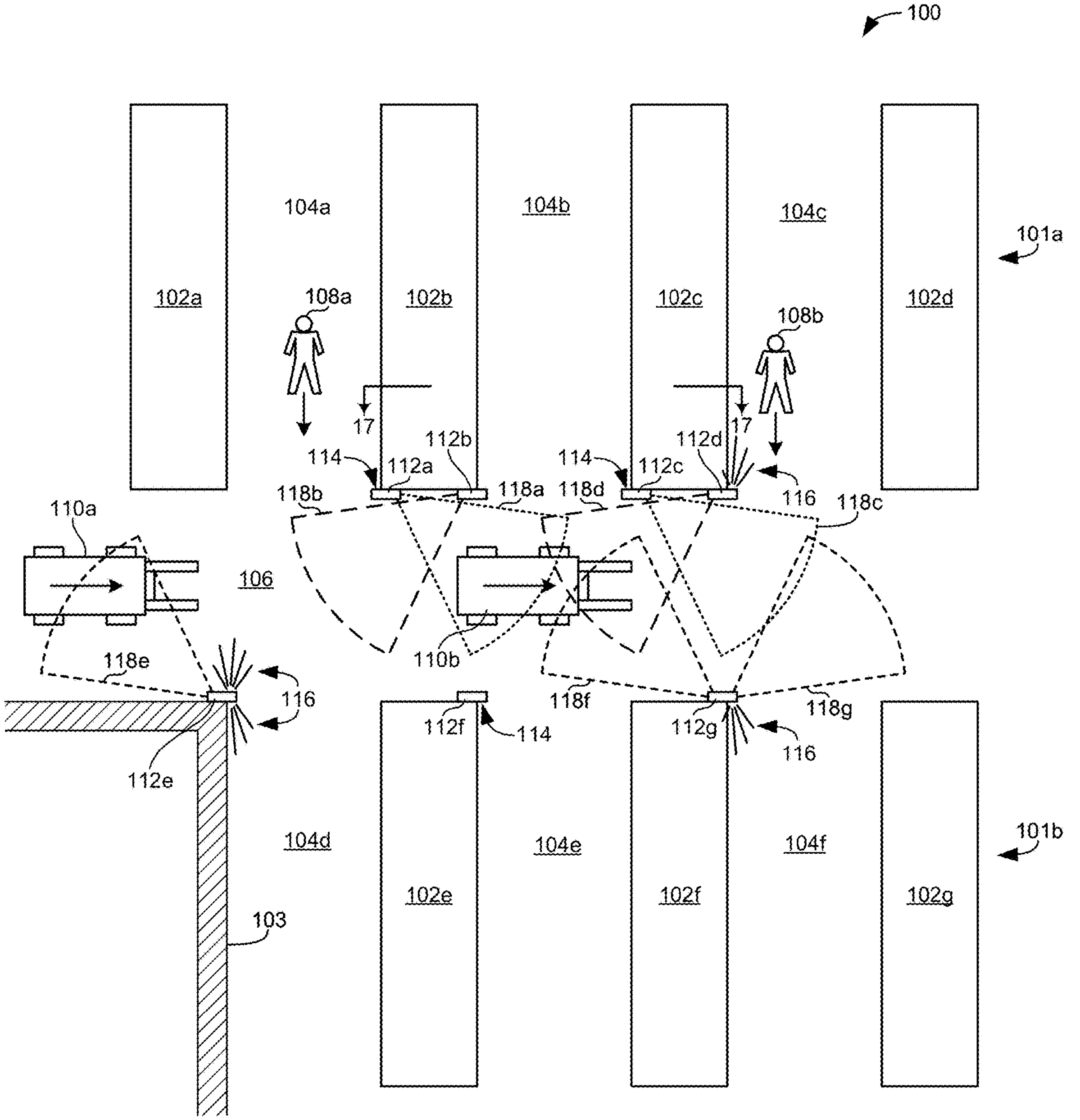
FIG. 1 is an overhead view of an example material handling facility in which teachings disclosed herein may be implemented.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Conditions may be present in industrial settings (e.g., warehouses, distribution centers, factories, and/or other material handling facilities) that may place pedestrians and vehicles (e.g., fork trucks and/or other material handling equipment) in close proximity to one another, thereby creating potential collision hazards. Collisions often occur at intersections between different pathways of travel for different traffic as shown and described in connection with FIG. 1.

In particular, FIG. 1 is an overhead view of an example material handling facility 100 in which teachings disclosed herein may be implemented. As shown in the illustrated example, the material handling facility includes two rows 101*a-b* of racks 102*a-g* (generally referred to by reference numeral 102). Further, in this example, the second row 101*b* of racks 102 is aligned with a wall 103 of the material handling facility. Between pairs of the racks 102 (and the wall 103) are corresponding aisles 104*a-f* (generally referred to by reference numeral 104) by which access to the racks 102 is provided (e.g., for storage or removal of goods). The aisles 104 extending along the length of the racks 102 are referred to herein as secondary aisles to distinguish them from a main or primary aisle 106 extending between the two rows 101*a-b* of racks 102. The primary aisle 106 extends in a direction that is transverse to the secondary aisles 104 and along ends of the racks 102. In the illustrated example, the primary aisle 106 is substantially perpendicular to the secondary aisles 104. However, in other situations, the racks 102 (and, thus, the secondary aisles 104) may be at oblique angles relative to the primary aisle 106. Further, as shown in the illustrated example, each of the first, second, and third secondary aisles 104*a-c* aligns with respective ones of the fourth, fifth, and sixth aisles 104*d-f*. More generally, the aligned aisles 104 may be considered as part of one continuous aisle across which the primary aisle 106 extends.

As shown in the illustrated example, first and second pedestrians 108*a-b* (generally referred to by reference numeral 108) are in the first and third secondary aisles 104*a*, 104*c*, respectively. Further, first and second fork trucks 110*a-b* (generally referred to by reference numeral 110) are represented within the primary aisle 106. For purposes of explanation, an arrow is shown representing the direction of movement of each of the pedestrians 108 and each of the fork trucks 110. As shown in FIG. 1, both pedestrians 108 are moving toward the primary aisle 106 and both of the fork trucks 110 are moving in the same direction along the primary aisle 106. Based on their relative positions, there is a risk for a collision between the first pedestrian 108*a* and the first fork truck 110*a* because they are moving towards the same intersection between the first secondary aisle 104*a* and the primary aisle 106. Likewise, there is a risk for a collision between the second pedestrian 108*b* and the second fork truck 110*b* because they are moving towards the same intersection between the third secondary aisle 104*c* and the primary aisle 106. The risk of a collision is particularly high in the situation represented in FIG. 1 because the racks 102 (and/or the wall 103 if a pedestrian 108 was in the fourth aisle 104*d*) create blind corners by obstructing a view of the cross aisle (i.e., primary aisle 106) towards which the pedestrians 108 are approaching and along which the fork trucks 110 are traveling.

In some situations, the risk of collision at intersecting aisles 104, 106 may be reduced by establishing traffic rules specifying that traffic on the primary aisle 106 has the right-of-way to traffic on the secondary aisle 104. This approach not only increases safety but can also increase efficiency of facility operations by enabling the fork trucks 110 to move relatively quickly along the primary aisle 106 as they move from one location in the material handling facility to another without having to stop or appreciably slow down at each successive intersection associated with the secondary aisles 104. While a pedestrian 108 (or an operator in a fork truck 110) within a secondary aisle 104 may have to proceed cautiously when approaching and/or initially entering the primary aisle 106 (e.g., to yield to traffic that is already in the primary aisle), once they have entered the primary aisle 106, they may move relatively quickly as described above.

While adhering to such traffic rules may reduce the likelihood of collisions, there may still be circumstances where a person entering the primary aisle 106 from the secondary aisle 104 fails to notice traffic approaching in the primary aisle 106 such that collisions are still possible. For example, a loaded cart they are pushing or other equipment in front of them may obscure their view of oncoming traffic in the primary aisle 106. Accordingly, example traffic alert devices 112*a-g* (generally referred to by reference numeral 112) are positioned at the ends of the racks 102 to detect oncoming traffic and generate visual alerts or signals to inform people nearby of the detected traffic. More particularly, in some examples, the traffic alert devices 112 are positioned at one or more corners of the racks 102 adjacent an intersection between two aisles (e.g., the primary aisle 106 and one of the secondary aisles 104). When positioned at such locations, the traffic alert devices 112 are capable of detecting traffic in an area associated with a first one of the intersecting aisles (e.g., the primary aisle 106) and generating a visual signal that is visible around the corner in a second area associated with the other intersecting aisle (e.g., the secondary aisle 104).

In some examples, the traffic alert devices 112 include a housing that is dimensioned to be mounted to a rack 102 in a manner that a portion of the housing protrudes out from the rack 102 and into the associated secondary aisle 104 with surfaces substantially perpendicular (e.g., within 15% of exactly perpendicular) to the length of the secondary aisle 104 and substantially parallel (e.g., within 15% of exactly parallel) to the length of the primary aisle 106. As a result, the protruding portion of the housing includes an exposed surface 114 that faces away from the associated intersection and up the secondary aisle 104 so as to be visible by a person within the secondary aisle 104. However, based on the position of the traffic alert device 112, the exposed surface 114 is not visible to a person in the primary aisle 106. Further, in some examples, the traffic alert device 112 includes one or more light emitters in the area of the exposed surface 114 of the protruding portion that emit light 116 as part of a signal indicative of traffic detected in the primary aisle 106 by a motion sensor of the traffic alert device 112. In some examples, the light emitter includes an array of light emitting diodes (LEDs) in a particular shape or arrangement as shown and described in connection with FIGS. 2-5. The light emitter may include any other type of light source (e.g., a light bulb, a programmable graphical display screen, etc.).

In some examples, the motion sensor is positioned with a field of detection oriented toward a first aisle (e.g., the primary aisle 106) intersecting with a second aisle (e.g., the secondary aisle 104) towards which the exposed surface 114 of the housing is facing. More particularly, in some examples, the motion sensor is positioned so that the field of detection is focused on a portion of the first aisle that leads up (i.e., is adjacent) to the intersection of the two aisles in a direction opposite the protruding portion of the housing (e.g., in a direction substantially parallel to the primary aisle 106). For purposes of explanation, example fields of detection of motion sensors associated with different ones of the traffic alert devices 112 are represented by dashed line boundaries in FIG. 1. In particular, the first traffic alert device 112*a* is associated with a first sensor field of detection

118*a*, the second traffic alert device 112*b* is associated with a second sensor field of detection 118*b*, the third traffic alert device 112*c* is associated with a third sensor field of detection 118*c*, the fourth traffic alert device 112*d* is associated with a fourth sensor field of detection 118*d*, the fifth traffic alert device 112*e* is associated with a fifth sensor field of detection 118*e*, and the seventh traffic alert device 112*g* is associated with two sensor fields of detection 118*f-g*.

As shown in the illustrated example, the second fork truck 110*b* is within the fields of detection 118*a*, 118*d*, 118*f* associated with the first, fourth, and seventh traffic alert devices 112*a*, 112*d*, 112*g*. However, in this example, light 116 is only being emitted by the light emitters associated with the fourth and seventh traffic alert devices 112*d*, 112*g* because the motion sensors are directional motion sensors. As used herein, a directional motion sensor is a sensor capable of detecting motion and capable of determining the direction of the motion. Some such directional motion sensors can also determine the speed of the detected motion. In some examples, the directional motion sensor is a microwave motion sensor that uses time-of-flight (radar) technology to accurately determine the direction of detected traffic. In some examples, the motion sensors only trigger the light emitters when an object is detected to be moving towards the sensor. Thus, as illustrated in FIG. 1, the second fork truck 110*b* is moving towards the fourth and seventh traffic alert devices 112*d*, 112*g*, which is why the light emitters associated with those devices are emitting light 116. By contrast, the second fork truck 110*b* is moving away from the first traffic alert device 112*a* such that the corresponding light emitters are not activated. Distinguishing between direction in this matter reduces the likelihood of a traffic alert signal being incorrectly generated to indicate a potential collision hazard when no such hazard exists (e.g., a false positive). That is, as shown in the illustrated example of FIG. 1, the second fork truck 110*b* has already passed the first aisle 104*a* such that there is no risk of a collision between the first pedestrian 108*a* and the fork truck 110*b*. Therefore, there is no need generate a signal visible by the first pedestrian 108*a* to indicate the presence of the fork truck 110*b*. However, the fork truck 110*b* is approaching the third aisle 104*c* where the second pedestrian 108*b* is located. Accordingly, the fourth traffic alert device 112*d* activates the light emitter to emit the light 116 to warn the pedestrian 108*b* of the approaching fork truck 110*b*. Distinguishing between movement towards a sensor (and corresponding aisle 104) and away from the sensor also serves to save power because the light emitters are activated less often than for motion sensors that cannot detect the direction of the motion (e.g., many traditional infrared motion sensors).

As represented in FIG. 1, the second fork truck 110*b* is at a location that is between the fields of detection 118*b*, 118*c* associated with the second and third traffic alert devices 112*b*, 112*c*. As a result, the light emitters associated with the second and third traffic alert devices 112*b*, 112*c* are not activated. In some examples, there is no need for the light emitters of the second and third traffic alert devices 112*b*, 112*c* to be activated at the point in time represented in FIG. 1 because the fork truck 110*b* is already within the intersection between the primary aisle 106 and the second secondary aisle 104*b* such that an individual within the second secondary aisle 104*b* would be able to see the fork truck 110*b*. In other words, in some examples, the motion sensors of the traffic alert devices 112 are positioned to monitor areas on a first aisle (e.g., the primary aisle 106) that are partially or completely obscured from view by a person in a second intersecting aisle (e.g., one of the secondary aisles 104). In the illustrated example, for each secondary aisle 104, there are two areas along the primary aisle 106 that may be obscured from the view of a person in the secondary aisle. These two areas include the portions of the primary aisle 106 on either side of the intersection of the primary aisle 106 with the secondary aisle 104. In some examples, a traffic alert device 112 is placed on either side of the secondary aisle 104 (e.g., at the corner of the two racks 102 defining the aisle 104) to detect motion in each of these two areas. As a result, a person in the secondary aisle 104 can be alerted to traffic approaching the intersection from either direction along the primary aisle 106.

In addition to positioning traffic alert devices 112 at the corners of each rack 102 on either side of a particular secondary aisle 104 (e.g., the second and third traffic alert devices 112*b*, 112*c* on either side of the second secondary aisle 104*b*), in some examples, different traffic alert devices 112 are positioned on either side of the primary aisle at adjacent ends of adjacent racks 102. For example, as shown in FIG. 1, the fourth traffic alert device 112*d* is positioned at the end of the third rack 102*c* while the seventh traffic alert device 112*g* is positioned opposite the fourth traffic alert device 112*d* at the end of the sixth rack 102*f* As represented in the illustrated example of FIG. 1, the fourth and seventh traffic alert devices 112*d*, 112*g* are associated with fields of detection generally directed to the same area of the primary aisle 106. As a result, both the fourth and seventh traffic alert devices 112*d*, 112*g* may detect the second fork truck 110*b* at approximately the same time. In some examples, both the fourth and seventh traffic alert devices 112*d*, 112*g* are used because the light emitters are directed in opposite directions into each of the corresponding secondary aisles (e.g., the third and sixth secondary aisles 104*c*, 104*f*). That is, as shown in the illustrated example, the fourth traffic alert device 112*d* emits light 116 into the third aisle 104*c* so as to be visible by the second pedestrian 108*b*. By contrast, the seventh traffic alert device 112*g* emits light 116 into the sixth aisle 104*f* so as to be visible by anyone who may be in the sixth aisle 104*f*. In some examples, the traffic alert devices 112 may include a separate sensor to detect the presence of someone in the secondary aisle. In some such examples, the light 116 is only emitted when someone is detected in the secondary aisle 104. In other examples, as represented in FIG. 1 by the seventh traffic alert device 112*g* positioned at the sixth aisle 104*f*, the light emitters may be triggered to emit the light 116 in response to detecting cross traffic (e.g., the fork truck 110*b*) regardless of whether anyone is detected in the secondary aisle 104. While this approach may result in circumstances of the light 116 being emitted into an empty aisle, it avoids the possibility of a false negative in which the light is suppressed despite oncoming traffic having been detected in the field of detection (e.g., in the primary aisle) because nobody is detected in an aisle (e.g., the secondary aisle) when a person is, in fact, in the aisle.

In some examples, the traffic alert devices 112 are constructed so that light emitters emit the light both into the secondary aisle 104 (e.g., out from the exposed surface 114 facing the secondary aisle 104) and in an opposite direction across the primary aisle 106 and towards a continuation of the secondary aisle 104. For example, as shown in the illustrated example, the fifth traffic alert device 112*e* is positioned at a corner of the wall 103 with a motion sensor having a field of detection 118*e* monitoring an area to the left (as viewed in the figure) of the intersection between the primary aisle 106 and the continuous secondary aisle including both the first and fourth secondary aisles 104*a*, 104*d*. In the illustrated example, the first fork truck 110*a* is within the field of detection 118*e* associated with the fifth traffic alert device 112*e* and is moving toward the traffic alert device. Therefore, the traffic alert device 112*e* causes light emitters to generate light 116. In this example, the light 116 emanates from the traffic alert device 112*e* both into the fourth secondary aisle 104*d* and also across the primary aisle 106 toward the first secondary aisle 104*a*. As a result, although there is no traffic alert device 112 at the corner of the first rack 102*a* adjacent the first secondary aisle 104*a*, the first pedestrian 108*a* within the first secondary aisle 104*a* will still be alerted to the approaching fork truck 110*a* based on the light 116 emitted by the fifth traffic alert device 112*e* that is visible from the first secondary aisle 104*a*. Thus, it is possible to provide visible alerts to corresponding secondary aisles (e.g., the first and fourth secondary aisles 104*a*, 104*d*) on either side of the primary aisle 106 using only two traffic alert devices 112. More particularly, in some such examples, the two traffic alert devices 112 (e.g., the first and fifth traffic alert devices 112*a*, 112*e*) are placed at diagonally opposite corners of an intersection with light emitters directed toward both of the secondary aisles 104*a*, 104*d*. This can significantly reduce the total number of devices needed to provide traffic alert signals to every secondary aisle 104 along a primary aisle 106.

Additionally or alternatively, in some examples, the traffic alert devices 112 include more than one motion sensor to monitor more than one area for oncoming traffic. For example, the seventh traffic alert device 112*g* is represented in FIG. 1 as being associated with two separate fields of detection 118*f*, 118*g*. The first field of detection 118*f* is positioned to monitor motion in an first area of the primary aisle 106 that is in a first direction along the primary aisle 106 relative to the position of the traffic alert device 112*g*. The second field of detection 118*g* is positioned to monitor motion in a second area of the primary aisle 106 that is in a second direction along the primary aisle opposite the first direction. As a result, the sensors in the seventh traffic alert device 112*g* may detect traffic approaching along the primary aisle 106 in either direction. In some such examples, only one traffic alert device 112 is needed at the end of an aisle (e.g., the sixth aisle 104*f* of FIG. 1) rather than having two devices 112 to monitor the two separate directions (e.g., as represented in connection with the second aisle 104*b* of FIG. 1). In some examples, the seventh traffic alert device 112*g* may include light emitters that are capable to emit light 116 in two directions (e.g., similar to the light 116 emit from the fifth traffic alert device 112*e*). In some such examples, there would be no need for any traffic alert devices on the opposite side of the primary aisle 106 (e.g., at the ends of the third or fourth racks 102*c*, 102*d* on either side of the third secondary aisle 104*c*). That is, in some examples, a single traffic alert device 112 may be implemented at an intersection to detect traffic approaching from either direction in a primary aisle 106 and to provide a visible signal that is visible in secondary aisles 104 on either side of the primary aisle 106.

Although the traffic alert devices 112 of FIG. 1 are shown and described as being located at the ends of the racks 102 (and, specifically, at the corners of the racks 102) to monitor the primary aisle 106 and provide alert signals visible within the secondary aisles 104, this disclosure is not limited to such an implementation. In some examples, the traffic alert devices 112 may be orientated approximately 90 degrees relative to what is shown in FIG. 1 so that protruding portion of the devices 112 extend into the primary aisle 106 and provide alert signals that are visible to people within the primary aisle 106. In some examples, such alert signals may be triggered based on the sensor(s) detecting motion within the secondary aisles 104. As used herein, approximately 90 degrees means exactly 90 degrees or within +/−10 degrees of 90 degrees. In some examples, two different traffic alert devices 112 can be attached at a single corner of a rack 102 (e.g., with one above the other) and rotated approximately 90 degrees relative to one another such that a first one protrudes into the primary aisle 106 and the second one protrudes into an associated secondary aisle 104. Further, although the traffic alert devices 112 are shown being attached to the outside of the racks 102 at particular corners of the racks, in some examples, the devices 112 may be located at some position between opposite ends of a particular rack 102. In some such examples, the traffic alert devices 112 may still be located at a corner but on an inside surface of a leg or post of the rack 102 defining the corner of the rack. In other examples, the traffic alert devices 112 may be positioned appreciably spaced apart from the corners of the racks 102 (e.g., towards the middle of the racks 102).

Figure 1A:
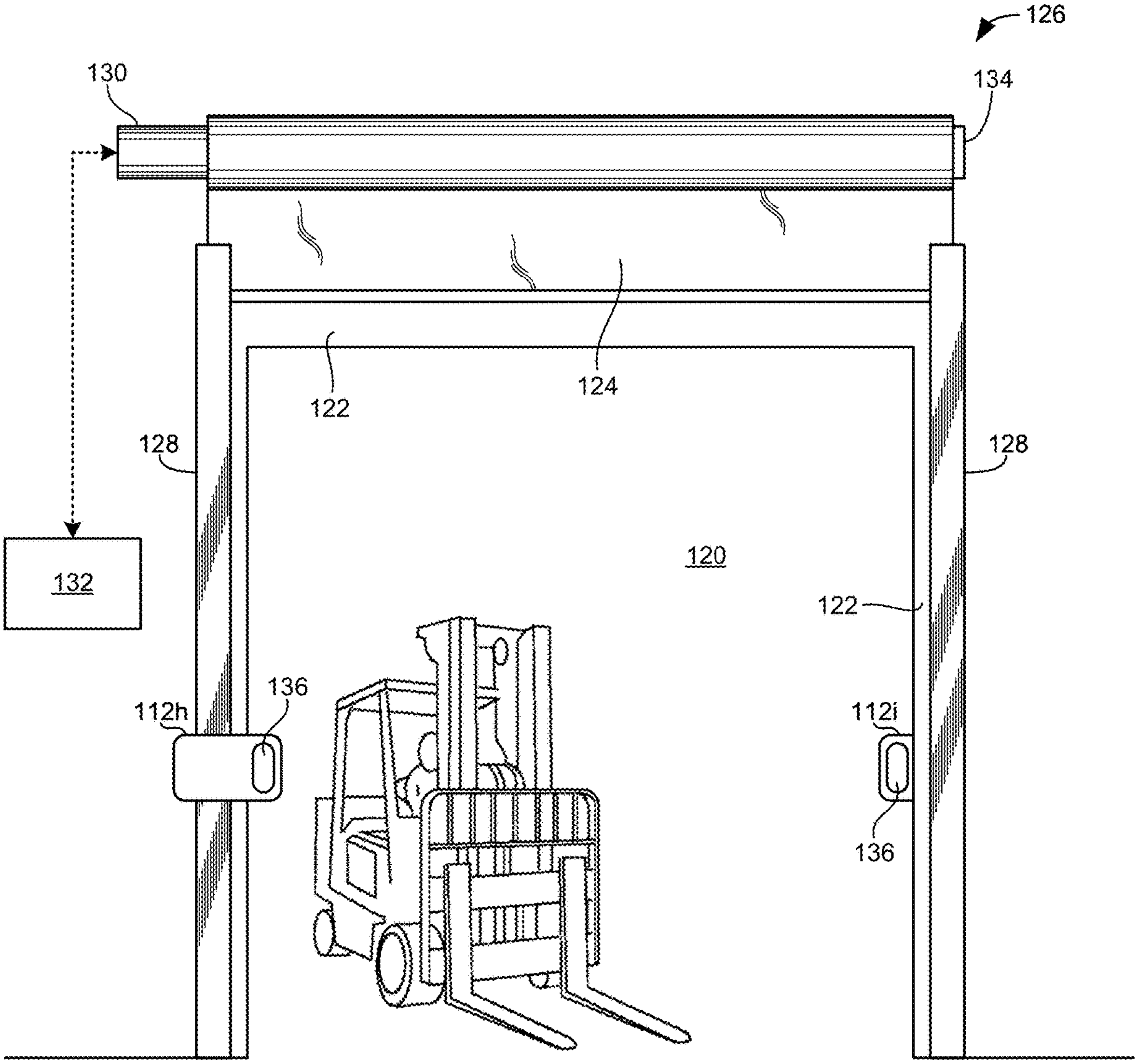
FIG. 1A illustrates example traffic alert devices mounted to lateral sides of a doorway.

In some examples, the traffic alert devices 112 may be mounted onto any suitable structure other than a rack 102 (e.g., a wall, a freestanding post, suspended from the ceiling, a fork truck 110, etc.). For instance, as noted above, the fifth traffic alert device 112*e* is attached to the wall 103 to provide a visible signal or alert around a blind corner. Other scenarios in which the traffic alert devices 112 disclosed herein may be used include at doorways. In particular, FIG. 1A illustrates example traffic alert devices 112*h-i* mounted to lateral sides of a doorway 120 in a wall 122. In this example, the doorway 120 is selectively blocked and unblocked by door panel 124 of an example door system 126. In this example, the door panel 124 is a flexible or pliable sheet or curtain that includes lateral edges that move along guides or tracks 128 to open or close the door panel 124. The example door system 126 includes a drive unit 130 with a motor that operates in response to commands from a controller 132 to drive the panel 124 upward and downward between an open position and a closed position. In this example, the motor of the drive unit 130 rotates a roller, drum, or mandrel 134 in a first rotational direction to draw and roll up the door panel 124 toward a fully open position (as illustrated in FIG. 1) or a second rotational direction opposite the first rotational direction to unroll and payout the door panel 124 to a fully closed position. Other door systems, different types of door panels, and/or different mechanisms to move the door panel may implemented in addition to or instead of the door system 126 shown in the illustrated example.

Regardless of the particular implementation of the door system 126, as shown in the illustrated example of FIG. 1A, the traffic alert devices 112 are positioned such that at least a portion of the devices 112 protrude or extend into a path defined by the doorway 120. As a result, the protruding portion of the devices 112 are visible on either side of the doorway 120 (at least when the door panel 124 is in the open position). The protruding portions of the traffic alert devices 112 include corresponding light emitters 136 to emit light towards areas in which individuals may be approaching the doorway 120. In some examples, the light emitters 136 are activated in response to a sensor detecting movement in areas to the side of the doorway (e.g., areas that are not visible to a person approaching the doorway 120 from the other side). In the illustrated example of FIG. 1A, one of the traffic alert devices (e.g., the traffic alert device 112*h*) is mounted on a first side of the wall 122 while the other traffic alert device (e.g., the traffic alert device 112*i*) is mounted on the opposite side of the wall 122. In this manner, the devices 112 are able to monitor and detect movement on both sides of the wall 122. In this example, the traffic alert devices 112 are positioned on opposing lateral sides of the doorway 120. In other examples, the traffic alert devices 112 can be positioned on the same lateral side of the doorway 120. In some such examples, the traffic alert devices 112 are positioned at different heights such that both devices 112 remain visible from either side of the doorway 120 without either device 112 obstructing a view of the other. In some examples, only one traffic alert device is used while the other may be omitted. Further, in some examples, the traffic alert devices 112 may be used adjacent a doorway 120 without the use of an associated door system 126. That is, in some examples, the door system 126 is omitted.

In addition to being able to mount the traffic alert devices 112 at any suitable location relative to the racks 102 and the associated aisles 104, 106 (or other suitable structures such as walls, doorways, etc. and corresponding areas surrounding an intersection that are obstructed from view), in some examples, the location and/or size of the field of detection 118 of the motion sensors relative to the position and location of the traffic alert devices may be adjustable. That is, in some examples, the width, height, depth/range of the field of detection, and/or angle of direction towards which the field of detection 118 is positioned relative to the traffic alert device may be changed as appropriate for the particular application and environment in which the traffic alert device 112 is being implemented. Thus, the fields of detection 118 shown in FIG. 1 are provided for purposes of explanation only and are not intended to define the particular areas monitored by the traffic alert devices 112.

As described above, the traffic alert devices 112 include one or more light emitters that generate light 116 to indicate that approaching traffic has been detected. In some examples, the presence of light 116 is only a part of the signal generated to convey information about the detected traffic. More particularly, in some examples, the light emitters include multiple light sources arranged in a particular shape and/or activated in a particular manner to indicate the direction of the traffic, the speed of the traffic, the type of traffic (e.g., pedestrian or vehicular), and/or any other suitable information. In particular, FIGS. 2-5 illustrate different light emitters on the exposed protruding surface 114 of different example traffic alert devices 112*j-n* mounted to a leg or post 202 of a rack 102.

Figure 2:
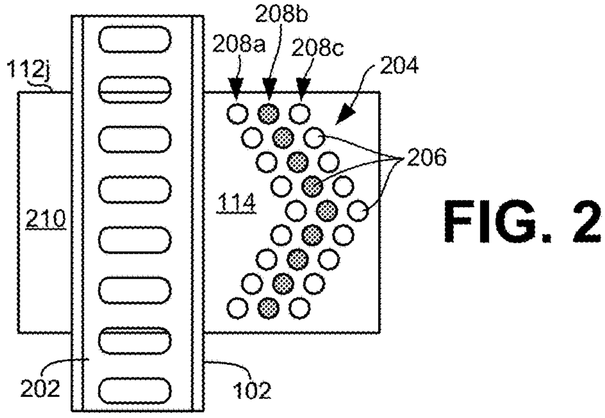
FIG. 2 illustrates an example traffic alert device constructed in accordance with teachings disclosed herein.

As shown in the illustrated example of FIG. 2, the traffic alert device 112*j* includes a light emitter 204 that includes a plurality of individual lights 206 (e.g., LEDs, pixels of a display, etc.) arranged in the shape of a chevron with a point defining the direction of motion of detected traffic. That is, in this example, the chevron is pointing to the right indicating that traffic is approaching from the left (and moving to the right). In other examples, the lights 206 may be arranged in any other suitable shape depending on what is intended to be conveyed by the shape (e.g., an arrow or triangular shape can also be oriented to point in the direction of movement of detected traffic).

In some examples, the lights 206 may turn on and remain activated for as long as the sensor detects an object approaching the traffic alert device 112. In some examples, the lights 206 may flash on and off during some or all of the time while the object is detected. In some examples, all the lights 206 are activated at the same time. In other examples, individual ones and/or selective groupings of the lights are activated at different points in time to indicate different information. For instance, the number of lights that are activated may increase as a detected object gets closer to the traffic alert device 112 such that the intensity of the light 116 is an indication of the proximity of the detected object. In other examples, the intensity of the light may correspond to the speed of the detected object. In some examples, the lights 206 may flash or change color with the speed of the flashing or color indicative of the proximity and/or speed of a detected object. In the illustrated example of FIG. 2, the chevron shape of the light emitter 204 is divided into three narrow chevrons 208*a-c* each associated with a single row of lights 206 that are separately activated and deactivated in relatively rapid succession to produce an animated effect of a lighted chevron moving from left to right. The shading of the middle chevron 208*b* is intended to indicate that those lights 206 are currently activated while the other lights are turned off. In some examples, the rate at which the three separate chevrons 208*a-c* are turned on and off and cycled through is indicative of the speed and/or proximity of the detected traffic. In some examples, different ones of the lights 206 may be different colors such that different colors can be generated to indicate different information or operational states.

As described above, in some examples, the lights 206 illuminate in response to detection of approaching traffic. However, the absence of any signal of light 116 does not necessarily indicate a safe condition in which no traffic is present because the traffic alert device 112 may have malfunctioned and/or lost power. Accordingly, in some examples, independent of any traffic nearby, one or more of the lights 206 may intermittently flash on and off to provide a visual indication that the traffic alert device 112 is powered and functioning properly. In other examples, one or more light may remain illuminated at all times when there is power and the device 112 is functioning properly.

Figure 3:
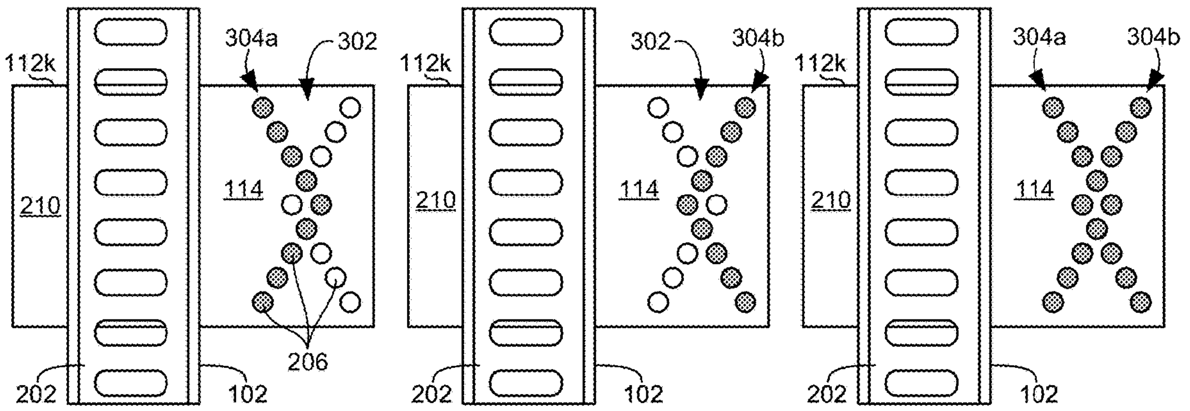
FIG. 3 illustrates three different operational states of another example traffic alert device constructed in accordance with teachings disclosed herein.

FIG. 3 illustrates an example traffic alert device 112*k* with a light emitter 302 that includes a plurality of lights 206 activated in accordance with each of three different states. In the first state (at left in FIG. 3) a first chevron 304*a* is lit up to indicate traffic is approaching from the left (as indicated by the point of the chevron pointing to the right). In the second state (the middle view in FIG. 3) a second chevron 304*b* is lit up to indicate traffic is approaching from the right (as indicated by the point of the chevron pointing to the left). In the third state (at right in FIG. 3) both chevrons 304*a-b* are lit up to indicate traffic is approaching from both directions. In this example, the traffic alert device 112*k* includes two motion sensors to enable the detection of traffic approaching from both directions (similar to the seventh traffic alert device 112*g* shown and described above in connection with FIG. 1).

In the illustrated example of FIG. 3, some of the lights 206 are used to generate the signals associated with both of the chevrons 304*a-b*. In some examples, the lights 206 are positioned at different spacing relative to one another so that different ones of the lights 206 are common to both chevrons 304*a-b*. For instance, in some examples, the center light 206 at the point of each chevron 304*a-b* may be common between the two such that the lights 206 form an X shape. In other examples, the outermost lights 206 may be common between the two chevrons 304*a-b*, thereby forming a diamond shape. In some examples, none of the lights 206 used for the first chevron 304*a* are common with the lights 206 used for the second chevron 304*b*. In some examples, any of the features and/or implementation of the light emitter 204 of FIG. 2 may be adapted to the example light emitter 302 of FIG. 3.

Figure 4:
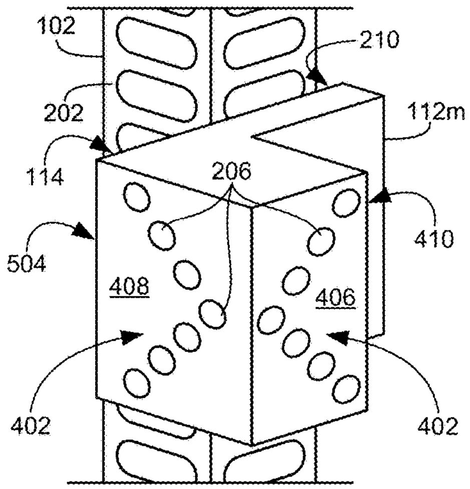
FIG. 4 illustrates another example traffic alert device constructed in accordance with teachings disclosed herein.

FIG. 4 illustrates an example traffic alert device 112*m* with multiple light emitters 402 on separate surfaces of the device 112*m* that are facing in different directions. More particularly, in this example, a first light emitter 402 (not visible from the perspective shown in FIG. 4) is on a first surface 404 that corresponds to the exposed protruding surface 114 shown and described in connection with FIG. 1 to face and/or be visible from within an aisle (e.g., one of the secondary aisles 104 of FIG. 1) defined by the rack 102. A second light emitter 402 is on a second surface 406 of the traffic alert device 112*m* that is facing in the opposite direction of the first surface 404. A third light emitter 402 is on a third surface 408 of the traffic alert device 112*m* that is facing and/or visible from within a second aisle that intersects with the first aisle towards which the first surface 404 is facing. A fourth light emitter 402 (not visible from the perspective shown in FIG. 4) is on a fourth surface 410 of the traffic alert device 112*m* that is facing in the opposite direction of the third surface 408. With this arrangement, alert signals may be generated to be visible to individuals along either of the intersecting aisles 104, 106 in either direction. In some examples, the light emitters 402 on the third and fourth surfaces 408, 410 may be omitted (and the form factor of the housing suitably adapted) such that the alert signals are limited to being directed toward people in a first aisle (e.g., the secondary aisle 104) in both directions but not people in the cross-aisle (e.g., the primary aisle 106).

In some examples, the light emitter 402 on each surface 404, 406, 408, 410 is controlled independently of the other light emitters 402 on the other surfaces. In other examples, the light emitters 402 on opposing surfaces are activated and/or controlled in combination. In other examples, all four of the light emitters 402 on all four sides 404, 406, 408, 410 are activated and/or controlled in combination. In the illustrated example of FIG. 4, the light emitters 402 include a plurality of lights 206 arranged in a chevron shape. In some examples, the light emitters 402 of FIG. 4 may alternatively correspond to the arrangement of lights 206 described in connection with the light emitters 204, 302 of any one of FIGS. 2 and 3 and/or be arranged in any other suitable manner. Further, the lights 206 may be activated and/or controlled in a manner similar to that described in connection with FIG. 2 and/or FIG. 3.

Figure 5:
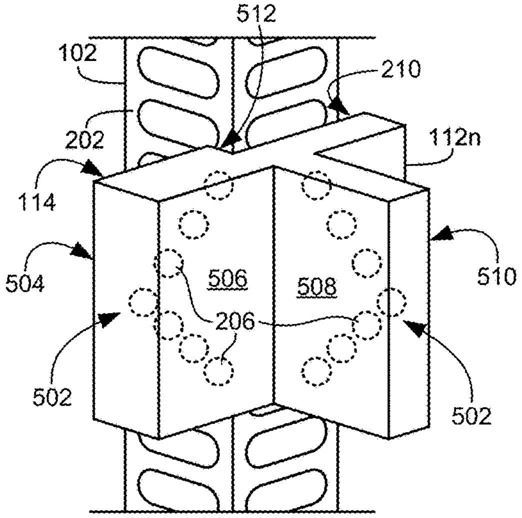
FIG. 5 illustrates another example traffic alert device constructed in accordance with teachings disclosed herein.
Figure 6B:
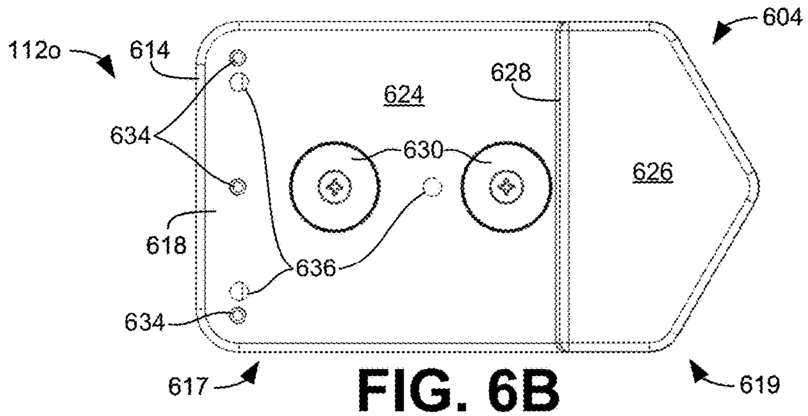
FIGS. 6A-F, 7A, 7B, 8, and 9 illustrate another example traffic alert device constructed in accordance with teachings disclosed herein.
Figure 6E:
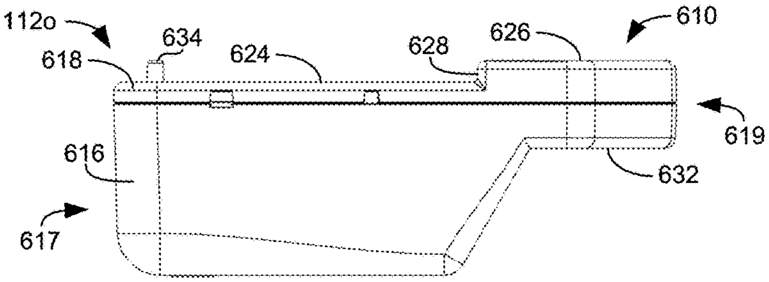
Figure 6C:
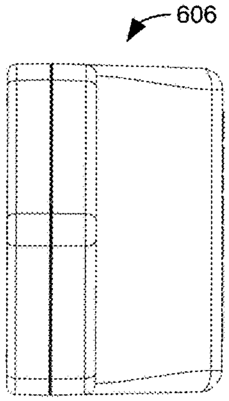
Figure 6A:
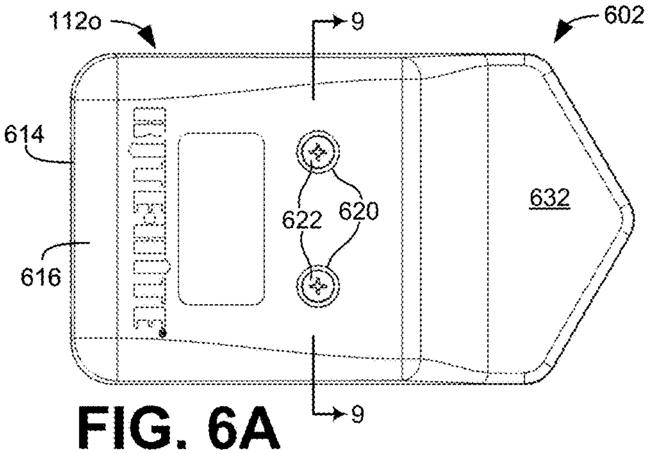
Figure 6D:
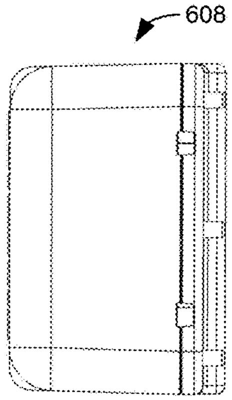
Figure 6F:
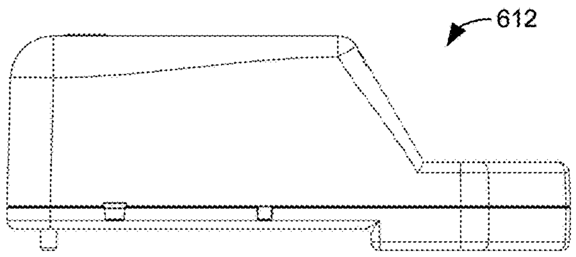

FIG. 5 illustrates another example traffic alert device 112*n* with multiple light emitters 502 visible via separate surfaces of the device 112*n* that are facing in different directions. However, unlike the example traffic alert device 112*m* of FIG. 4, the light emitters 502 of FIG. 5 include a plurality of lights 206 that are embedded within or underneath the surfaces of the traffic alert device 112*n* (as represented by the dashed lines in FIG. 5). In some examples, the light emitters 502 are visible because the housing of the traffic alert device 112*n* is made of a transparent material. In some examples, the housing is made of a translucent and/or transparent material such that the light emitters 502 (when not illuminated) may be at least partially obscured or difficult to see but the light 116 emanating from the light emitters 502 is at least visible. In some examples, the transparent, semi-transparent, and/or translucent housing enables the same light emitter 502 (and/or light 116 emitted therefrom) to be visible via opposing surfaces of the traffic alert device 112*n*. More particularly, in this example, a first light emitter 502 is positioned between a first surface 504 (corresponding to the exposed protruding surface 114 shown and described in connection with FIG. 1) and a second surface 506 that is facing in the opposite direction of the first surface 504. A second light emitter 502 is positioned between a third surface 508 (rotated approximately 90 degrees relative to the first and second surfaces 504, 506) and a fourth surface 510 that is facing in the opposite direction of the third surface 508. Although each light emitter 502 is shown and described as being visible through two opposing surfaces due to the transparent, semi-transparent, and/or translucent housing, in some examples, separate light emitters 502 may be associated with each surface 504, 506, 508, 510. In some such examples, the light emitters 502 associated with opposing surfaces 504, 506, 508, 510 may only be visible through one surface because of an opaque material (e.g., a circuit board carrying the lights 206 of the light emitters 502) between the two light emitters. In some examples, particularly where the housing is made of a semi-transparent material (e.g., polycarbonate), the housing may diffuse the light 116 emanating from the lights 206 such that the light 116 may be visible from any direction. That is, in some examples, the lights 206, when activated, may light up the housing itself such that people would be able to perceive that the lights 206 were turned on regardless of their position relative to the housing. However, such people may not be able to perceive the particular shape of the light emitter 502 and any information indicated thereby.

In some examples, the light emitters 502 associated with each of the different surfaces 504, 506, 508, 510 are controlled independently of the other light emitters 502. In other examples, separate ones of the light emitters 502 may be activated and/or controlled in combination. In the illustrated example of FIG. 5, the light emitters 502 include a plurality of lights 206 arranged in a chevron shape. In some examples, the light emitters 502 of FIG. 5 may alternatively correspond to the arrangement of lights 206 described in connection with the light emitters 204, 302 of any one of FIGS. 2 and 3 and/or be arranged in any other suitable manner. Further, the lights 206 may be activated and/or controlled in a manner similar to that described in connection with FIG. 2 and/or FIG. 3. Further, the lights 206 in any of the example traffic alert devices 112 of FIGS. 2-4 may be embedded in and/or underneath the surfaces of the housing in a manner consistent with that described in connection with FIG. 5.

In some examples, the housing of the traffic alert device 112 is constructed with a mounting surface 210 that facilitates the mounting of the device 112 to a rack or other support structure. More particularly, in some examples, the mounting surface 210 includes one or more magnets to magnetically attach to one or more paramagnetic or ferromagnetic surfaces of a post 202 of a rack 102. The magnets are positioned and the mounting surface(s) 210 is/are dimensioned so that the exposed surface 114 (corresponding to the first surfaces 404, 504 in FIGS. 4 and 5) protrudes away from and beyond the rack 102 so that the light emitters 204, 302, 402, 502 will be visible when activated during normal operation. In some examples, as shown in FIG. 4, the exposed protruding surface 114 is an extension of the mounting surface 210. In other examples, as shown in FIG. 5, the mounting surface 210 and the exposed protruding surface 114 are separated by a stepped surface 512 extending therebetween. That is, the mounting surface 210 is recessed relative to the protruding surface 114. The stepped surface 512 provides a physical stop that is to engage with a first surface of a support structure (e.g., the post 202 of the rack 102 or any other suitable structure) while the mounting surface 210 engages with a second surface of the support structure around the corner of the first surface. In some examples, the stepped surface 512 can also be a mounting surface including magnets or other elements (e.g., protrusions, fasteners, etc.) that secure the position and/or orientation of the traffic alert device 112 with respect to the structure to which it is mounted.

Figure 7A:
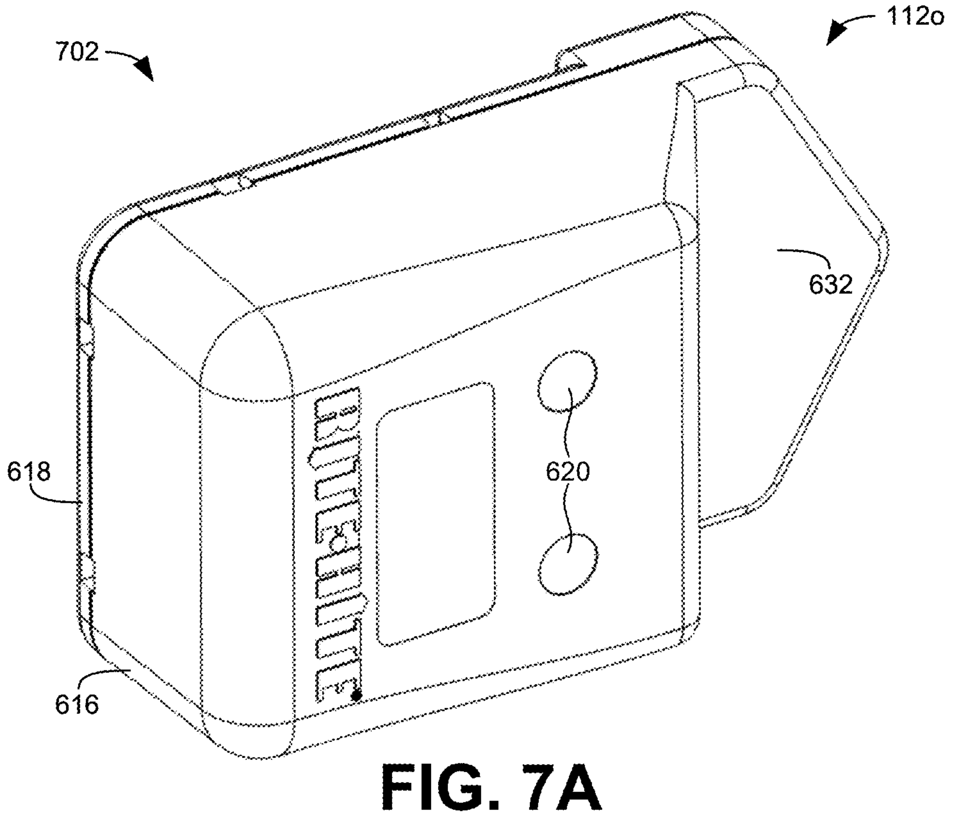
Figure 7B:
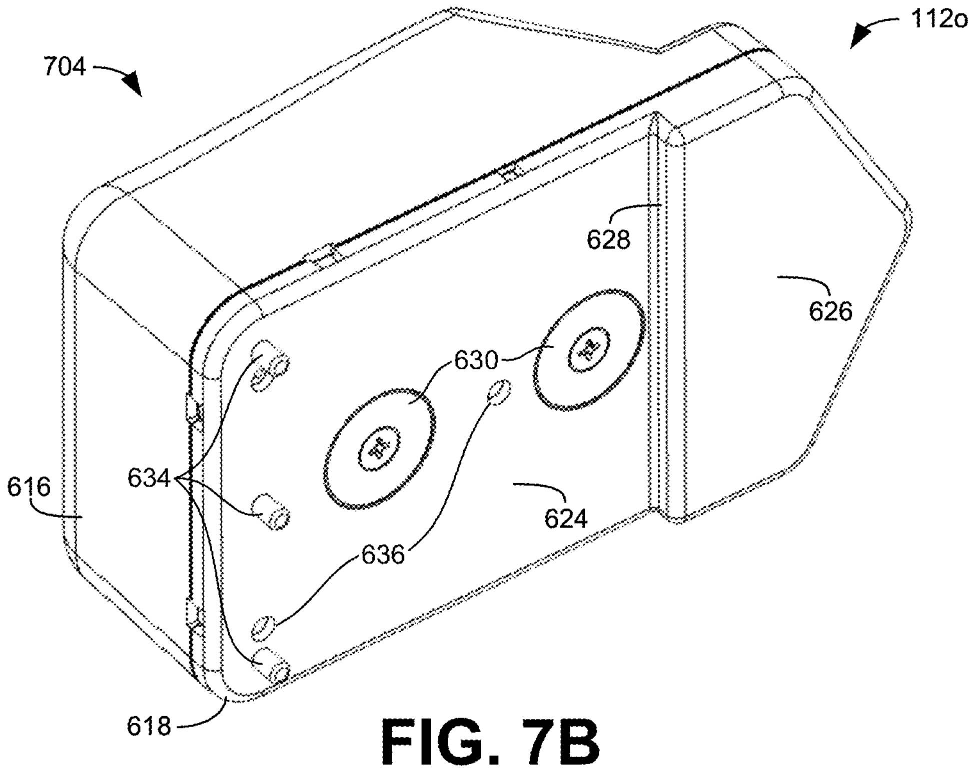
Figure 8:
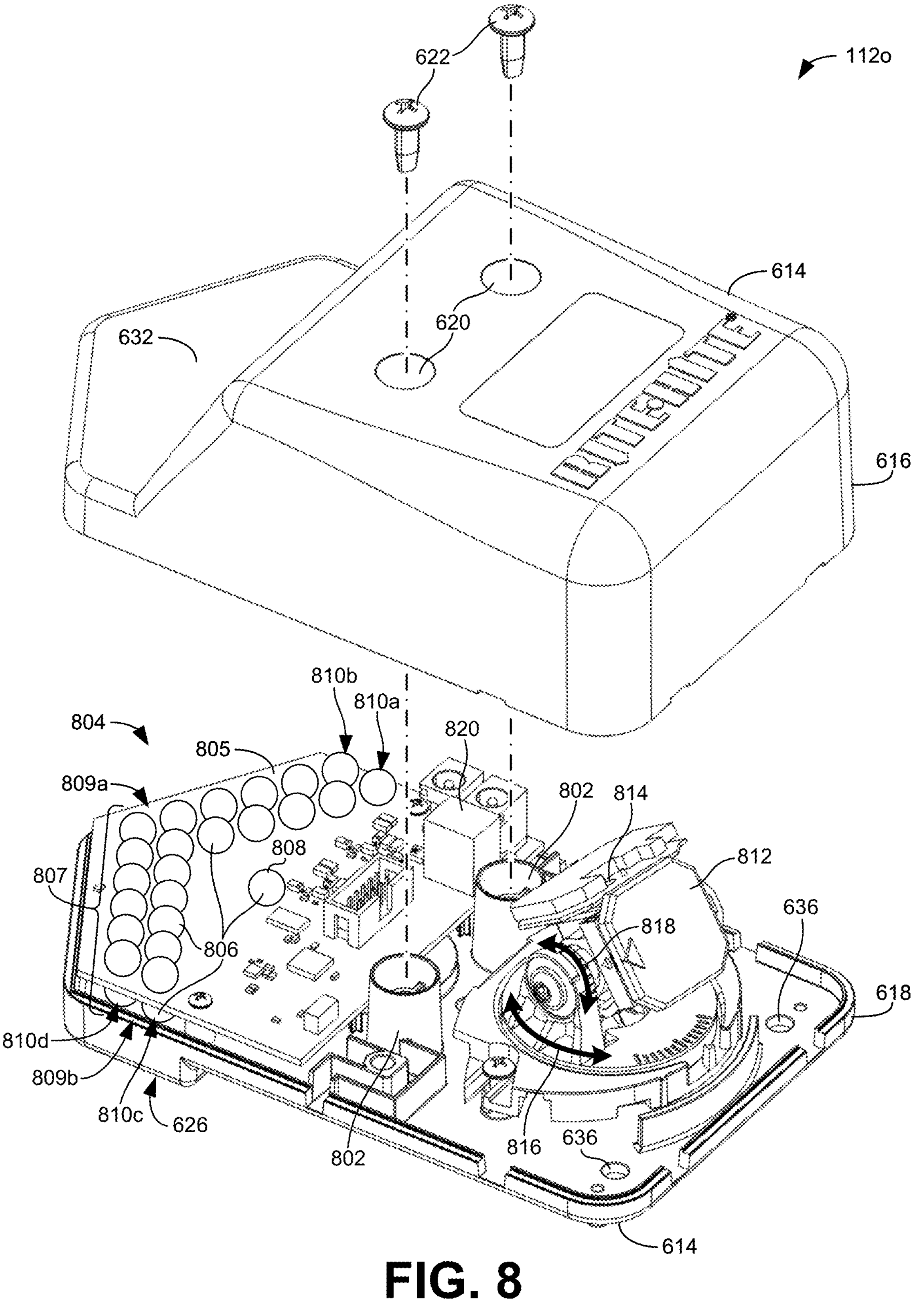
Figure 9:
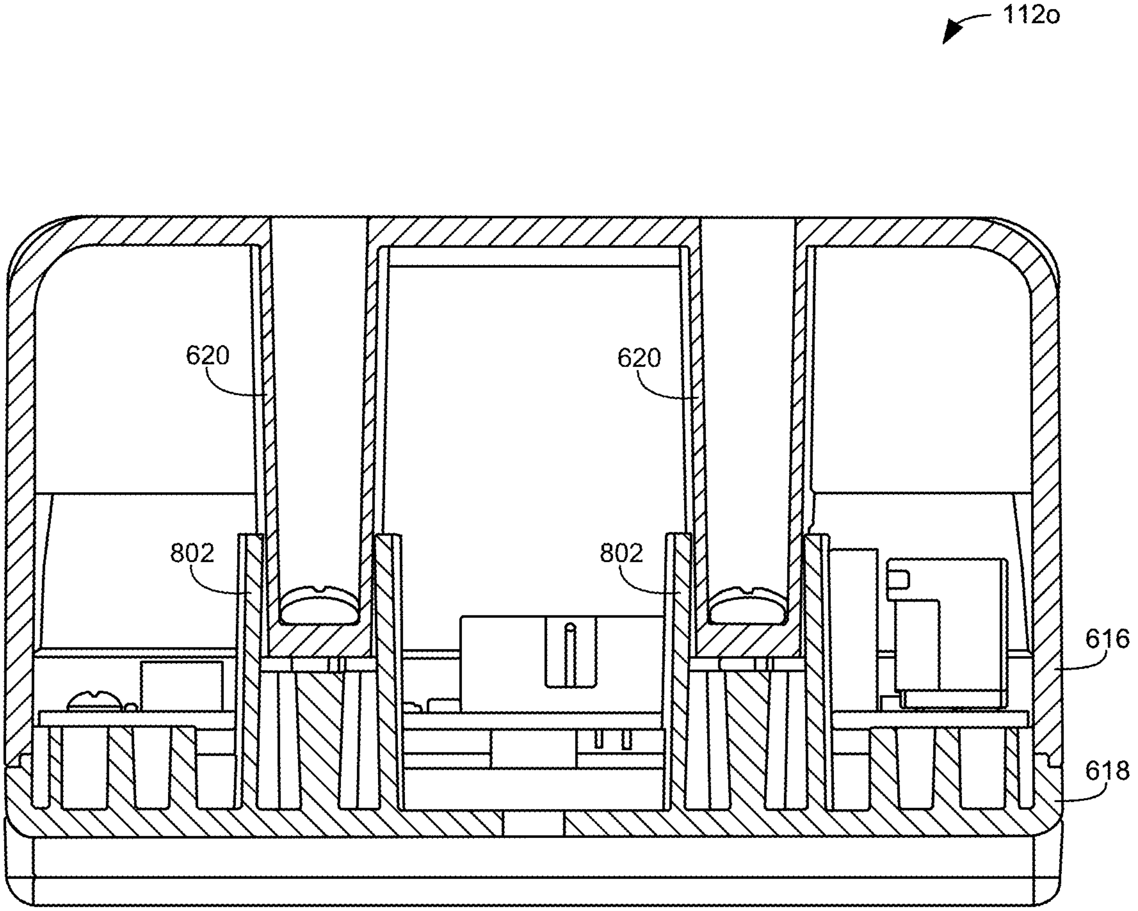

FIGS. 6A-F, 7A, 7B, 8, and 9 illustrate another example traffic alert device 112*o*. More particularly, FIGS. 6A-F includes a front view 602 (FIG. 6A), a back view 604 (FIG. 6B), two end views 606, 608 (FIGS. 6C and 6D), and two side views 610, 612 (FIGS. 6E and 6F) of the example traffic alert device 112*o*. FIG. 7A is a front perspective view 702 of the example traffic alert device 112*o* and FIG. 7B is a rear perspective view of the example traffic alert device 112*o*. FIG. 8 is an exploded view of the example traffic alert device 112*o*. FIG. 9 is a cross-sectional view taken along the line 9-9 of FIG. 6A.

In this example, the traffic alert device 112*o* includes a housing 614 including a front portion 616 and a back portion 618. In some examples, the front and back portions of the housing are made of a semi-transparent material to enable light to pass through. In some examples, the front portion 616 mates with the back portion 618 along a perimeter of the two portions 616, 618. Further, in some examples, the front portion 616 includes one or more internal tubular extensions 620 that protrude from the inner surface of the front portion 616 to mate with receptacles 802 protruding from the inner surface of the back portion 618 (as shown most clearly in FIGS. 8 and 9). Providing these internal mating features help reduce the load on the attachment points used to secure the two portions 616, 618 of the housing 614 together. In some examples, the front and back portions 616, 618 are securely fastened to one another using one or more threaded fasteners 622 (e.g., self-tapping screws) extending through the internal tubular extensions 620 and into the receptacles 802.

The separate front and back portions 616, 618 of the housing combine to define a main body or main portion 617 of the housing 614 and a protruding portion 619 of the housing 614. The main portion 617 contains a motion sensor 812 (FIG. 8) and other electrical components used to implement the traffic alert device 112*o*. Further, the housing is mounted or attached to a support structure via the main portion 617. By contrast, the protruding portion 619, as its name implies, is to protrude away from the support structure to which the housing 614 is mounted. Further, the protruding portion 619 includes and/or carries a light emitter 804 (FIG. 8) to generate a visual signal. Accordingly, the protruding portion 619 is also referred to herein as the protruding signaling portion or simply signaling portion for short. Due to the protruding signaling portion 619 of the housing 614 protruding away from the support structure, it is possible for light emitted by the light emitter 804 to be visible from either side of the protruding signaling portion 619. As shown in the illustrated example, the protruding signaling portion 619 is significantly narrower than the main portion 617. That is, a distance between front and back surfaces of the protruding signaling portion 619 is less than a distance between front and back surfaces of the main portion 617.

In the illustrated example, the back portion 618 of the housing 614 includes a mounting surface 624 (associated with the main portion 617) and a protruding surface 626 (associated with the protruding signaling portion 619) that are spaced apart by a stepped surface 628. The mounting surface 624 includes or carries one or more magnets 630 (e.g., permanent magnets) to magnetically secure the traffic alert device 112*o* to a metal (paramagnetic or ferromagnetic) support structure (e.g., the post 202 of a rack 102). In some examples, both the mounting surface 624 and the stepped surface 628 engage adjacent sides of the metal support structure to suitably position the mounting surface 624 against the edge of the support structure so that the protruding surface 626 is oriented to extend out and away from the metal support structure. In this manner, the protruding surface 626 of the back portion 618 and a corresponding protruding surface 632 of the front portion 616 will be visible by a person in an area (e.g., an aisle 104) aligned with the edge of the support structure engaging the stepped surface 628. As a result, when a light emitter 804 that is positioned between the two protruding surfaces 626, 632 of the housing 614 is illuminated, a person will be able to see the light 116 emanating from the light emitter through at least one of the protruding surfaces 626, 632. In this example, the light emitter 804 includes a plurality of lights 806 (e.g. LEDs) mounted on both sides of a circuit board 805 between the protruding surfaces 626, 632 to enable light to emanate through both protruding surfaces 626, 632 without being obstructed by the circuit board 805.

In this example, the plurality of lights 806 associated with the light emitter 804 includes an array of lights 807 and one or more additional lights 808 distinct from the array of lights 807. In the illustrated example of FIG. 8, the array of lights 807 includes two sets of lights 809*a-b* positioned on either side of the circuit board 805 with each set of lights arranged in two rows 810*a-d* having a chevron shape similar to the lights 208 shown and described in FIGS. 2-5. The sets of lights 809*a-b* in the array of lights 807 may be arranged in a different number of rows 810*a-d* (e.g., 1 row, 3 rows, 4 rows, etc.) having a chevron shape. In other examples, other shapes are possible. In some examples, the housing 614 surrounding the array of lights 807 has a shape corresponding to the shape of the array of lights 807. That is, as shown in the illustrated example, the portion of the housing 614 associated with the two protruding surfaces 626, 632 has a pointed shape that generally corresponds to the chevron shape of the arrangement of lights in the array of lights 807.

In some examples, different ones of the rows 810*a-d* of lights in the array of lights 807 are energized or illuminated at different times. In some examples, corresponding rows 810*a-d* on both sides of the circuit board 805 are illuminated at the same time. In some examples, the rows 810*a-d* on opposite sides of the circuit board 805 are illuminated at different times. For instance, in some examples, all of the lights on one side of the circuit board 805 are illuminated and, thereafter, all of the lights on the other side of the circuit board 805 are illuminated. In other examples, only one row 810*a-d* of lights is energized or illuminated at a time. That is, in some examples, a first row 810*a* of light on a first side of the circuit board 805 is illuminated followed by a first row 810*c* of lights on the second side of the circuit board. Thereafter, the second row 810*b* of lights on the first side of the circuit board 805 is illuminated followed by a second row 810*d* of lights on the second side of the circuit board before the process is repeated. Illuminating different ones of the rows 810*a-d* of lights at any given time enables the traffic alert device 112 to operate with relatively low power consumption and/or to ensure power consumption remains relatively low even when the lights are being energized.

In some examples, rather than two sets of lights 809*a-b* in separate rows 810*a-d* (on either side of the circuit board 805), all of the lights in the array of lights 807 may be arranged in a single plane. In some such examples, the circuit board 805 is constructed so as not to obstruct light emitting from the array of lights 807 in opposite directions away from both sides of the circuit board 805 and through both protruding surfaces 626, 632 on the front and back of the traffic alert device 112. For instance, the lights 806 in the array of lights 807 may extend beyond an edge of the circuit board 805. Additionally or alternatively, the lights 806 in the array of lights 807 may be positioned within openings or holes that extend through the circuit board 805.

As noted above, in some examples, the light emitter 804 includes one or more additional lights 808 spaced apart from the array of lights 807. In some examples, the one or more additional lights 808 includes at least one light on either side of the circuit board 805 so that the lights 808 are visible through the protruding surfaces 626, 632 on both the front and back portions 616, 618 of the housing 614. In other examples, there is only one additional light 808. In some examples, the one or more additional lights 808 emit a different color of light than the lights 806 in the array of lights 807 to distinguish the meaning of a light signal produced by the different lights. More particularly, in some examples, the array of lights 807 are illuminated or energized to indicate the presence, movement, and/or direction of movement of a detected object (e.g., approaching traffic) whereas the one or more additional lights 808 are illuminated or energized to indicate detection of vibrations that exceed a threshold (e.g., indicative of an impact event) or that the device is powered and functioning. In some examples, the one or more additional lights 808 emit an amber light, whereas the array of lights 807 emit a red light. In other examples, any other color can be implemented for either type of light. Alternatively or in addition, the light 808 can flash on and off in a pattern that is indicative of a condition of the device or the surroundings as described above.

In some examples, it may be desirable to mount the traffic alert device 112*o* to a wall or other flat surface. Accordingly, in some examples, the mounting surface 624 includes one or more protrusions or pegs 634 spaced apart from the stepped surface 628 with ends that substantially align with the protruding surface 626. When the housing is to be mounted to a wall or other flat surface, both the protrusions 634 and the protruding surface 626 may engage the wall, thereby keeping the housing 614 parallel with the wall to provide aesthetic appeal and a secure mount. In some examples, the protrusions 634 are spaced apart from the stepped surface 628 by a distance that is at least as great as a typical post 202 of a rack 102 (if the post 202 is too wide the protrusions 534 may be cut off to provide for a flush mount). In some examples, the housing 614 may be attached to a wall by first mounting the back portion 618 using threaded fasteners extending through holes 636 in the back portion 618. Once the back portion 618 has been mounted to the wall, the front portion 616 may be attached to the back portion via the fasteners 622.

The front portion 616 of the housing 614 may similarly be removed from the back portion 618 of the housing 614 while the back portion 618 remains attached to a metal support structure using the magnets 630. In this manner, a user can easily access the inside of the housing to adjust or calibrate the internal components while the back portion 618 remains in place. More particularly, the example traffic alert device 112*o* includes a directional motion sensor 812 positioned inside the housing 614 between the front and back portions 616, 618. In some examples, a sensitivity adjustment dial 814 enables the sensitivity and/or the associated detection range of the sensor 812 to be adjusted (e.g., increased or decreased) depending on the particular application and location in which in the traffic alert device 112*o* is being implemented. Further, as shown in the illustrated example of FIG. 8, the motion sensor 812 is supported by a gimbal system that enables the sensor 812 to be rotatably adjusted about two axes substantially perpendicular to one another (e.g., rotational movement is represented by the two arrows in FIG. 8 identified by reference numerals 816, 818). With the back portion 618 of the housing 614 capable of being mounted in position before the front portion 616 is attached enables the sensor 812 to be precisely adjusted according to the particular position in which the sensor 812 is going to be relative to the surrounding environment. As a result, the sensor 812 can be adjusted to monitor for traffic in a desired area relative to the housing 614 and, more particularly, relative to the protruding surfaces 626, 632 through which the light is emitted.

To detect movement at any given point in time, the directional motion sensor 812 needs to be powered and in operation at all times. However, to conserve power, in some examples, the directional motion sensor 812 toggles between and on and off (or low power sleep) state as needed to detect the movement and, more particular, the direction of movement of an object in the area to be monitored. In some such examples, the motion sensor 812 is activated or triggered to the on state by feedback from a separate relatively low power sensor 820 monitoring the same area. In some examples, the relatively low power sensor 820 consumes less power than the directional motion sensor 812 because, while it can detect motion, the low power sensor 820 cannot detect the direction or speed of motion. An example low power sensor is a passive infrared (PIR) sensor. In some examples, the low power sensor 820 is always on and triggers activation of the higher power directional motion sensor 812 in response to the detection of motion. Once activated, the directional motion sensor 812 can determine the direction and/or speed of any detected motion. Once no motion has been detected for a threshold period of time (e.g., 1 second, 2 seconds, etc.), the directional motion sensor 812 deactivates while the low power sensor 820 remains active, thereby reducing the overall amount of power consumed. In some examples, the low power sensor 820 may deactivate while the directional motion sensor 812 is active to further reduce power consumption. In some examples, the low power sensor 820 is omitted and the directional motion sensor 812 is maintained in a powered on state during normal operations.

As shown and described, the example traffic alert devices 112 are constructed to be mounted to a metal support structure (e.g., a post of a rack 102) using magnets 630 in a manner that results in a portion of the housing 614 protruding outward from the support structure. While this protruding signaling portion facilitates the visibility of the housing and illuminated lights associated with a surface on the protruding signaling portion, the protruding signaling portion may also create a risk for the device 112 being knocked off the support structure. Using magnets 630 to attach the device 112 to the support structure enables the device 112 to be knocked free from the support structure without being damaged as may occur if the device 112 was securely fixed to the support structure (e.g., by threaded fasteners or other rigid connection). However, in some examples, the devices 112 are mounted at approximately eye-level to increase visibility. As such, knocking one of the traffic alert devices 112 off of its support structure may result in the device falling from a considerable height, thereby risking damage to the device when it hits the ground. Accordingly, in some examples, in addition to mounting the traffic alert devices 112 using magnets 630, a first end of a flexible elongate member is anchored to the device 112 and a second end of the flexible elongate member is anchored to the support structure independent of the magnets 630. In some examples, the flexible elongate member is long enough to allow the traffic alert device 112 to be knocked off or breakaway from the support structure but short enough to catch the traffic alert device 112 before hitting the ground once knocked off from its magnetic support. The flexible elongate member may be a strap, a chain, a wire, a cable, a cord, a lanyard, and/or any other suitable material. In some examples, the flexible elongate member is spring tensioned or elastic to enable the flexible elongate member to vary in length. Providing spring tension or elasticity in the flexible elongate member can also reduce an impact on the anchoring points at either end of the flexible elongate member. Example attachment mechanisms are shown and described below in connection with FIGS. 10-16.

In the illustrated example of FIGS. 6A-F, 7A, 7B, 8, and 9, all of the electrical components are within a single housing 614. However, in some examples, the light emitter 804 may be in a separate housing from the motion sensor 812 and/or other electrical components. More particularly, in some examples, the motion sensor 812 and associated electrical components may be housed within an internal channel of a leg or post of the rack 102 with the light emitter 804 in a separate enclosure that is to mount to and protrude from the exterior of the rack post. In some examples, the traffic alert device can be configured and mounted substantially within the footprint of a rack or support structure (outside one or both aisles defining an intersection), and particularly, such that all but the protruding signaling portion extends outside of the footprint of the support structure or into an aisle. In some examples, the traffic alert devices may additionally or alternatively include an audible signal generator (e.g., a speaker, a horn, etc.) to emit an audible signal in response to the detection of oncoming traffic.

Figure 10:
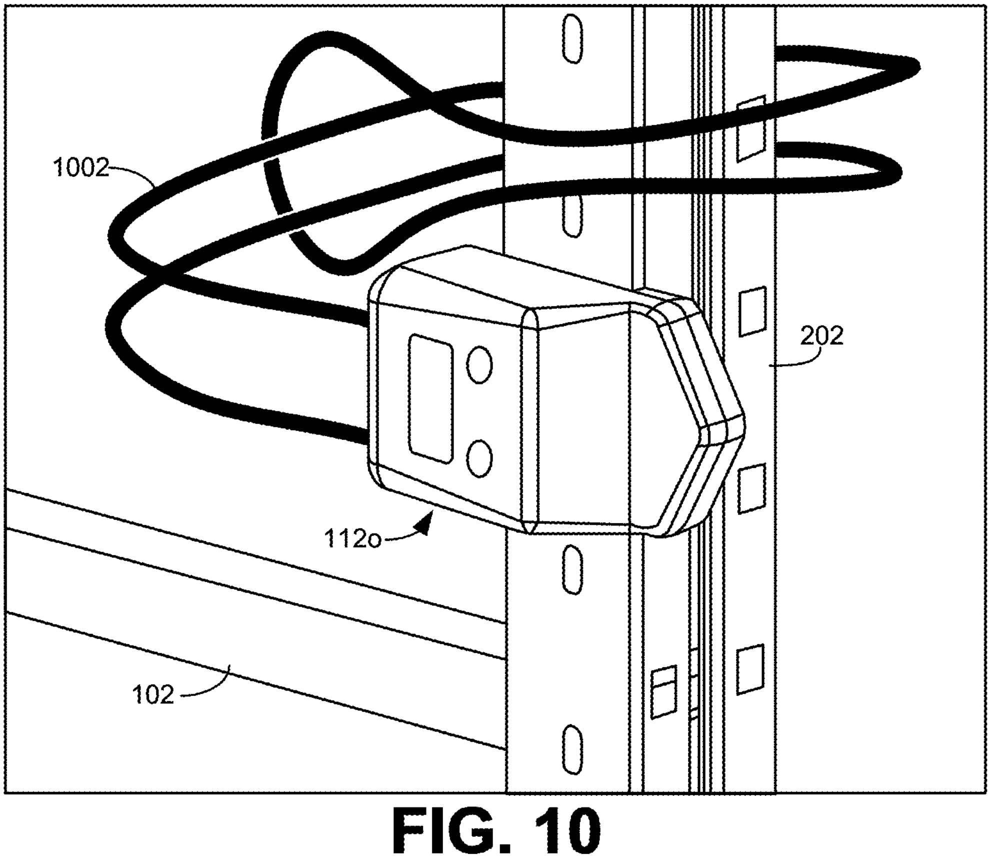
FIG. 10 illustrates the example traffic alert device of FIGS. 6A-F, 7A, 7B, 8, and 9 with an example cord or lanyard looped around a rack in accordance with teachings disclosed herein.

FIG. 10 illustrates the example traffic alert device 112*o* of FIGS. 6A-F, 7A, 7B, 8, and 9 with an example flexible elongate member 1002 (e.g., a cord, strap, lanyard, etc.) looped around a leg or post 202 of a rack 102 in accordance with teachings disclosed herein. In this example, both ends of the elongate member 1002 are attached to the traffic alert device 112 to form a loop that is wrapped around the post 202 as shown in FIG. 10. In some examples, the elongate member 1002 is tightened around the post 202 such that the elongate member is slack between the portion looped around the post 202 and the ends of the elongate member 1002 attached to the traffic alert device 112*o*. That is, the elongate member 1002 does not support the traffic alert device 1120 during normal operations. Rather, the traffic alert device 112*o* is supported by the magnets 630 being attracted to the post 202 as described above. However, if the traffic alert device 112*o* is knocked off the post 202, the elongate member 1002 will catch the traffic alert device 112*o* before it hits the ground. While the elongate member 1002 is shown wrapped around the post 202, in other examples, the elongate member 1002 can alternatively be wrapped around any other suitable structure.

Figure 11:
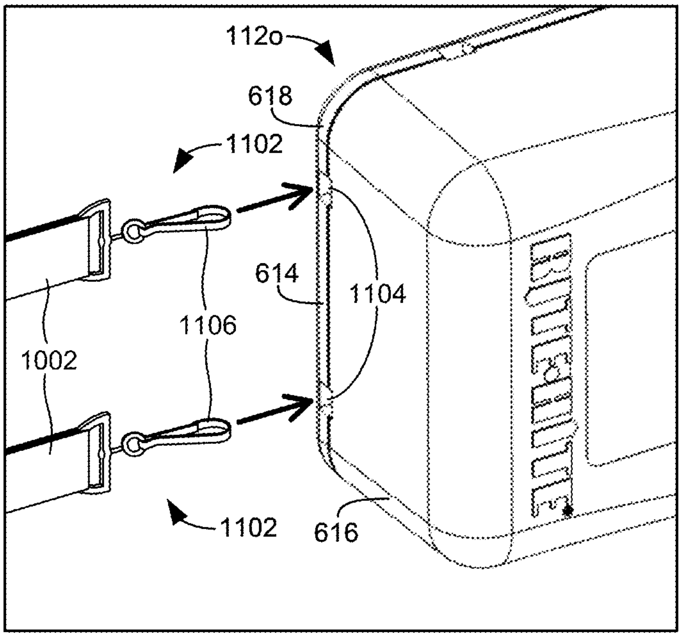
FIG. 11 illustrates an example coupling mechanism between the cord and traffic alert device of FIG. 10.

FIG. 11 illustrates an example coupling mechanism between the elongate member 1002 and traffic alert device 112*o* of FIG. 10. Specifically, in this example, the elongate member 1002 includes two ends 1102 that extend through openings 1104 in the housing 614. Each end 1102 includes a respective stop member 1106 (e.g., a clip, a clasp, a hook, etc.) that is dimensioned to be larger than the openings 1104 so as to be retained in the housing 614. In some such examples, the ends 1102 of the elongate member 1002 are positioned within the openings 1104 by separating the front and back portions 616, 618 of the housing, inserting the elongate member 1002, and fastening the front and back portions 616, 618 together again.

Figure 12:
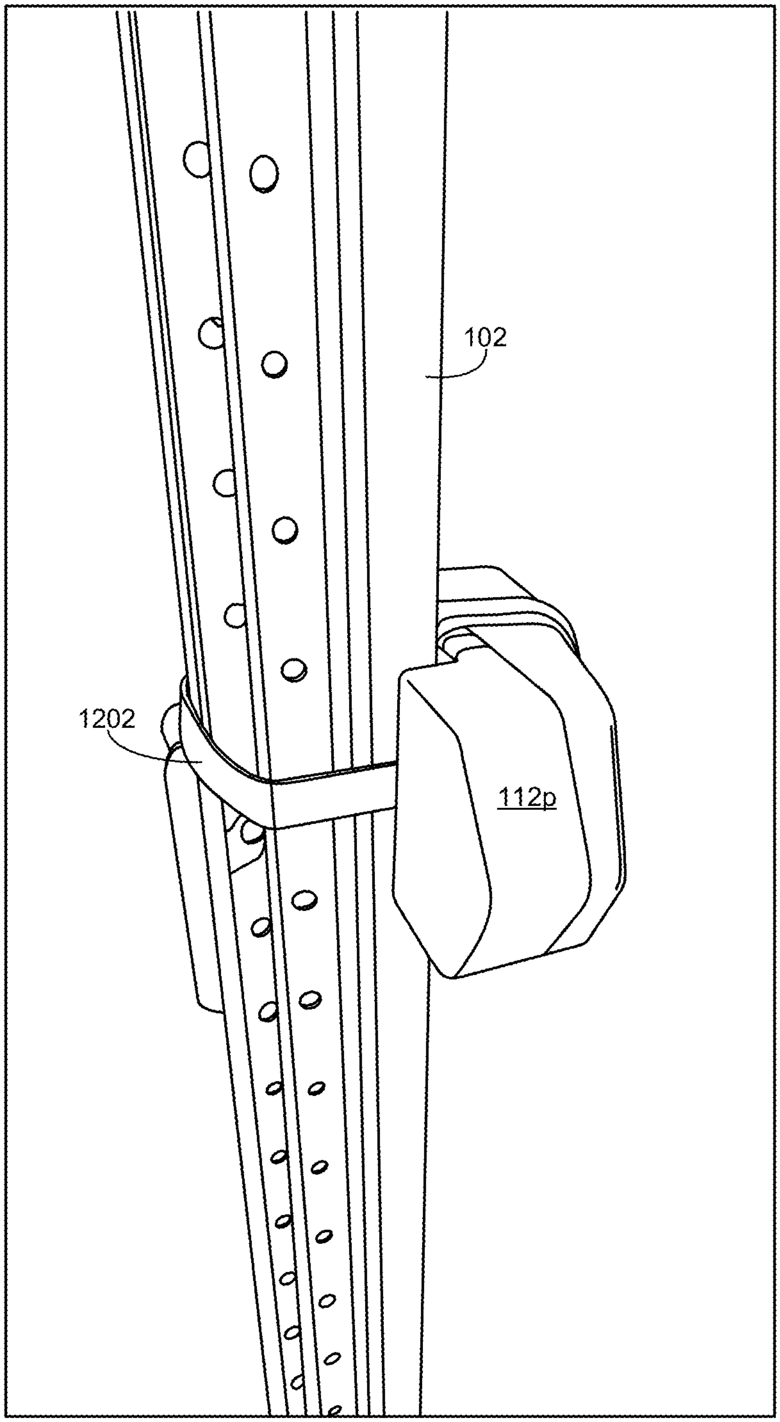
FIGS. 12-16 illustrate another example traffic alert device constructed in accordance with teachings disclosed herein.
Figure 13:
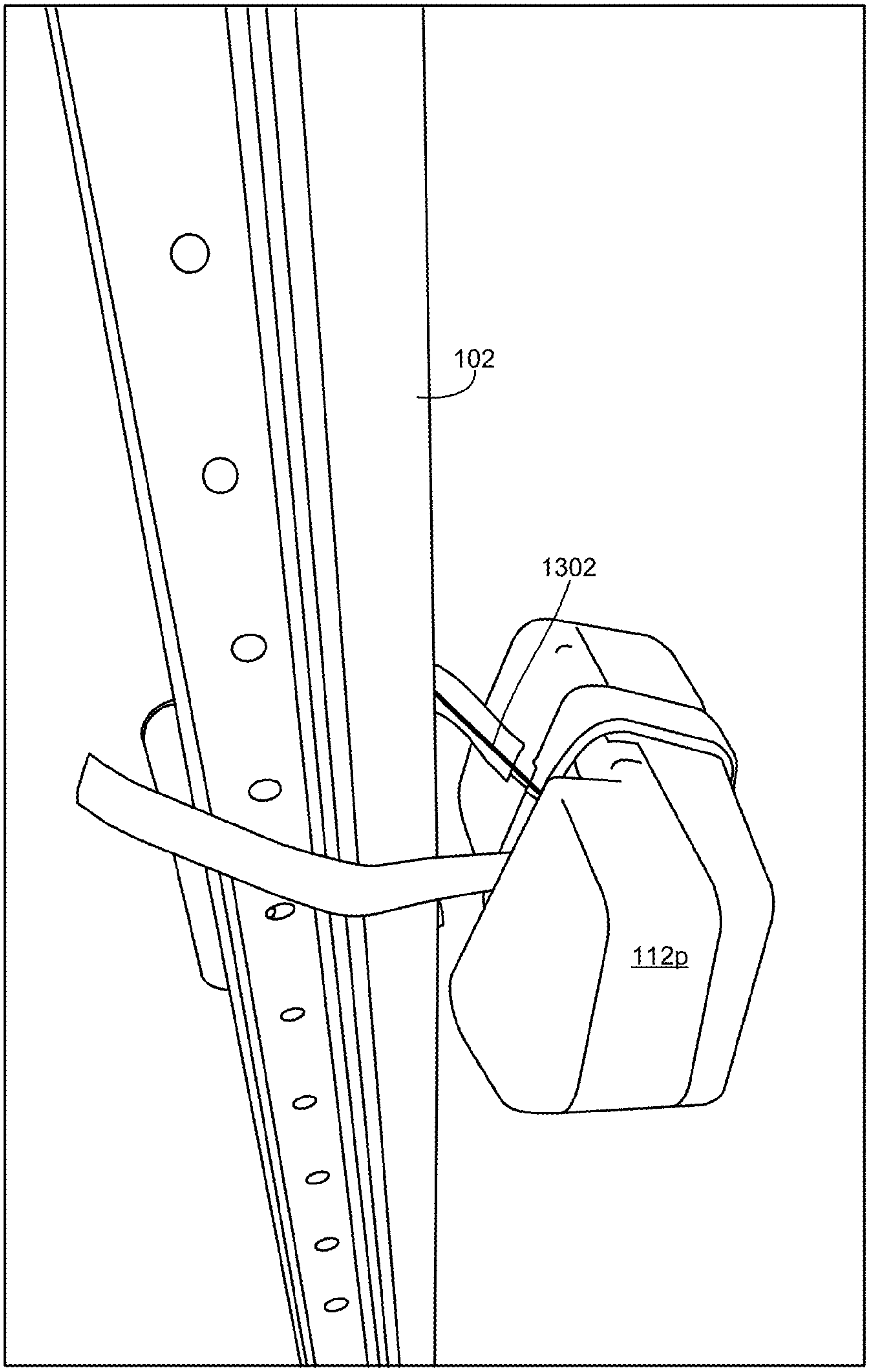
Figure 14:
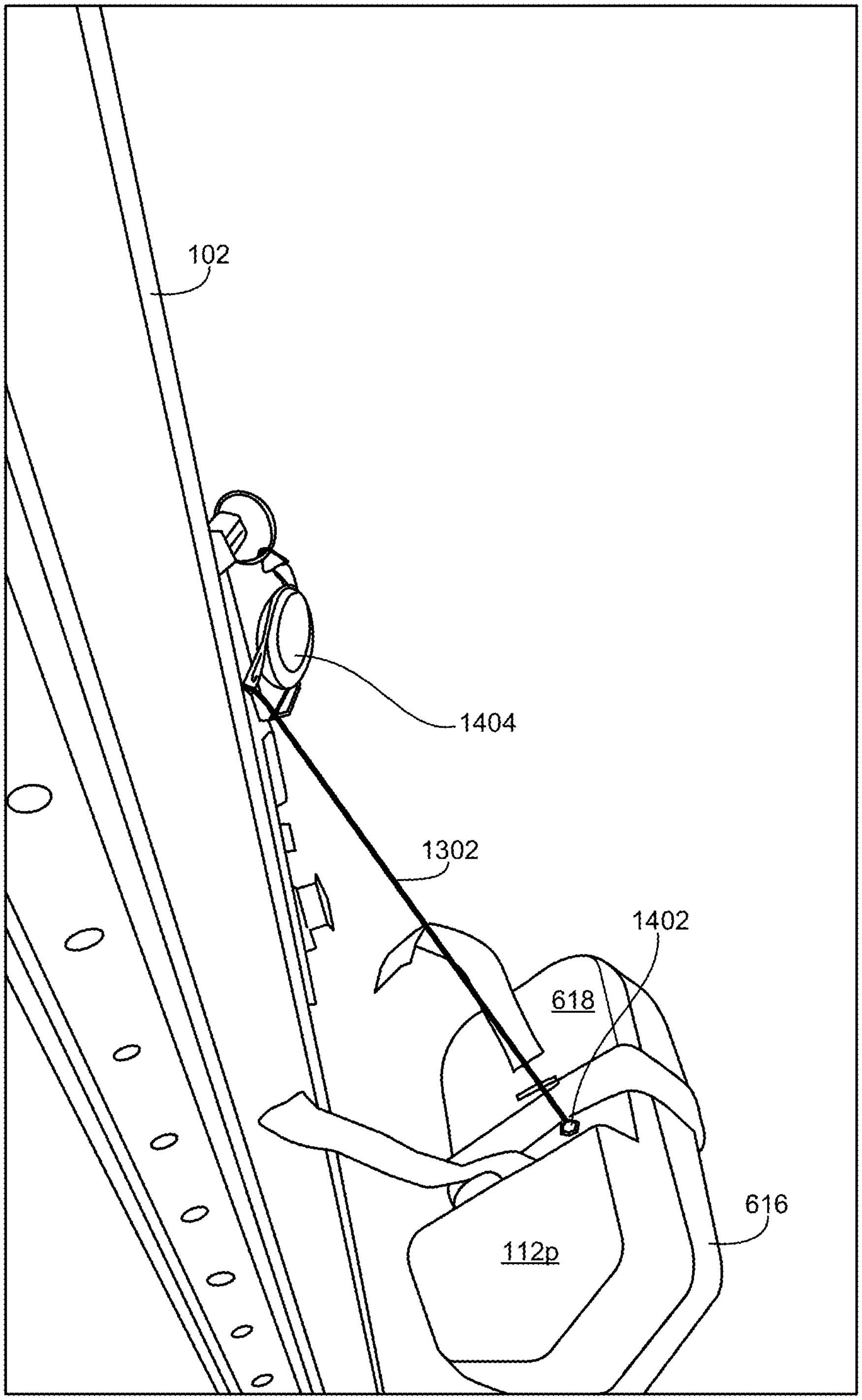
Figure 15:
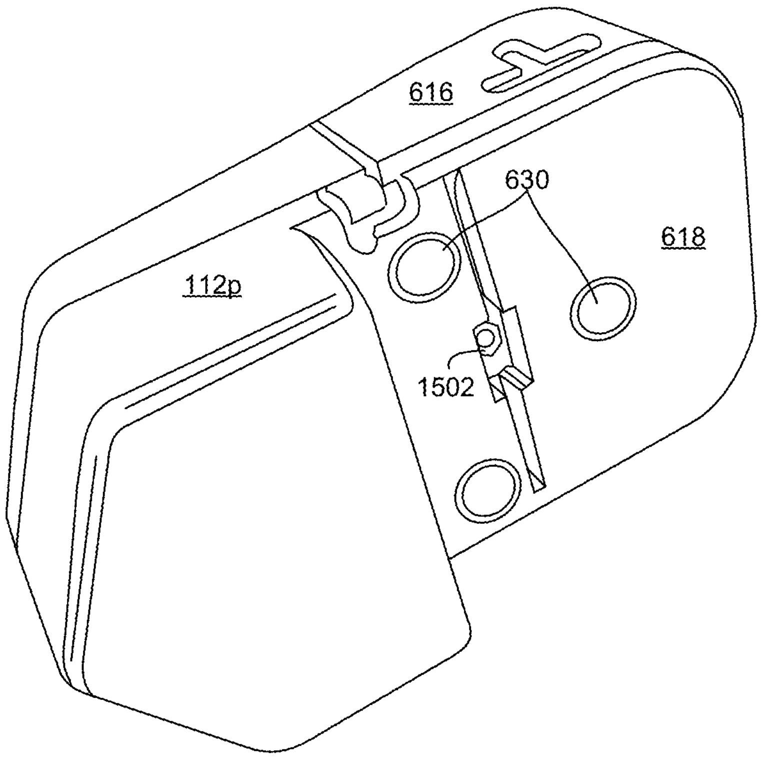

FIGS. 12-16 illustrate another example traffic alert device 112*p* with an elongate member to prevent the device 112*p* from falling to the ground if it is knocked off of a post 202 of a rack 102. FIG. 12 illustrates the example traffic alert device 112*p* mounted to a post of a rack 102 using magnets 630 (FIG. 15). Further, in this example, the traffic alert device 112*p* is held against the rack 102 using a strap 1202 having a hook and loop fastener. FIG. 13 illustrates a simulation of the traffic alert device 112*p* being knocked off the rack 102. As shown in the illustrated example, a flexible member 1302 (e.g., a cord) extends between the traffic alert device 112*p* and the rack 102. As a result, when the traffic alert device 112*p* falls, the flexible member 1302 will extend until it becomes taut, as represented in FIG. 14, thereby arresting the fall of the traffic alert device 112*p*.

Figure 16:
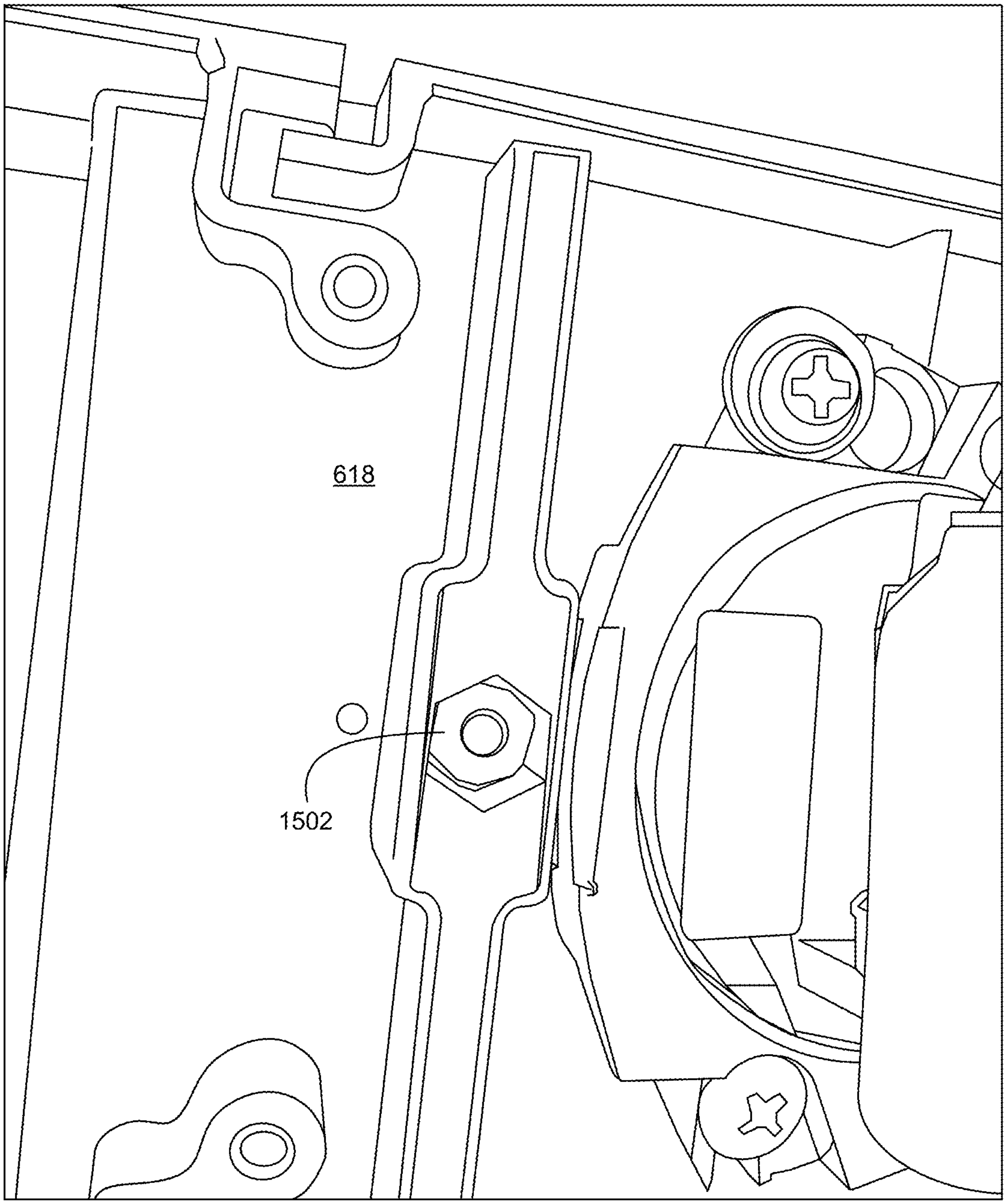

The ends of the elongate member 1302 may be anchored to the traffic alert device 112*p* and the support structure using any suitable means (e.g., hooks, threaded fasteners, devises, pins, carabiner, welding, etc.). In the illustrated example, the elongate member 1302 is anchored to the traffic alert device 112*p* via a threaded fastener 1402 engaged with a nut 1502 secured (e.g., molded) within the housing 614 underneath the back portion 618 of the traffic alert device 112*p*. FIG. 16 shows the inside surface of the back portion 618 with the nut 1502 positioned therein. In some examples, as shown in FIG. 15, the nut 1502 is accessible from an exterior of the housing 614 to enable attachment or removal of the elongate member 1302 without having to disassemble the traffic alert device 112*p*. As shown in FIG. 14, the flexible member 1302 includes a spring tensioned reel 1404 to enable the elongate member 1302 to extend as the traffic alert device 112*p* falls while exerting a force on the elongate member 1302 to slow the descent of the traffic alert device 112*p*.

In some examples, the traffic alert devices 112 disclosed herein may be battery operated because high voltage power sources are typically not available on racks 102 in material handling facilities 100 and/or running wiring to provide such power sources is impractical. However, battery operated devices may stop working before batteries are changed, thereby creating a potentially hazardous situation. Furthermore, checking and replacing and/or recharging batteries can be time consuming and cost prohibitive, particularly when many (e.g., tens or hundreds) traffic alert devices 112 are being employed. This is especially significant for traffic alert devices 112 that include directional motion sensors based on microwave time-of-flight analysis because such sensors are active and always transmitting and, therefore, consume much more power than a passive infrared sensor (which cannot determine the direction of traffic). Accordingly, in some examples, the traffic alert devices 112 are capable of being powered by a scalable low voltage direct current (DC) power bus.

Figure 17:
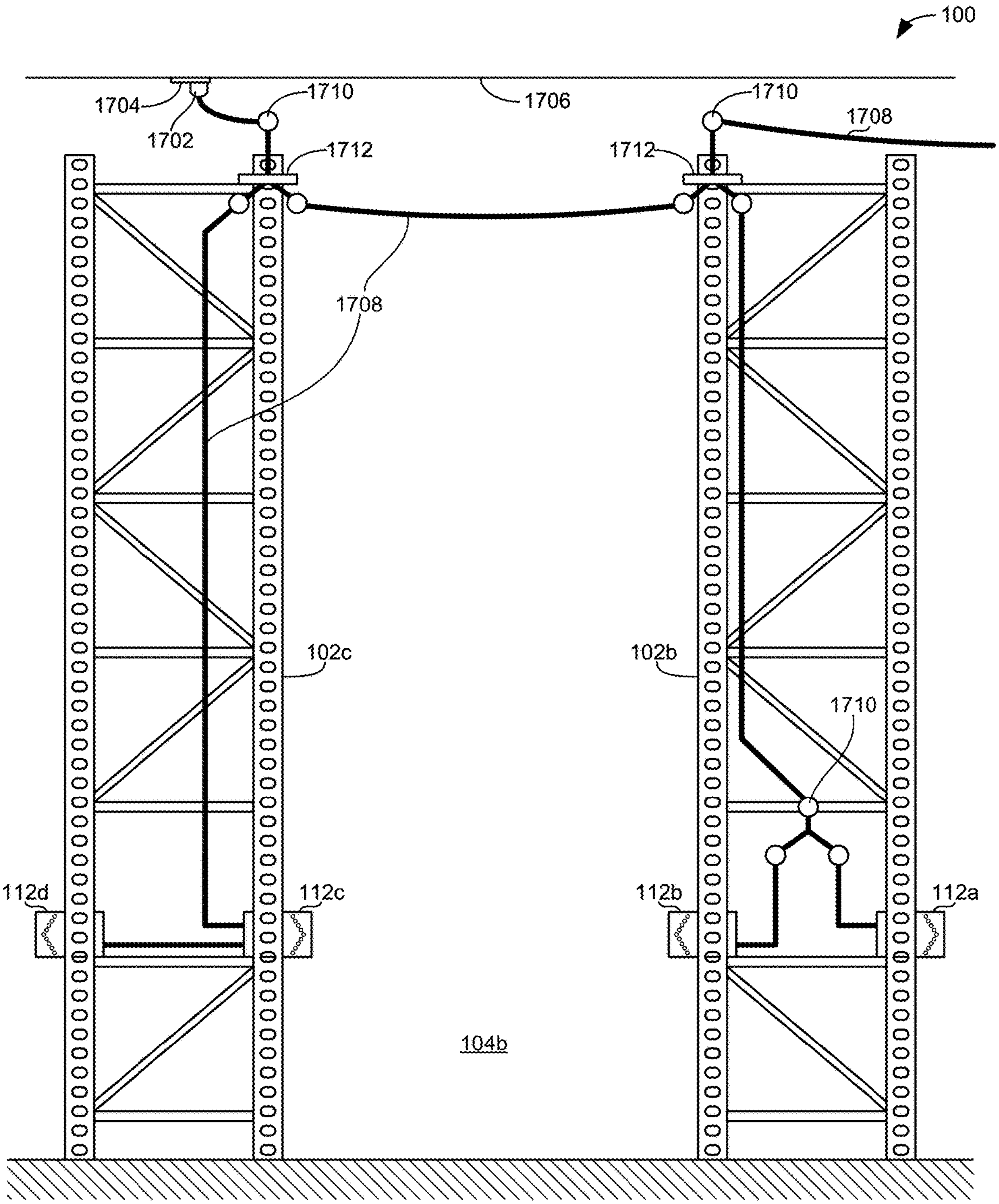
FIG. 17 is a cross-sectional view of the material handling facility taken along the line 17-17 of FIG. 1.

FIG. 17 is a cross-sectional view of the second and third racks 102*b*, 102*c* taken along the line 17-17 of FIG. 1 showing example wiring of the first, second, third, and fourth traffic alert devices 112 of FIG. 1. As shown in the illustrated example, all four traffic alert devices 112 are powered from a single power adapter 1702 plugged into an alternating current (AC) outlet 1704 in the ceiling 1706 of the material handling facility 100. In this example, low voltage wires or power cords 1708 carry power (e.g., 24 VDC) from the power adapter 1702 to each of the four traffic alert devices 112. Further, as shown by the low voltage wire 1708 extending to the right of the drawing, additional traffic alert devices 112 may also be powered from the same AC outlet 1704 power source. Although the wires 1708 are shown being draped from the tops of adjacent ones of the racks 102, in some examples, the wires 1708 may be secured to and extend along the ceiling 1706 to span the distance between the racks 102. In some examples, the traffic alert devices 112 are designed such that up to fourteen devices 112 are powered from a single AC outlet 1704. In some examples, different branches in the low voltage wires 1708 may be interconnected using low voltage plug-in modular power splitters 1710. Using low voltage wires 1708 and low voltage power splitters 1710 to carry power to multiple traffic alert devices 112 in this manner is significantly easier to install and maintain and generally safer than running high voltage (e.g., 120V) wiring to each rack 102. In some examples, the wires 1708 may be coupled to the rack 102 using tie bands 1712 and/or any other suitable securing mechanism. In addition to the time and expense of running high voltage wiring, the low voltage wires 1708 of the illustrated example also eliminate the need to maintain (e.g., recharge and replace) batteries on an ongoing basis.

As shown in the illustrated example, the first and second traffic alert devices 112*a*, 112*b*, independently couple to the power source via a power splitter 1710. Additionally or alternatively, in some examples, each traffic alert device 112 includes an input power connector and an output power connector to enable different devices 112 to be electrically coupled in a daisy chain configuration. For example, as shown in FIG. 17, the third traffic alert device 112*c* is directly coupled to the power source. However, the fourth traffic alert device 112*d* is indirectly coupled to the power source via the third traffic alert device 112*d*. In some examples, an additional wire 1708 could be connected to the output power connector of the fourth traffic alert device 112*d* to power a further traffic alert device 112.

Figure 18:
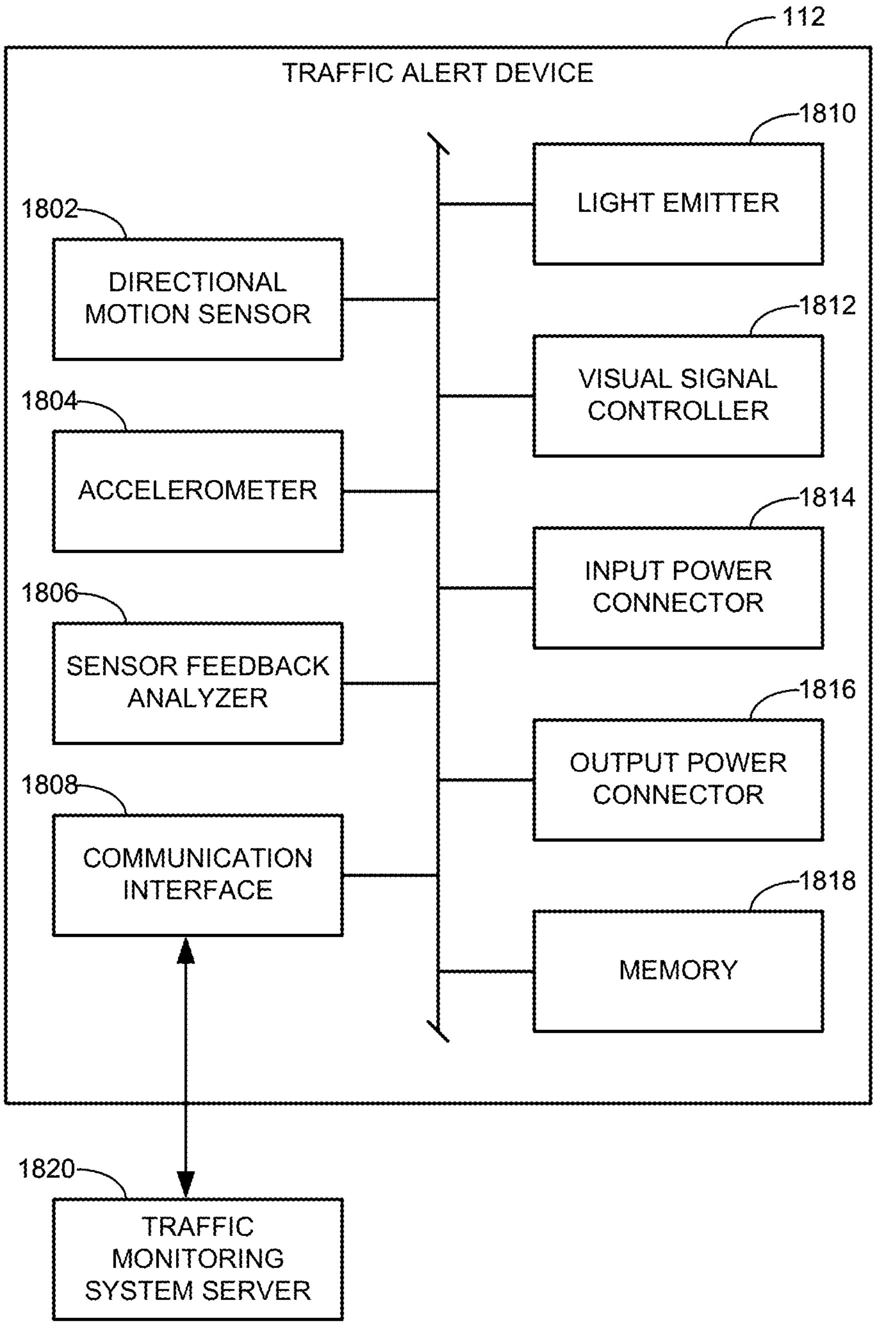
FIG. 18 is a block diagram illustrating an example traffic alert device, which may correspond to any one of the example traffic alert devices of FIGS. 1-17.

FIG. 18 is a block diagram illustrating an example traffic alert device 112, which may correspond to any one of the traffic alert devices disclosed herein. The example traffic alert device 112 of FIG. 18 includes an example directional motion sensor 1802, an example accelerometer 1804, an example feedback analyzer 1806, an example communication interface 1808, an example light emitter 1810, an example visual signal controller 1812, an example input power connector 1814, an example output power connector 1816, and example memory 1818.

The example directional motion sensor 1802 is any motion sensor capable of performing the functions described above in connection with FIGS. 1-17. Thus, the motion sensor 1802 is capable of detecting the direction of movement of an object detected within the field of detection of the sensor. In some examples, the motion sensor 1802 sensor is capable of detecting the speed of the object. In some examples, the motion sensor 1802 sensor is capable of detecting the distance of the object. In some examples, the motion sensor 1802 is capable of detecting the type of object (e.g., vehicle versus pedestrian) or at least the size of the object from which the type of object may be inferred.

Figure 19:
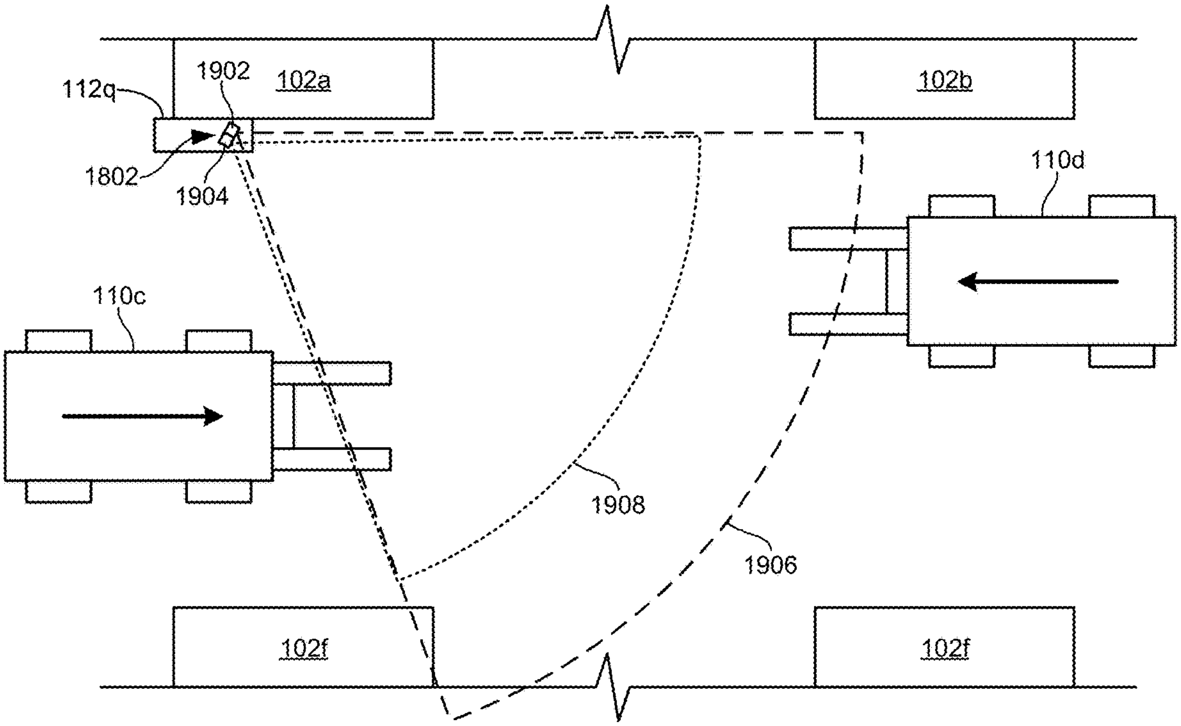
FIG. 19 illustrates another example traffic alert device constructed in accordance with teachings disclosed herein.

More particularly, in some examples, the motion sensor 1802 includes a microwave sensor that determines direction of detected movement based on a time-of-flight analysis of the microwave signal. While a single passive infrared (PIR) sensor cannot be used to determine direction, in some examples, the motion sensor 1802 includes at least two PIR sensors used in combination to determine whether the motion of a detected object is approaching the traffic alert device 112 or moving away from the device. More particularly, FIG. 19 illustrates an example traffic alert device 112*q* attached to the corner of the first rack 102*a* of the material handling facility 100 of FIG. 1. In this example, the traffic alert device 112*q* includes a directional motion sensor 1802 that includes two PIR sensors 1902, 1904. As represented in the illustrated example of FIG. 19, the PIR sensors 1902, 1904 are arranged to monitor motion in respective first and second zones 1906, 1908 with substantially all (e.g., 95%, 98%, 100%) of the second zone 1908 being overlapped by the first zone 1906. Further, in some examples, the angle of the field of detection of the first and second zones 1906, 1908 is substantially (e.g., 95%, 98%, 100%) the same and oriented in the same direction. However, the first PIR sensor 1902 is constructed with a longer range than the second PIR sensor such that the first zone 1906 extends farther from the traffic alert device 112*q* than the second zone 1908.

The different motion detection zones 1906, 1908 of the two PIR sensors 1902, 1904 of the example motion sensor 1802 of FIG. 19 enable the traffic alert device 112*q* to infer the direction of traffic based on the timing at which each sensor 1902, 1904 detects motion. For instance, based on the alignment and overlap of the two zones 1906, 1908, a third fork truck 110*c* enters both zones at approximately the same time when moving past the traffic alert device 112*q* (e.g., towards the right in FIG. 19) such that both PIR sensors 1902, 1904 will detect the fork truck 110*c* at approximately the same time. By contrast, based on the first zone 1906 having a longer range than the second zone 1908, a fourth fork truck 110*d* enters the first zone 1906 before entering the second zone 1908 when approaching the traffic alert device 112*q* from the opposite direction (e.g., moving towards the left in FIG. 19). As a result, the first PIR sensor 1902 will detect the fourth fork truck 110*d* before the second PIR sensor 1904. Accordingly, if both PIR sensors 1902, 1904 detect motion at approximately the same time (e.g., within a relatively small threshold period of time (e.g., 500 ms, 250 ms, 100 ms, 50 ms) depending on how precisely the two zones 1906, 1908 are aligned), the traffic alert device 112*q* may infer that the detected motion corresponds to an object that is moving past, and thus, away from the device 112*q*. By contrast, if the first PIR sensor 1902 detects motion before the second PIR sensor 1904 by more than the threshold period of time, the traffic alert device 112*q* may infer that the detected motion corresponds to an object that is moving towards the device 112*q*. Further detail regarding the implementation of the example traffic alert device 112*q* of FIG. 19 is provided below in connection with FIG. 20.

An advantage to using PIR sensors over microwave sensors is that PIR sensors consume substantially less power. Accordingly, implementing the example traffic alert device 112*q* of FIG. 19 with two PIR sensors 1902, 1904 can be implemented with greater power efficiency. As a result, the traffic alert device 112*q* of FIG. 19 with two PIR sensors 1902, 1904 may be powered by a battery much more cost effectively than a device that uses microwave sensors. While two PIR sensors configured as described above improves power efficiency, such motion sensing systems cannot differentiate between multiple objects entering the sensing zones 1906, 1908 simultaneously. That is, assuming the third fork truck 110*c* is detected first, the traffic alert device 112*q* will determine that the object is moving away from the device 112*q*. However, if the fourth fork truck 110*d* enters the sensing zones 1906, 1908 before the third fork truck 110*c* leaves the zones, there is no direct way for the device 112*q* to recognize that a new fork truck has entered the zones and is approaching the traffic alert device 112*q*.

In some examples, to overcome the above limitations of the two PIR sensor system while still reducing power consumption, the traffic alert device 112*q* includes one PIR sensor and one microwave directional sensor. In some such examples, the microwave sensor is maintained in a low power sleep state until triggered by feedback of the PIR sensor. That is, in some examples, the PIR sensor is always monitoring the relevant area near the traffic alert device 112*q*

(e.g., the first zone 1906). As mentioned above, a single PIR sensor cannot determine the direction of detected motion. However, in some examples, when the PIR sensor detects motion, the PIR sensor activates the microwave sensor to determine the direction of motion of object(s) in the relevant area. Once motion is no longer detected in the relevant area, the microwave sensor deactivates and reverts to the low power sleep mode. In this manner, the higher power microwave sensor is only active when motion is detected but remains in a low power state the rest of the time, thereby reducing power consumption.

Returning to FIG. 18, the example traffic alert device 112 of FIG. 18 includes the accelerometer 1804 to monitor vibrations to which the device 112 is subjected. In this manner, feedback from the accelerometer 1804 may be used to identify abnormal oscillations and/or vibrations (relative to normal or baseline measurements of the oscillations and/or vibrations) in the rack 102 on which the traffic alert device 112 is mounted indicative of an impact with the rack 102 or the device 112. The normal or baseline measurements may include the oscillations and vibrations associated with a fork truck or other vehicle simply driving past the rack 102 as well as the typical operations of placing pallets on the rack and removing pallets from the rack. In some examples, these baseline measurements are stored in the example memory 1818. In some examples, the accelerometer 1804 is a three-axis accelerometer. In some examples, the detection of an impact event may trigger a specific pattern of lights in the light emitter 1810 to turn on, flash, or otherwise become activated to indicate the impact event. In some examples, one or more lights are designated specifically to indicate potential impact events. In some such examples, such lights may have a different color than the other lights used to indicate the presence, movement, and/or direction of movement of a detected object. For instance, as described above in connection with FIG. 8, in some examples, the one or more additional lights 808 may be illuminated or energized to indicate detection of vibrations that exceed a threshold. In some examples, multiple different impact thresholds are defined corresponding to different levels of vibrations and/or oscillations above the baseline to indicate different degrees of severity of a potential impact. In some examples, different light signals (e.g., different flashing patterns) can be generated in response to which of the different impact thresholds is satisfied (e.g., exceeded). In some examples, a light signal emitted in response to a detected impact event remains on for a threshold period of time (e.g., 10 seconds, 30 seconds, 1 minutes, 5 minutes, 10 minutes, 30 minutes, etc.). In other examples, a light signal emitted in response to a detected impact event remains on for an indefinite period until the impact event is acknowledged by a person in order to then reset the signal.

Monitoring for rack impacts can assist in identifying racks 102 that may need to be repaired and/or checked for structural integrity (before they fail completely). Furthermore, tracking rack impacts over time can provide insights into the operations of the material handling facility 100 and traffic flow patterns therein. For example, if a particular rack 102 is frequently struck by a fork truck 110, the layout of the facility and/or procedures implemented around the rack 102 at issue may be adjusted and/or addressed to reduce such impacts in the future. Furthermore, in some examples, multiple traffic alert devices 112 may be mounted to the same rack 102 (e.g., one at each corner) providing multiple points at which the associated accelerometer of each device 112 captures a separate measurement of the vibrations of the rack 102 over time. In some examples, feedback from the accelerometers 1804 in these separate devices 112 may combined and analyzed together to pinpoint the location of a possible rack impact more precisely.

The example sensor feedback analyzer 1806 analyzes feedback from the motion sensor 1802 and/or the accelerometer 1804. For instance, in some examples, while the motion sensor 1802 detects when an object is moving, the sensor feedback analyzer 1806 analyzes the feedback to determine the direction of travel of the object and/or the speed of the object. In some examples, the sensor feedback analyzer 1806 compares feedback from the accelerometer 1804 to one or more baseline vibration signals to determine whether detected vibrations are indicative of normal circumstances or indicative of an abnormal circumstance associated with an impact with the rack 102 on which the traffic alert device 112 is mounted. In some examples, the functionality of the sensor feedback analyzer 1806 is incorporated into the motion sensor 1802 and/or the accelerometer 1804. In some examples, separate analyzers 1806 are implemented to analyze the feedback from the motion sensor 1802 and the feedback from the accelerometer 1804.

The example communication interface 1808 enables wireless radio communications with a traffic monitoring system server 1820. In some examples, the communication interface 1808 transmits outputs of the sensor feedback analyzer 1806 to the traffic monitoring system server 1820 for aggregation with similar data provided from other traffic alert devices 112 and/or other equipment (e.g., doors, barriers, etc.) in the material handling facility. In this manner, the traffic monitoring system server 1820 can analyze operations throughout the entire facility (or any portion thereof) to identify traffic patterns, locations of frequent rack impacts, and so forth. Additionally or alternatively, in some examples, the sensor feedback from the motion sensor 1802 and/or the accelerometer 1804 is sent directly to the traffic monitoring system server 1820 to perform analysis thereon independent of the sensor feedback analyzer 1806.

The example light emitter 1810 generates a visual signal that is viewable by a person near and generally facing the traffic alert device 112. In some examples, the light emitter 1810 includes a plurality of lights (e.g., LEDs) arranged in a particular shape as described in connection with FIGS. 1-17. In some examples, ones of the plurality of lights provide visual signals indicative of the presence, movement, and/or direction of movement of an object detected by the motion sensor 1802 while different ones of the plurality of lights provide visual signals indicative of vibrations exceeding a threshold (e.g., indicative of an impact) based on feedback from the accelerometer 1804. In other examples, the same lights may be used to indicate the presence, movement, and/or direction of movement of a detected object as well as vibrations exceeding a threshold. In some examples, the light emitter 1810 includes a graphical display screen to communicate any of the above information.

The example visual signal controller 1812 controls the operation of the example light emitter 1810. In some examples, the visual signal controller 1812 activates the light emitter 1810 in response to particular feedback from the motion sensor 1802 and/or the accelerometer 1804. Additionally or alternatively, the signal controller 1812 may activate the light emitter 1810 in response to an output of the sensor feedback analyzer 1806. Further, in some examples, the signal controller 1812 may adjust the operation of the light emitter 1810 based on feedback from one or more of the motion sensor 1802, the accelerometer 1804, and/or the sensor feedback analyzer 1806. For instance, the signal controller 1812 may control whether the light emitter 1810 generates a continuous light or a flashing light, the color and/or intensity of the light, which portion of a plurality of lights included in the light emitter 1810 are to be activated, the timing of such activation, and so forth. The example visual signal controller 1812 may adjust the operation of the light emitter 1810 to indicate different information based on the type of sensor feedback being received (e.g., indicate direction of traffic, speed of traffic, distance of traffic, size of traffic, rack impacts, power to the device, functional state of the device components, etc.)

The example input power connector 1814 enables the traffic alert device 112 to receive power. In some examples, power may be delivered over a low voltage wire 1708 that is coupled to a standard 120V, 60 Hz AC outlet 1704. The example output power connector 1816 enables a low voltage wire to connect the traffic alert device 112 to the input power connector 1814 of another traffic alert device 112, thereby delivering power to the other traffic alert device 112. In this manner, multiple traffic alert devices 112 may be electrically coupled in a daisy chain configuration.

While an example manner of implementing the traffic alert device 112 is illustrated in FIG. 18, one or more of the elements, processes and/or devices illustrated in FIG. 18 may be combined, divided, re-arranged, omitted, eliminated, and/or implemented in any other way. Further, the example directional motion sensor 1802, the example accelerometer 1804, the example feedback analyzer 1806, the example communication interface 1808, the example light emitter 1810, the example visual signal controller 1812, the example input connector 1814, the example output connector 1816, the example memory 1818, and/or, more generally, the example traffic alert device 112 of FIG. 18 may be implemented by hardware, software, firmware, and/or any combination of hardware, software and/or firmware. Thus, for example, any of the example directional motion sensor 1802, the example accelerometer 1804, the example feedback analyzer 1806, the example communication interface 1808, the example light emitter 1810, the example visual signal controller 1812, the example input connector 1814, the example output connector 1816, the example memory 1818, and/or, more generally, the example traffic alert device 112 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example directional motion sensor 1802, the example accelerometer 1804, the example feedback analyzer 1806, the example communication interface 1808, the example light emitter 1810, the example visual signal controller 1812, the example input connector 1814, the example output connector 1816, and/or the example memory 1818 is/are hereby expressly defined to include a non-transitory computer readable storage device or storage disk such as a memory, a digital versatile disk (DVD), a compact disk (CD), a Blu-ray disk, etc. including the software and/or firmware. Further still, the example traffic alert device 112 may include one or more elements, processes, and/or devices in addition to, or instead of, those illustrated in FIG. 18, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 20:
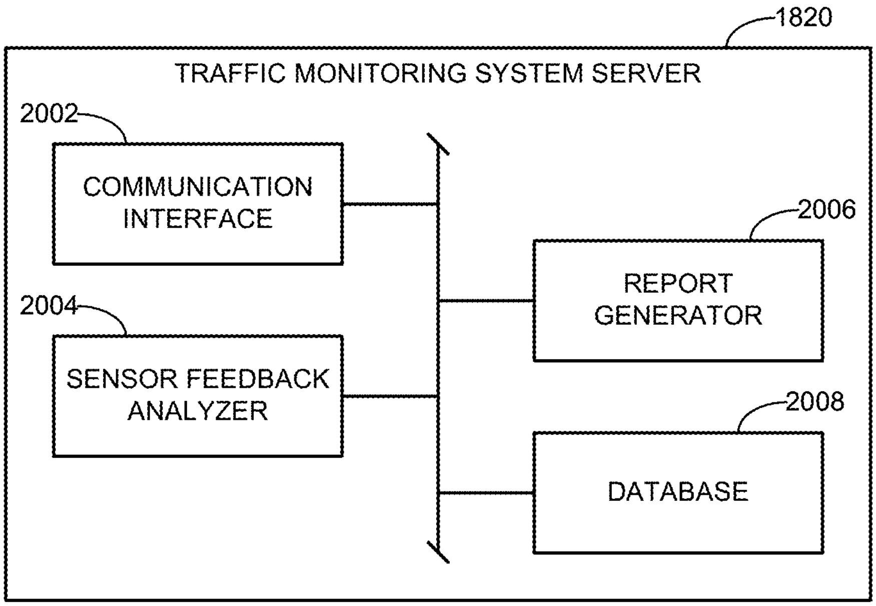
FIG. 20 is a block diagram illustrating the example traffic monitoring system server of FIG. 18.

FIG. 20 is a block diagram illustrating the example traffic monitoring system server 1820 of FIG. 18. The example traffic monitoring system server 1820 includes an example communication interface 2002, an example sensor feedback analyzer 2004, an example report generator 2006, and an example database 2008.

The example communication interface 2002 is capable of receiving wireless transmissions from the communication interface 1808 of the traffic alert device 112 of FIG. 18. In some examples, the communication interface 2002 may receive data from other types of sensors and/or controllers throughout the material handling facility 100. In this manner, the traffic monitoring system server 1820 may consolidate or aggregate disparate types of data indicative of operational states of equipment, procedures, product, and personnel throughout the facility 100. Further, in some examples, the communication interface 2002 enables communications with other computing devices within the material handling facility 100 and/or remotely located from the material handling facility 100.

The example sensor feedback analyzer 2004 of FIG. 20 may include the same functionality as the sensor feedback analyzer 1806 of FIG. 18 to analyze and/or process data provided by the motion sensor 1802 and/or accelerometer 1804 of the traffic alert device 112. Additionally or alternatively, the sensor feedback analyzer 2004 may aggregate data generated from multiple different traffic alert devices 112 and further analyze the data to identify system level patterns and/or identify trends across the entire material handling facility 100 and/or any portion thereof. As one example, briefly mentioned above, the example sensor feedback analyzer 2004 may analyze vibrations data from multiple accelerometers 1804 located at different points (e.g., different corners) on a rack 102 to determine a precise location of an impact with the rack. In some examples, the sensor feedback analyzer 2004 may timestamp collected data and store it in the example database 2008 for subsequent retrieval and/or analysis. In some examples, the sensor feedback analyzer 2004 may analyze such historical data to identify patterns (e.g., traffic patterns) in the operation of the material handling facility 100. For example, the sensor feedback analyzer 2004 may to identify intersections with unsafe traffic patterns and/or that experience relatively high traffic flows.

The example report generator 2006 may generate alerts and/or other notifications to be transmitted to relevant personnel (via the communication interface 2002) based on outputs of the example sensor feedback analyzer 2004. For instance, the report generator 2006 may generate an alert or notification each time a rack impact is detected that is sent to one or more relevant individuals (e.g., plant manager, safety manager, industrial engineer, etc.). In some examples, the report generator 2006 (and/or the sensor feedback analyzer 2004) may keep track of the number of impacts over time. In some such examples, the report generator 2006 may generate and send out the notification when the tally satisfies a threshold. In some examples, the report generator 2006 may generate reports based on data accumulated and/or aggregated from multiple traffic alert devices 112. For instance, in some examples, the report generator 2006 may create a heat map of the material handling facility 100 that indicates traffic flows through the facility 100 and/or the frequency of impacts across the facility 100. In some examples, the report generator 2006 may generate a report indicating whether changes to traffic flow patterns have achieved intended results and/or produced unforeseen issues.

While an example manner of implementing the traffic monitoring system server 1820 of FIG. 18 is illustrated in FIG. 20, one or more of the elements, processes, and/or devices illustrated in FIG. 20 may be combined, divided, re-arranged, omitted, eliminated, and/or implemented in any other way. Further, the example communication interface 2002, the example sensor feedback analyzer 2004, the example report generator 2006, the example database 2008, and/or, more generally, the example traffic monitoring system server 1820 of FIG. 18 may be implemented by hardware, software, firmware, and/or any combination of hardware, software, and/or firmware. Thus, for example, any of the example communication interface 2002, the example sensor feedback analyzer 2004, the example report generator 2006, the example database 2008, and/or, more generally, the example traffic monitoring system server 1820 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example communication interface 2002, the example sensor feedback analyzer 2004, the example report generator 2006, and/or the example database 2008 is/are hereby expressly defined to include a non-transitory computer readable storage device or storage disk such as a memory, a digital versatile disk (DVD), a compact disk (CD), a Blu-ray disk, etc. including the software and/or firmware. Further still, the example traffic monitoring system server 1820 of FIG. 18 may include one or more elements, processes and/or devices in addition to, or instead of, those illustrated in FIG. 20, and/or may include more than one of any or all of the illustrated elements, processes and devices.

Flowcharts representative of example hardware logic circuitry, machine readable instructions, hardware implemented state machines, and/or any combination thereof for implementing the traffic alert device 112 of FIG. 18 is shown in FIGS. 21-24. The machine readable instructions may be one or more executable programs or portion(s) of an executable program for execution by processor circuitry, such as the processor 2512 shown in the example processor platform 2500 discussed below in connection with FIG. 25 and/or the example processor circuitry discussed below in connection with FIGS. 26 and/or 27. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 21-24, many other methods of implementing the example traffic alert device 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU, and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 21-24 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 21:
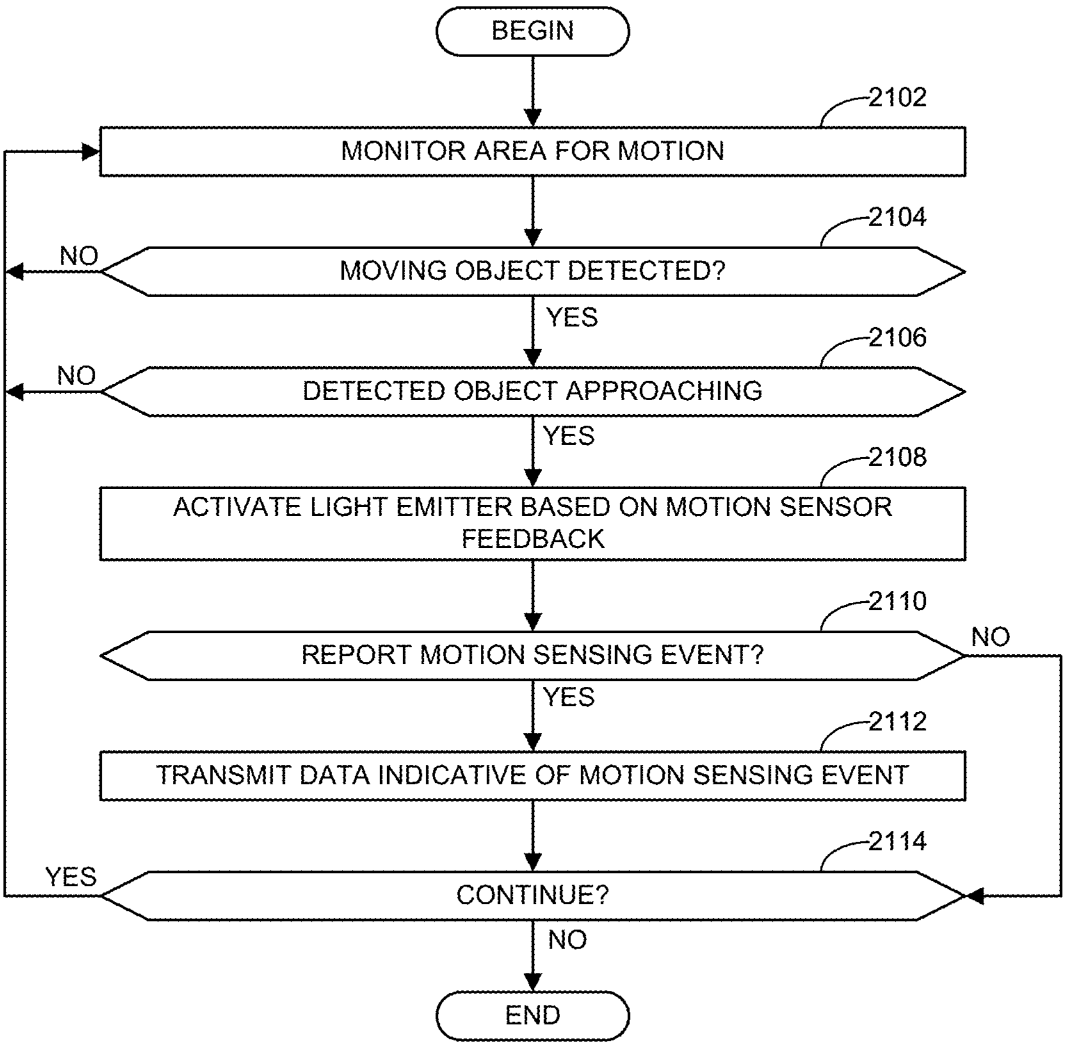
FIGS. 21-24 are flowcharts representative of example machine readable instructions which may be executed to implement the example traffic alert device of FIG. 18.

The program of FIG. 21 begins at block 2102 where the example directional motion sensor 1802 monitors an area for motion. In some examples, the particular area being monitored is based on how a user positioned the sensor within the housing 614 of the traffic alert device 112 and where the traffic alert device 112 is mounted. In some examples, the traffic alert device 112 is positioned at an intersection between two aisles 104, 106 with the light emitter 1810 positioned to be visible from an area within a first aisle. In some such examples, the area monitored by the motion sensor 1802 corresponds to a portion of the second, intersecting aisle that is not visible from the first area in the first aisle.

At block 2104, the example motion sensor 1802 determines whether a moving object is detected. If not, control returns to block 2102 to continue monitoring for motion. If an object is detected, control advances to block 2106 where the example sensor feedback analyzer 1806 determines whether the detected object is approaching. If the object is not approaching, there is no risk of a potential collision. Accordingly, control returns to block 2102. However, if the object is approaching, there is the potential for a collision. Accordingly, control advances to block 2108 where the example visual signal controller 1812 activates the light emitter 1810 based on motion sensor feedback. In some examples, the particular manner in which the light emitter 1810 and/or individual lights included in the light emitter 1810 are activated may depend on the nature of the circumstances indicated by the motion sensor feedback.

At block 2110, the example sensor feedback analyzer 1806 determines whether to report a motion sensing event. If so, control advances to block 2112 where the example communication interface 1808 transmits data indicative of the motion sensing event. In the illustrated example, the motion sensing event is only reported for objects that are detected as approaching. However, in some examples, the sensor feedback analyzer 1806 may additionally or alternatively report motion sensing events even when the detected object is moving away from the traffic alert device 112. Thereafter, control advances to block 2114. Returning to block 2110, if the motion sensing event is not to be reported, control advances directly to block 2114. At block 2114, the traffic alert device 112 determines whether to continue the process. If so, control returns to block 2102. Otherwise, the example process of FIG. 21 ends.

Figure 22:
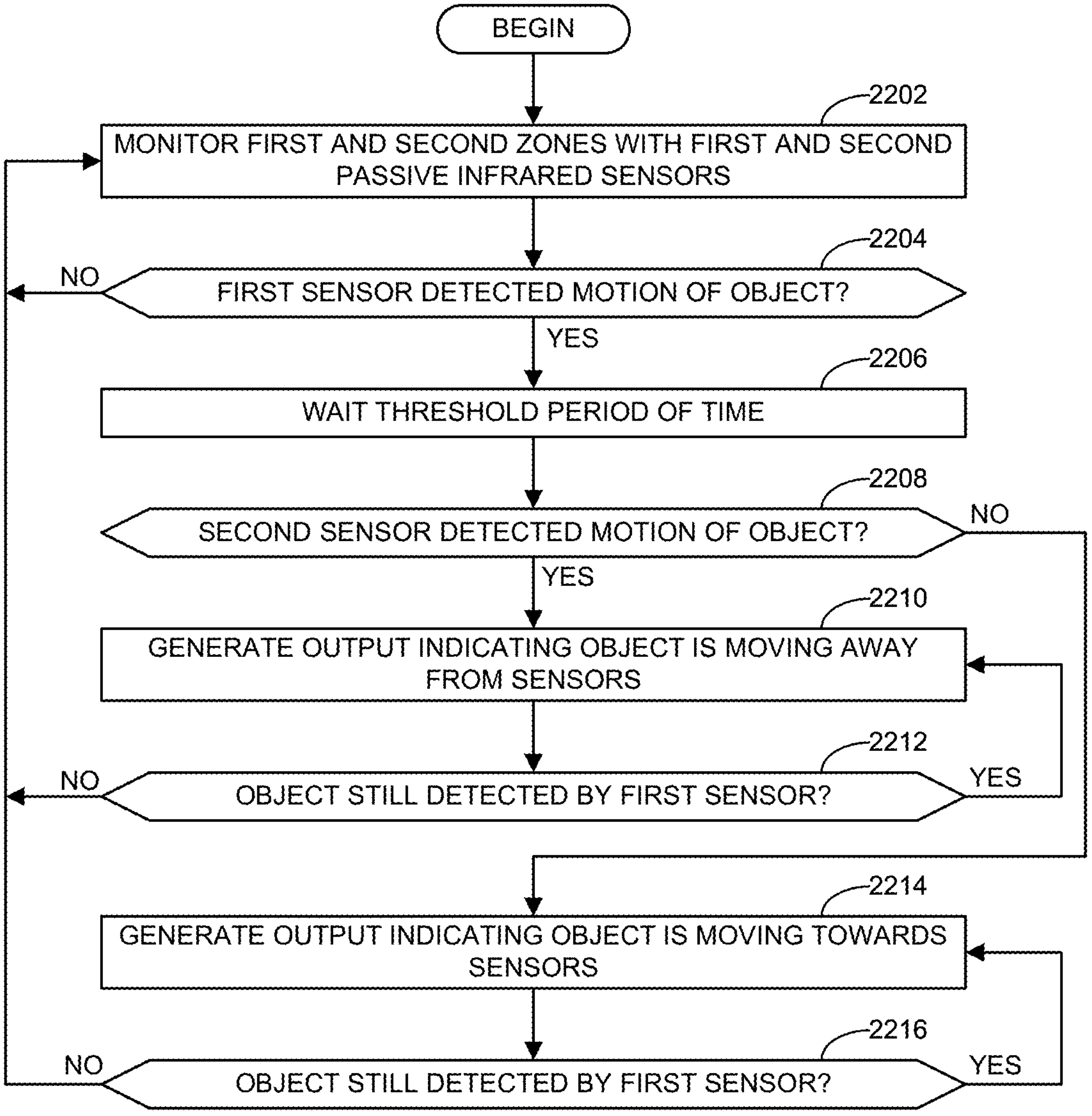

FIG. 22 is a flowchart representative of an example program associated with the implementation of blocks 2104 and/or block 2106 of FIG. 21 to detect a moving object and determine the direction of movement of the object. More particularly, the program of FIG. 22 assumes that the motion sensor 1802 of the traffic alert device 112 of FIG. 18 includes two PIR sensors (e.g., the PIR sensors 1902, 1904 of FIG. 19). The program of FIG. 22 begins at block 2202 where the first and second PIR sensors 1902, 1904 monitor first and second zones 1906, 1908. At block 2204, the example sensor feedback analyzer 1806 determines whether the first sensor 1902 has detected motion of an object. If not, control returns to block 2202. If the first sensor 1902 has detected motion of an object, control advances to block 2206 to wait a threshold period of time. In some examples, the threshold period of time is relatively short (e.g., 500 ms, 250 ms, 100 ms, 50 ms).

After the threshold period of time, control advances to block 2208 where the example sensor feedback analyzer 1806 determines whether the second sensor 1904 has detected motion of an object. If so, control advances to block 2210 where the example sensor feedback analyzer 1806 generates an output indicating the object is moving away from the sensors 1902, 1904. In some examples, this output may be used to make the determination that the object is not approaching at block 2106 of FIG. 21. Thereafter, at block 2212, the example sensor feedback analyzer 1806 determines whether the object is still detected by the first sensor 1902. If so, control returns to block 2210. Otherwise, control returns to block 2202.

Returning to block 2208, if the example sensor feedback analyzer 1806 determines that the second sensor 1904 has not detected motion of an object (after the threshold period of time following detection of the object by the first sensor 1902 as determined at block 2204), control advances to block 2214. At block 2214, the example sensor feedback analyzer 1806 generates an output indicating the object is moving towards the sensors 1902, 1904. In some examples, this output may be used to make the determination that the object is approaching at block 2106 of FIG. 21. Thereafter, at block 2216, the example sensor feedback analyzer 1806 determines whether the object is still detected by the first sensor 1902. If so, control returns to block 2214. Otherwise, control returns to block 2202 to repeat the process.

Figure 23:
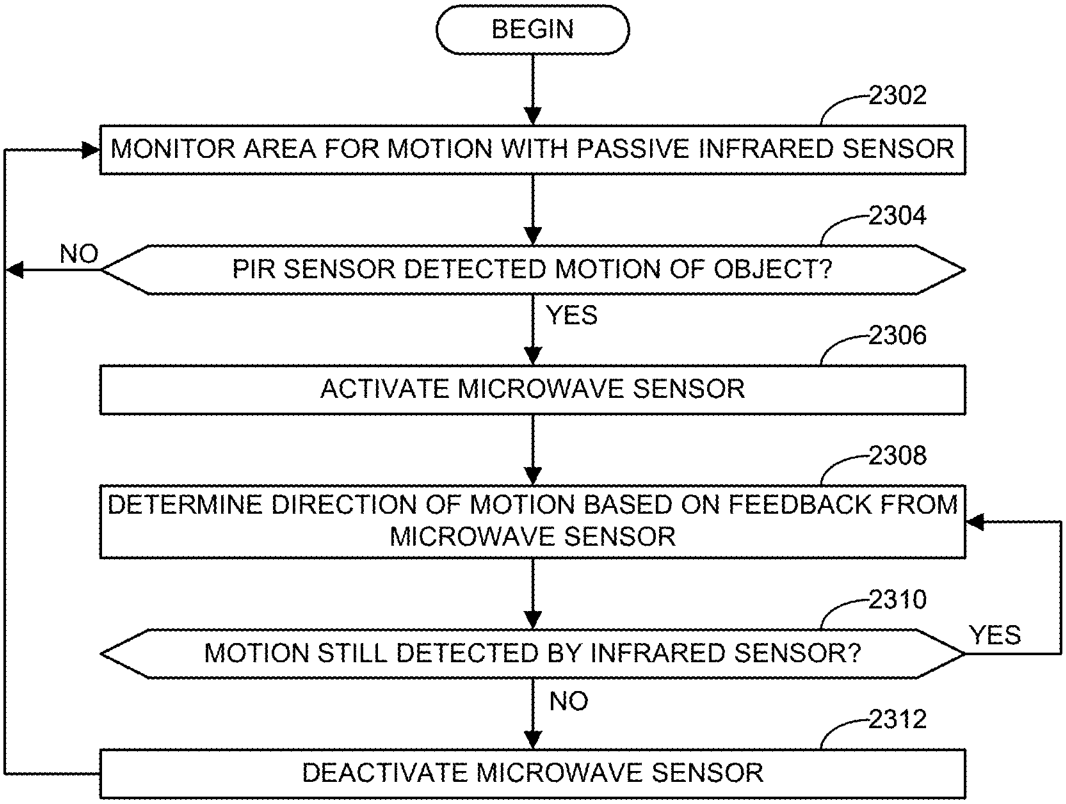

FIG. 23 is a flowchart representative of another example program associated with the implementation of blocks 2104 and/or block 2106 of FIG. 21 to detect a moving object and determine the direction of movement of the object. More particularly, the program of FIG. 23 assumes that the motion sensor 1802 of the traffic alert device 112 of FIG. 18 includes one PIR sensor (e.g., the first PIR sensor of FIG. 19) and a microwave sensor that can determine direction of motion based on time-of-flight analysis. The program of FIG. 23 begins at block 2302 where the first PIR sensor 1902 monitors an area for motion. At block 2304, the example sensor feedback analyzer 1806 determines whether the first PIR sensor 1902 has detected motion of an object. If not, control returns to block 2302. If the first sensor 1902 has detected motion of an object, control advances to block 2306 where the traffic alert device 112 activates the microwave sensor. In some examples, the microwave sensor may be activated from a powered off state. In other examples, the microwave sensor may be activated to a full power state from a low power sleep state. At block 2308, the example sensor feedback analyzer 1806 determines the direction of motion based on feedback from the microwave sensor. In some examples, this determination may be used to make the determination of whether the object is approaching at block 2106 of FIG. 21. At block 2310, the example sensor feedback analyzer 1806 determines whether motion is still detected by the PIR sensor 1902. If so, control returns to block 2308. Otherwise, control advances to block 2312 where the traffic alert device 112 deactivates the microwave sensor. In some examples, deactivation of the microwave sensor may include turning off the microwave sensor or placing the microwave sensor in a low powered sleep state. Thereafter, control returns to block 2302 to continue the process.

Figure 24:
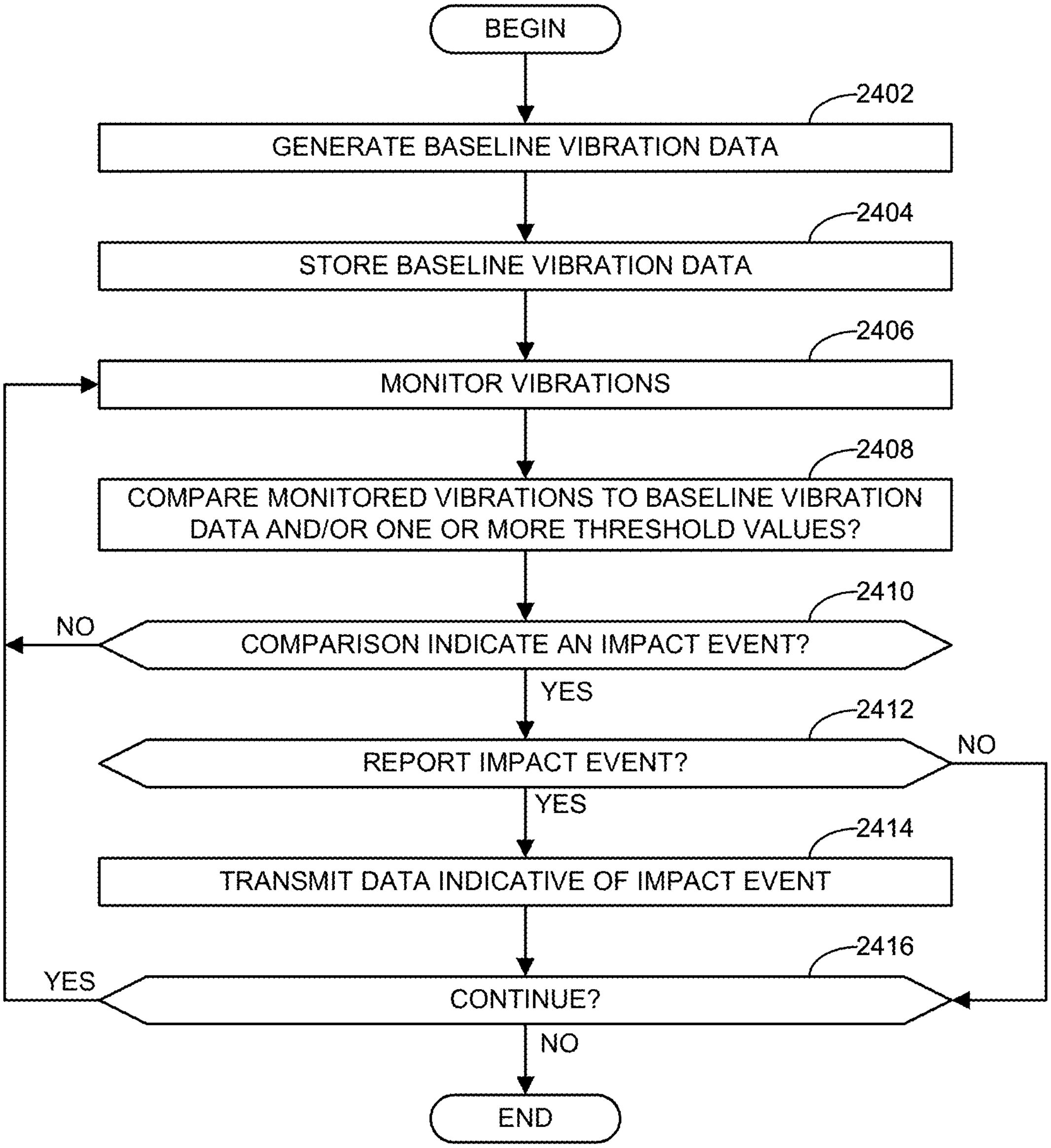

The program of FIG. 24 begins at block 2402 where the example sensor feedback analyzer 1806 generates baseline vibration data. In this example, the baseline vibration data is generated (i.e., measured) based on sensor feedback from the example accelerometer 1804 during normal operations. At block 2404, the example memory stores the baseline vibration data. At block 2406, the example accelerometer 1804 monitors vibrations. At block 2408, the example sensor feedback analyzer 1806 compares the monitored vibrations to the baseline vibration data and/or one or more threshold values. At block 2410, the example sensor feedback analyzer 1806 determines whether the comparison indicates an impact event. If not, control returns to block 2406. If the comparison does indicate an impact event, control advances to block 2412 where the example sensor feedback analyzer 1806 determines whether to report the impact event. If so, control advances to block 2414 where the example communication interface 1808 transmits data indicative of the impact event. In some examples, the data may indicate a severity of the impact based on how different the monitored vibrations are relative to the baseline vibration data and/or which of the one or more threshold values was satisfied (e.g., exceeded). In the illustrated example, the impact event is only reported if the sensor feedback analyzer 1806 determines there is an impact event. However, in some examples, the sensor feedback analyzer 1806 may additionally or alternatively report the vibration data collected by the accelerometer 1804 regardless of whether an analysis of the data indicates an impact event. In any event, after reporting the impact event (block 2414), control advances to block 2416. Returning to block 2412, if the impact event is not to be reported, control advances directly to block 2416. At block 2416, the traffic alert device 112 determines whether to continue the process. If so, control returns to block 2406. Otherwise, the example process of FIG. 24 ends.

Figure 25:
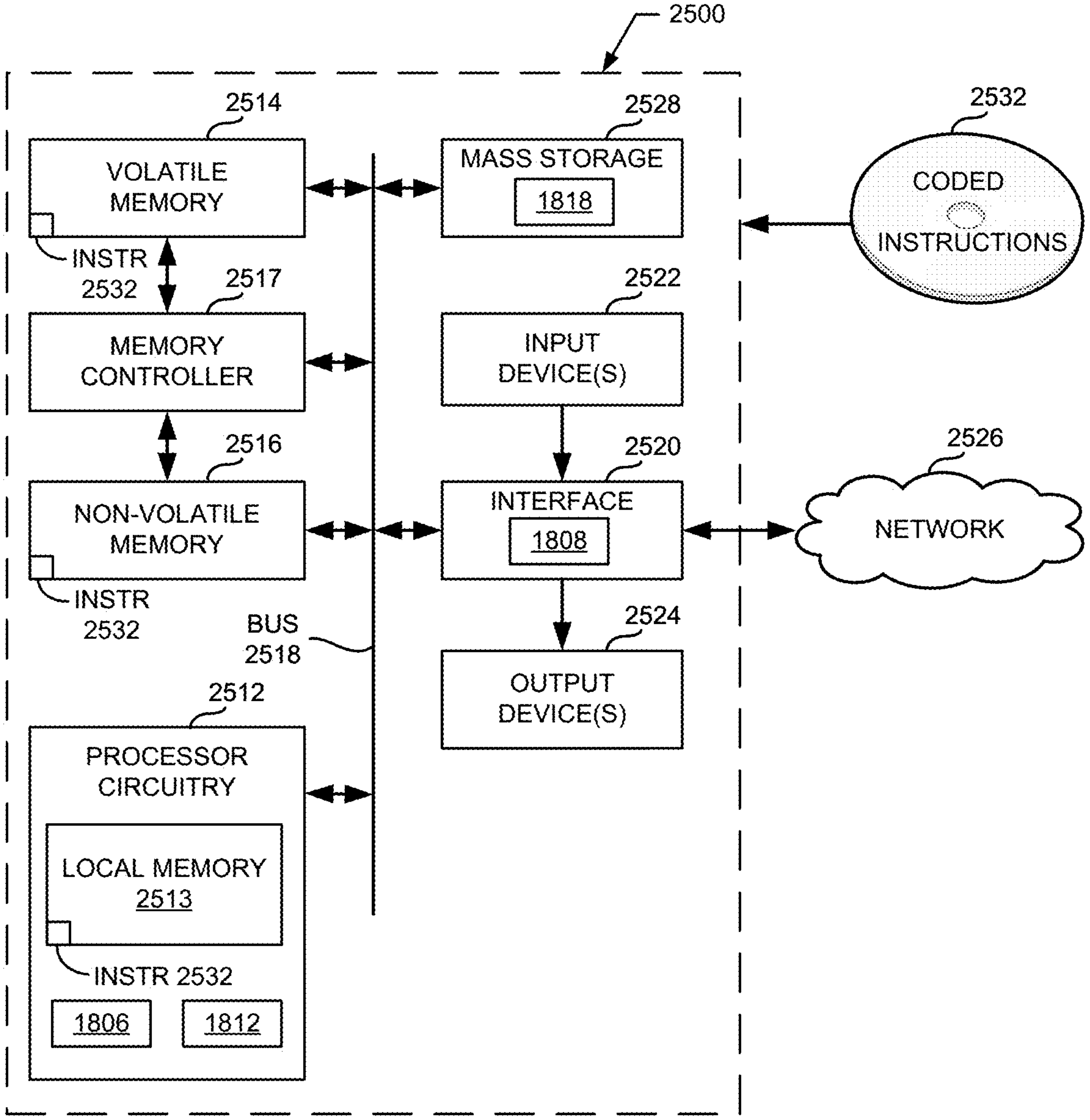
FIG. 25 is a block diagram of an example processing platform structured to execute the instructions of FIG. 21-24 to implement the example traffic alert device of FIG. 18.

FIG. 25 is a block diagram of an example processor platform 2500 structured to execute and/or instantiate the machine readable instructions and/or operations of FIGS. 21-24 to implement the traffic alert device 112 of FIG. 18. The processor platform 2500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 2500 of the illustrated example includes processor circuitry 2512. The processor circuitry 2512 of the illustrated example is hardware. For example, the processor circuitry 2512 can be implemented by one or more integrated circuits, logic circuits, microprocessors, CPUs, GPUs, DSPs, FPGAs, and/or microcontrollers from any desired family or manufacturer. The processor circuitry 2512 may be implemented by one or more semiconductor based (e.g., silicon based) devices. In this example, the processor circuitry 2512 implements the example feedback analyzer 1806 and the example visual signal controller 1812.

The processor circuitry 2512 of the illustrated example includes a local memory 2513 (e.g., a cache, registers, etc.). The processor 2512 of the illustrated example is in communication with a main memory including a volatile memory 2514 and a non-volatile memory 2516 by a bus 2518. The volatile memory 2514 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 2516 may be implemented by flash memory and/or any other desired type of memory device. Access to the main memory 2514, 2516 is controlled by a memory controller 2517.

The processor platform 2500 of the illustrated example also includes interface circuitry 2520. The interface circuitry 2520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 2522 are connected to the interface circuitry 2520. The input device(s) 2522 permit(s) a user to enter data and/or commands into the processor circuitry 2512. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 2524 are also connected to the interface circuitry 2520 of the illustrated example. The output devices 2524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2520 of the illustrated example, thus, typically includes a graphics driver card, a graphics driver chip, and/or graphics processor circuitry such as a GPU.

The interface circuitry 2520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2500 of the illustrated example also includes one or more mass storage devices 2528 to store software and/or data. Examples of such mass storage devices 2528 include magnetic storage devices, optical storage devices, floppy disk drives, hard drive disks (HDDs), compact disks (CDs), Blu-ray disk drives, redundant array of independent disks (RAID) systems, solid state storage devices such as flash memory devices, and digital versatile disk (DVD) drives.

The machine executable instructions 2532, which may be implemented by the machine readable instructions of FIGS. 21-24 may be stored in the mass storage device 2528, in the volatile memory 2514, in the non-volatile memory 2516, and/or on a removable non-transitory computer readable storage medium such as a CD or DVD.

Figure 26:
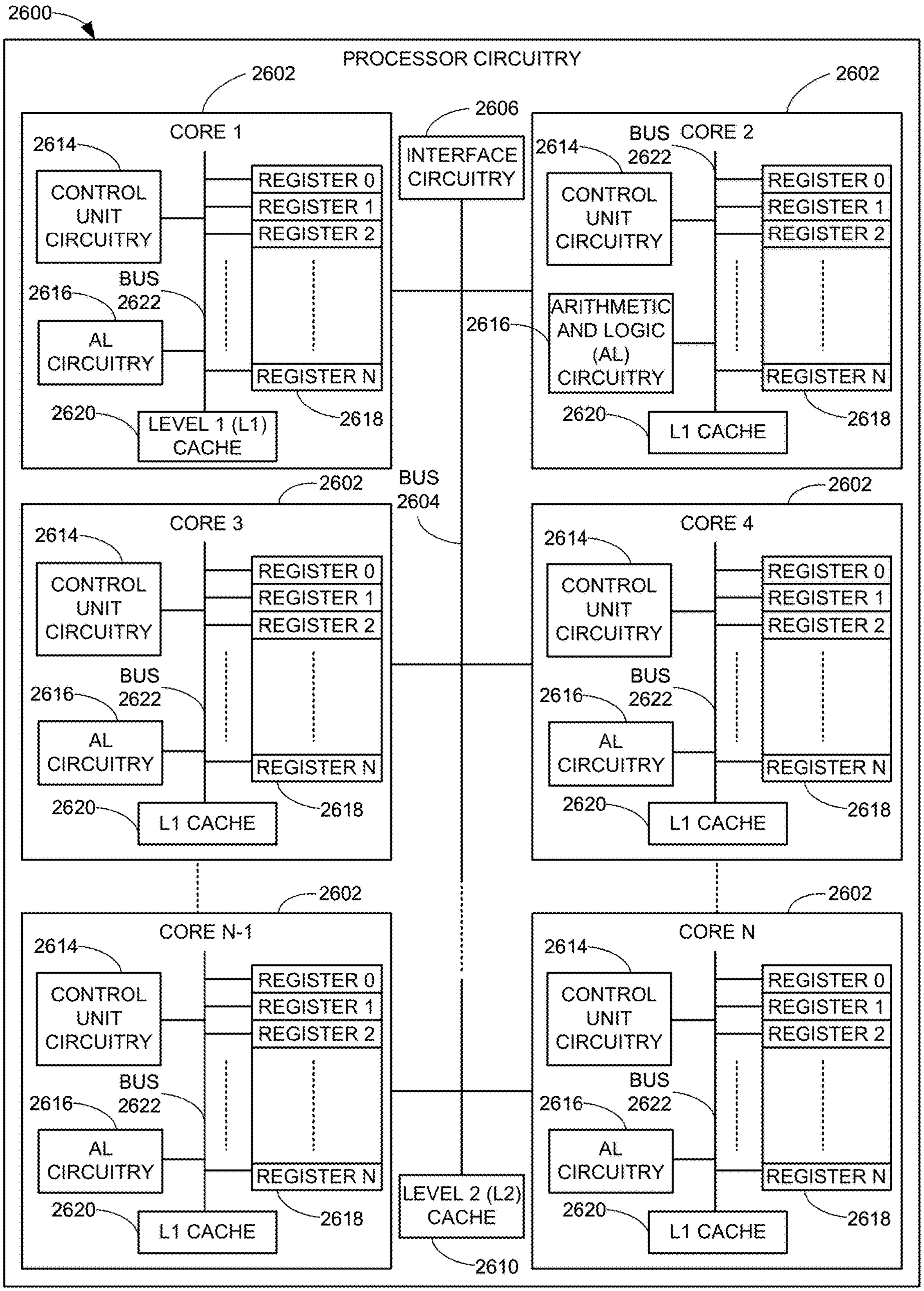
FIG. 26 is a block diagram of an example implementation of the processor circuitry of FIG. 25.

FIG. 26 is a block diagram of an example implementation of the processor circuitry 2512 of FIG. 25. In this example, the processor circuitry 2512 of FIG. 25 is implemented by a microprocessor 2600. For example, the microprocessor 2600 may implement multi-core hardware circuitry such as a CPU, a DSP, a GPU, an XPU, etc. Although it may include any number of example cores 2602 (e.g., 1 core), the microprocessor 2600 of this example is a multi-core semiconductor device including N cores. The cores 2602 of the microprocessor 2600 may operate independently or may cooperate to execute machine readable instructions. For example, machine code corresponding to a firmware program, an embedded software program, or a software program may be executed by one of the cores 2602 or may be executed by multiple ones of the cores 2602 at the same or different times. In some examples, the machine code corresponding to the firmware program, the embedded software program, or the software program is split into threads and executed in parallel by two or more of the cores 2602. The software program may correspond to a portion or all of the machine readable instructions and/or operations represented by the flowcharts of FIG. 21-24.

The cores 2602 may communicate by an example bus 2604. In some examples, the bus 2604 may implement a communication bus to effectuate communication associated with one(s) of the cores 2602. For example, the bus 2604 may implement at least one of an Inter-Integrated Circuit (I2C) bus, a Serial Peripheral Interface (SPI) bus, a PCI bus, or a PCIe bus. Additionally or alternatively, the bus 2604 may implement any other type of computing or electrical bus. The cores 2602 may obtain data, instructions, and/or signals from one or more external devices by example interface circuitry 2606. The cores 2602 may output data, instructions, and/or signals to the one or more external devices by the interface circuitry 2606. Although the cores 2602 of this example include example local memory 2620 (e.g., Level 1 (L1) cache that may be split into an L1 data cache and an L1 instruction cache), the microprocessor 2600 also includes example shared memory 2610 that may be shared by the cores (e.g., Level 2 (L2 cache)) for high-speed access to data and/or instructions. Data and/or instructions may be transferred (e.g., shared) by writing to and/or reading from the shared memory 2610. The local memory 2620 of each of the cores 2602 and the shared memory 2610 may be part of a hierarchy of storage devices including multiple levels of cache memory and the main memory (e.g., the main memory 2514, 2516 of FIG. 25). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2602 may be referred to as a CPU, DSP, GPU, etc., or any other type of hardware circuitry. Each core 2602 includes control unit circuitry 2614, arithmetic and logic (AL) circuitry (sometimes referred to as an ALU) 2616, a plurality of registers 2618, the L1 cache 2620, and an example bus 2622. Other structures may be present. For example, each core 2602 may include vector unit circuitry, single instruction multiple data (SIMD) unit circuitry, load/store unit (LSU) circuitry, branch/jump unit circuitry, floating-point unit (FPU) circuitry, etc. The control unit circuitry 2614 includes semiconductor-based circuits structured to control (e.g., coordinate) data movement within the corresponding core 2602. The AL circuitry 2616 includes semiconductor-based circuits structured to perform one or more mathematic and/or logic operations on the data within the corresponding core 2602. The AL circuitry 2616 of some examples performs integer based operations. In other examples, the AL circuitry 2616 also performs floating point operations. In yet other examples, the AL circuitry 2616 may include first AL circuitry that performs integer based operations and second AL circuitry that performs floating point operations. In some examples, the AL circuitry 2616 may be referred to as an Arithmetic Logic Unit (ALU). The registers 2618 are semiconductor-based structures to store data and/or instructions such as results of one or more of the operations performed by the AL circuitry 2616 of the corresponding core 2602. For example, the registers 2618 may include vector register(s), SIMD register(s), general purpose register(s), flag register(s), segment register(s), machine specific register(s), instruction pointer register(s), control register(s), debug register(s), memory management register(s), machine check register(s), etc. The registers 2618 may be arranged in a bank as shown in FIG. 26. Alternatively, the registers 2618 may be organized in any other arrangement, format, or structure including distributed throughout the core 2602 to shorten access time. The bus 2604 may implement at least one of an I2C bus, a SPI bus, a PCI bus, or a PCIe bus Each core 2602 and/or, more generally, the microprocessor 2600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)), and/or other circuitry may be present. The microprocessor 2600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry, and/or in one or more separate packages from the processor circuitry.

Figure 27:
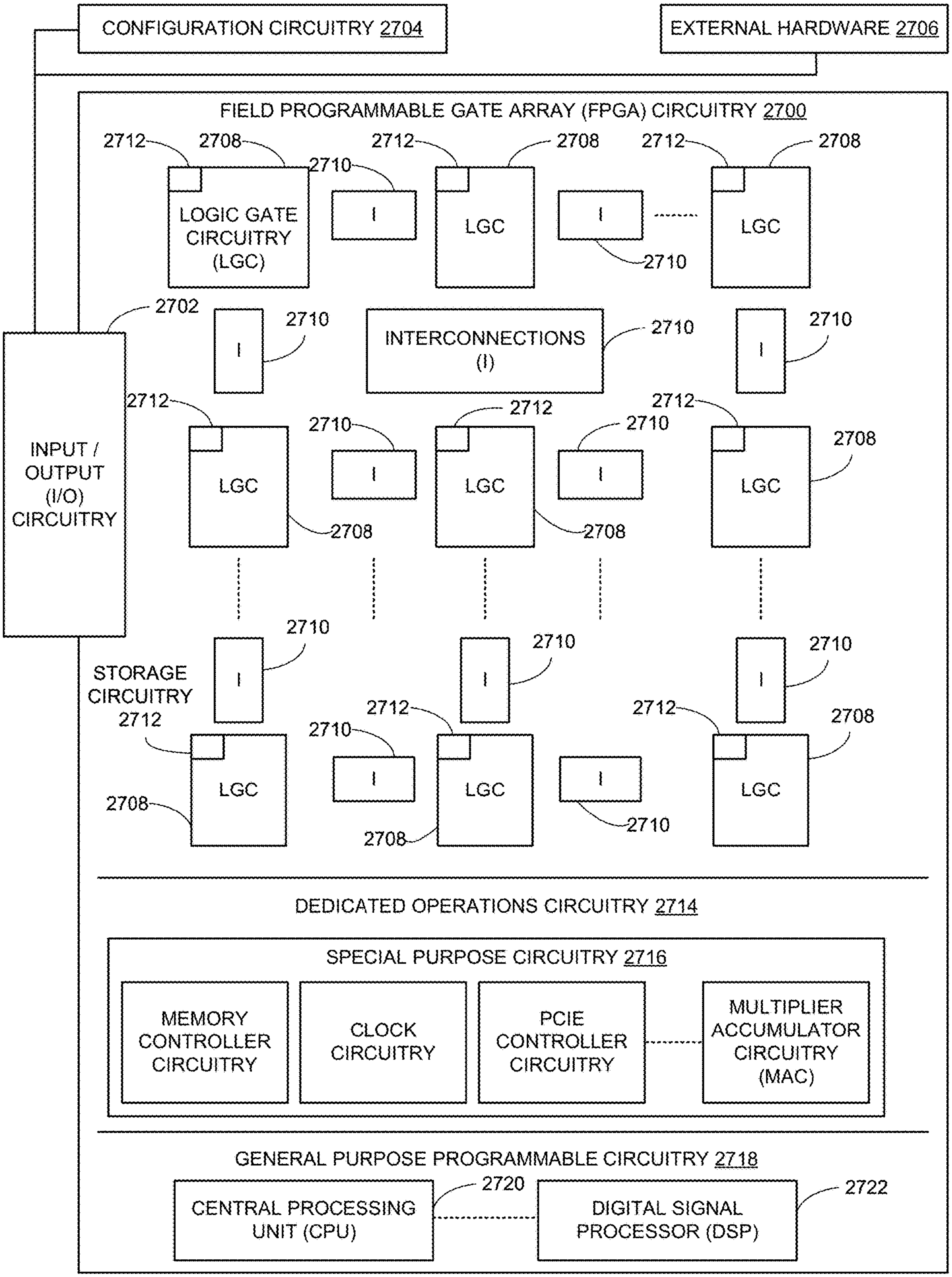
FIG. 27 is a block diagram of another example implementation of the processor circuitry of FIG. 25.

FIG. 27 is a block diagram of another example implementation of the processor circuitry 2512 of FIG. 25. In this example, the processor circuitry 2512 is implemented by FPGA circuitry 2700. The FPGA circuitry 2700 can be used, for example, to perform operations that could otherwise be performed by the example microprocessor 2600 of FIG. 26 executing corresponding machine readable instructions. However, once configured, the FPGA circuitry 2700 instantiates the machine readable instructions in hardware and, thus, can often execute the operations faster than they could be performed by a general purpose microprocessor executing the corresponding software.

More specifically, in contrast to the microprocessor 2600 of FIG. 26 described above (which is a general purpose device that may be programmed to execute some or all of the machine readable instructions represented by the flowchart of FIGS. 21-24 but whose interconnections and logic circuitry are fixed once fabricated), the FPGA circuitry 2700 of the example of FIG. 27 includes interconnections and logic circuitry that may be configured and/or interconnected in different ways after fabrication to instantiate, for example, some or all of the machine readable instructions represented by the flowchart of FIGS. 21-24. In particular, the FPGA 2700 may be thought of as an array of logic gates, interconnections, and switches. The switches can be programmed to change how the logic gates are interconnected by the interconnections, effectively forming one or more dedicated logic circuits (unless and until the FPGA circuitry 2700 is reprogrammed). The configured logic circuits enable the logic gates to cooperate in different ways to perform different operations on data received by input circuitry. Those operations may correspond to some or all of the software represented by the flowchart of FIGS. 21-24. As such, the FPGA circuitry 2700 may be structured to effectively instantiate some or all of the machine readable instructions of the flowchart of FIGS. 21-24 as dedicated logic circuits to perform the operations corresponding to those software instructions in a dedicated manner analogous to an ASIC. Therefore, the FPGA circuitry 2700 may perform the operations corresponding to the some or all of the machine readable instructions of FIGS. 21-24 faster than the general purpose microprocessor can execute the same.

In the example of FIG. 27, the FPGA circuitry 2700 is structured to be programmed (and/or reprogrammed one or more times) by an end user by a hardware description language (HDL) such as Verilog. The FPGA circuitry 2700 of FIG. 27, includes example input/output (I/O) circuitry 2702 to obtain and/or output data to/from example configuration circuitry 2704 and/or external hardware (e.g., external hardware circuitry) 2706. For example, the configuration circuitry 2704 may implement interface circuitry that may obtain machine readable instructions to configure the FPGA circuitry 2700, or portion(s) thereof. In some such examples, the configuration circuitry 2704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2706 may implement the microprocessor 2600 of FIG. 26. The FPGA circuitry 2700 also includes an array of example logic gate circuitry 2708, a plurality of example configurable interconnections 2710, and example storage circuitry 2712. The logic gate circuitry 2708 and interconnections 2710 are configurable to instantiate one or more operations that may correspond to at least some of the machine readable instructions of FIGS. 21-24 and/or other desired operations. The logic gate circuitry 2708 shown in FIG. 27 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2708 to enable configuration of the electrical structures and/or the logic gates to form circuits to perform desired operations. The logic gate circuitry 2708 may include other electrical structures such as look-up tables (LUTs), registers (e.g., flip-flops or latches), multiplexers, etc.

The interconnections 2710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2708 to program desired logic circuits.

The storage circuitry 2712 of the illustrated example is structured to store result(s) of the one or more of the operations performed by corresponding logic gates. The storage circuitry 2712 may be implemented by registers or the like. In the illustrated example, the storage circuitry 2712 is distributed amongst the logic gate circuitry 2708 to facilitate access and increase execution speed.

The example FPGA circuitry 2700 of FIG. 27 also includes example Dedicated Operations Circuitry 2714. In this example, the Dedicated Operations Circuitry 2714 includes special purpose circuitry 2716 that may be invoked to implement commonly used functions to avoid the need to program those functions in the field. Examples of such special purpose circuitry 2716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2700 may also include example general purpose programmable circuitry 2718 such as an example CPU 2720 and/or an example DSP 2722. Other general purpose programmable circuitry 2718 may additionally or alternatively be present such as a GPU, an XPU, etc., that can be programmed to perform other operations.

Although FIGS. 26 and 27 illustrate two example implementations of the processor circuitry 2512 of FIG. 25, many other approaches are contemplated. For example, as mentioned above, modern FPGA circuitry may include an on-board CPU, such as one or more of the example CPU 2720 of FIG. 27. Therefore, the processor circuitry 2512 of FIG. 25 may additionally be implemented by combining the example microprocessor 2600 of FIG. 26 and the example FPGA circuitry 2700 of FIG. 27. In some such hybrid examples, a first portion of the machine readable instructions represented by the flowchart of FIGS. 21-24 may be executed by one or more of the cores 2602 of FIG. 26 and a second portion of the machine readable instructions represented by the flowchart of FIGS. 21-24 may be executed by the FPGA circuitry 2700 of FIG. 27.

In some examples, the processor circuitry 2512 of FIG. 25 may be in one or more packages. For example, the processor circuitry 2600 of FIG. 26 and/or the FPGA circuitry 2700 of FIG. 26 may be in one or more packages. In some examples, an XPU may be implemented by the processor circuitry 2512 of FIG. 25, which may be in one or more packages. For example, the XPU may include a CPU in one package, a DSP in another package, a GPU in yet another package, and an FPGA in still yet another package.

From the foregoing, it will be appreciated that example methods, apparatus, and articles of manufacture have been disclosed that enable low power traffic alert devices to be located at the corner of intersections of aisles (or other areas associated with obstructed visibility) within a material handling facility to detect traffic and alert individuals in cross-aisles (or other obstructed areas) to the detected traffic. More particularly, examples disclosed herein are capable of detecting the direction of traffic such that visual alert signals are only generated when traffic is approaching the intersection (thereby giving rise to a potential collision) whereas alert signals are suppressed when traffic is traveling away from the intersection (and there is no risk of a collision). In some examples, the traffic is detected in a prioritized (e.g., primary) aisle/path and the visual alert signals are directed toward non-prioritized (e.g., secondary) aisles/paths. Further, in some examples, the traffic alert devices include accelerometers to detect vibrations passing through a rack onto which the traffic alert devices are mounted. Monitoring such vibrations can enable the detection of rack impact events that may not otherwise be reported. In some examples, the vibration data collected from multiple accelerometers in different traffic alert devices positioned at different locations on a rack may be combined to determine the location of impact more precisely.

Further examples and combinations thereof include the following:

Example 1 includes a traffic alert device comprising a housing having a first surface to face in a first direction toward a first area, a directional motion sensor carried by the housing, the sensor to monitor motion in a second area different than the first area, the second area in a second direction angled relative to the first direction, and a light emitter carried by the housing, the light emitter positioned to emit light that emanates from the first surface, the light emitter to generate a visual signal in response to the sensor detecting an object in the second area approaching the sensor.

Example 2 includes the traffic alert device of example 1, wherein the light emitter does not generate the signal when the object in the second area is moving away from the sensor.

Example 3 includes the traffic alert device of any one of examples 1 or 2, wherein the signal is a first signal, the light emitter to generate a second signal, different than the first signal, in response to the sensor detecting the object in the second area moving away from the sensor.

Example 4 includes the traffic alert device of any one of examples 1-3, wherein the signal is to indicate a direction of movement of the object.

Example 5 includes the traffic alert device of example 4, wherein the light emitter includes a plurality of light emitting diodes (LEDs) arranged in a shape indicative of the direction of movement.

Example 6 includes the traffic alert device of any one of examples 1-3, wherein the signal is to indicate a speed or size of the object.

Example 7 includes the traffic alert device of any one of examples 1-6, wherein the housing is configured to mount to a structure extending along a first aisle, the housing to be mounted adjacent a corner of the structure, the corner associated with an intersection between the first aisle and a second aisle, the second aisle to extend in a direction transverse to the first aisle, the first area corresponding to a portion of the first aisle, the second area corresponding to a portion of the second aisle around the corner of the structure relative to the first aisle.

Example 8 includes the traffic alert device of example 7, wherein the housing includes a mounting surface and a stepped surface, the stepped surface extending between the mounting surface and the first surface, both the mounting surface and the stepped surface to engage the structure when the housing is mounted to the structure.

Example 9 includes the traffic alert device of any one of examples 7 or 8, further including a magnet carried by the housing, the housing to be mounted to the structure using the magnet.

Example 10 includes the traffic alert device of example 9, further including an elongate flexible member to attach to both the housing and the structure, the elongate flexible member to prevent the housing from falling to a ground when knocked off of the structure.

Example 11 includes the traffic alert device of example 10, wherein the elongate flexible member includes a spring and/or is elastic.

Example 12 includes the traffic alert device of example 10, wherein the elongate flexible member is to define a loop between first and second ends of the elongate flexible member attached to the housing, the loop to wrap around a portion of the structure.

Example 13 includes the traffic alert device of any one of examples 7-12, wherein the first surface is to extend away from the structure in a direction transverse to the first aisle when the housing is mounted to the structure.

Example 14 includes the traffic alert device of any one of examples 1-13, further including an accelerometer to detect an impact with the structure.

Example 15 includes the traffic alert device of any one of examples 1-14, wherein the first surface of the housing is made of a semi-transparent material, the light emitter to be positioned underneath the first surface.

Example 16 includes the traffic alert device of example 15, wherein the housing includes a second surface to face in a second direction opposite the first direction, the second surface of the housing made of the semi-transparent material, the signal generated by the light emitter to be visible through both the first surface and the second surface.

Example 17 includes the traffic alert device of any one of examples 1-16, wherein the sensor is a first sensor, the traffic alert device further including a second directional motion sensor, the second sensor to monitor motion in a third area different than the first and second areas, the second and third areas to be on opposites sides of a line extending in the first direction.

Example 18 includes the traffic alert device of any one of examples 1-17, further including an input power connector to receive power for the traffic alert device over a low voltage power cord, and an output power connector to provide power to a different traffic alert device.

Example 19 includes the traffic alert device of any one of examples 1-18, wherein the sensor includes a first passive infrared (PIR) sensor and a second PIR sensor with a detection area generally overlapping that of the first PIR sensor, the first PIR sensor having a longer range than the second PIR sensor.

Example 20 includes the traffic alert device of example 19, wherein a direction of movement of the object is determined based on a difference in time between the first and second PIR sensors detecting the object.

Example 21 includes the traffic alert device of any one of examples 1-18, wherein the sensor includes a passive infrared (PIR) sensor and a microwave sensor, the microwave sensor to switch from a first power state to a second power state in response to the PIR sensor detecting movement of the object.

Example 22 includes a traffic alert device comprising a housing including a main portion and a signaling portion, the main portion including a mounting surface to be adjacent a support structure for the housing, the signaling portion including a first protruding surface and a second protruding surface opposite the first protruding surface, the first and second protruding surfaces to protrude away from the support structure, a light emitter carried by the housing between the first and second protruding surfaces of the signaling portion, the light emitter to emit light in a first direction away from the first protruding surface and to emit light in a second direction away from the second protruding surface, the second direction opposite the first direction, and a sensor carried by the housing, the sensor to monitor motion in a third direction different than the first direction and different than the second direction, the light emitter to be activated in response to feedback from the sensor.

Example 23 includes the traffic alert device of example 23, wherein the sensor is within the main portion of the housing.

Example 24 includes the traffic alert device of any one of examples 22 or 23, wherein a first distance between the first and second protruding surfaces of the signaling portion is less than a second distance between the mounting surface and an opposing surface of the main portion, the mounting surface and the first protruding surface facing in a same direction, the opposing surface and the second protruding surface facing in a same direction.

Example 25 includes the traffic alert device of any one of examples 22-24, wherein the sensor is capable of distinguishing between motion moving toward the sensor and motion moving away from the sensor, the light emitter to be activated when the sensor detects motion moving toward the sensor, the light emitter not to be activated when the sensor detects motion moving away from the sensor.

Example 26 includes the traffic alert device of any one of examples 22-25, wherein the light emitter includes a plurality of lights arranged in a plurality of rows, different ones of the rows of the lights are to be activated at different times.

Example 27 includes the traffic alert device of example 26, wherein different ones of the rows of the lights are on opposite sides of a circuit board.

Example 28 includes the traffic alert device of any one of examples 26 or 27, wherein the light emitter includes an additional light distinct from and spaced apart from the plurality of lights, the additional light to be activated in response to feedback from an accelerometer indicative of an impact event.

Example 29 includes the traffic alert device of example 28, wherein the additional light is a different color than the plurality of lights.

Example 30 includes the traffic alert device of any one of examples 22-29, wherein the mounting surface is recessed relative to the first protruding surface with a stepped surface extending therebetween.

Example 31 includes a non-transitory computer readable medium comprising instructions that, when executed, cause a traffic alert device to at least monitor, via a sensor, a first area for motion, determine whether detected motion of an object in the first area is moving in a first direction toward the sensor or a second direction away from the sensor, and controlling activation of a light emitter based on the detected motion.

Example 32 includes the non-transitory computer readable medium of example 31, wherein, in response to a determination that the detected motion is moving in the first direction, activating a light emitter to emit light toward a second area different than the first area.

Example 33 includes the non-transitory computer readable medium of example 32, wherein, in response to a determination that the detected motion is moving in the second direction, the light emitter is not activated.

Example 34 includes the non-transitory computer readable medium of any one of examples 32 or 33, wherein light emitter includes a plurality of lights, and the instructions cause the traffic alert device to activate different ones of the lights at different times.

Example 35 includes the non-transitory computer readable medium of any one of examples 31-34, wherein the instructions cause the traffic alert device to adjust the activation of the light emitter based on a speed or size of the detected motion of the object.

Example 36 includes the non-transitory computer readable medium of any one of examples 31-35, wherein the instructions cause the traffic alert device to transmit data to a remote server, the data indicative of a motion sensing event in response to the detected motion.

Example 37 includes the non-transitory computer readable medium of any one of examples 31-36, wherein the sensor is a first sensor that is to monitor a first zone of the first area for motion, and the instructions cause the traffic alert device to monitor, via a second sensor, a second zone of the first area for motion, and determine whether the detected motion of the object in the first area is moving in the first direction or the second direction based on a time difference between when the first and second sensors detect the motion of the object.

Example 38 includes the non-transitory computer readable medium of any one of examples 31-37, wherein the sensor is a first sensor capable of detecting direction of motion, and the instructions cause the traffic alert device to monitor, via a second sensor, the first area for motion, the second sensor incapable of detecting direction of motion, and in response to the second sensor detecting motion, activate the first sensor.

Example 39 includes the non-transitory computer readable medium of any one of examples 31-38, wherein the instructions cause the traffic alert device to monitor, via an accelerometer, vibrations experienced by the traffic alert device, and determine an impact event based on the vibrations.

Example 40 includes the non-transitory computer readable medium of example 39, wherein the instructions cause the traffic alert device to transmit data to a remote server, the data indicative of the impact event.

Example 41 includes a method comprising monitoring, via a sensor of a traffic alert device, a first area for motion, determining whether detected motion of an object in the first area is moving in a first direction toward the sensor or a second direction away from the sensor, and controlling, via processor circuitry, activation of a light emitter based on the detected motion.

Example 42 includes the method of example 41, wherein, in response to a determination that the detected motion is moving in the first direction, activating a light emitter to emit light toward a second area different than the first area.

Example 43 includes the method of example 42, wherein, in response to a determination that the detected motion is moving in the second direction, the light emitter is not activated.

Example 44 includes the method of any one of examples 42 or 43, wherein light emitter includes a plurality of lights, the method further including activating different ones of the lights at different times.

Example 45 includes the method of any one of examples 41-44, further including adjusting the activation of the light emitter based on a speed or size of the detected motion of the object.

Example 46 includes the method of any one of examples 41-45, further including transmitting data to a remote server, the data indicative of a motion sensing event in response to the detected motion.

Example 47 includes the method of any one of examples 41-46, wherein the sensor is a first sensor that is to monitor a first zone of the first area for motion, the method further including monitoring, via a second sensor, a second zone of the first area for motion, and determining whether the detected motion of the object in the first area is moving in the first direction or the second direction based on a time difference between when the first and second sensors detect the motion of the object.

Example 48 includes the method of any one of examples 41-47, wherein the sensor is a first sensor capable of detecting direction of motion, the method further including monitoring, via a second sensor, the first area for motion, the second sensor incapable of detecting direction of motion, and in response to the second sensor detecting motion, activating the first sensor.

Example 49 includes the method of any one of examples 41-48, further including monitoring, via an accelerometer, vibrations experienced by the traffic alert device, and determining an impact event based on the vibrations.

Although certain example methods, apparatus and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A traffic alert device comprising:

a housing having a first surface to face in a first direction toward a first area;

a directional motion sensor carried by the housing, the sensor to monitor motion in a second area different than the first area, the second area in a second direction angled relative to the first direction; and a light emitter carried by the housing, the light emitter positioned to emit light that emanates from the first surface, the light emitter to generate a visual signal in response to the sensor detecting an object in the second area approaching the sensor, the signal to indicate a direction of movement of the object.

2. A traffic alert device comprising:

a housing having a first surface to face in a first direction toward a first area;

a directional motion sensor carried by the housing, the sensor to monitor motion in a second area different than the first area, the second area in a second direction angled relative to the first direction; and a light emitter carried by the housing, the light emitter positioned to emit light that emanates from the first surface, the light emitter to generate a visual signal in response to the sensor detecting an object in the second area approaching the sensor, wherein the light emitter does not generate the signal when the object in the second area is moving away from the sensor.

3. The traffic alert device of claim 1, wherein the light emitter includes a plurality of light emitting diodes (LEDs) arranged in a shape indicative of the direction of movement.

4. The traffic alert device of claim 1, wherein the housing is configured to mount to a structure extending along a first aisle, the housing to be mounted adjacent a corner of the structure, the corner associated with an intersection between the first aisle and a second aisle, the second aisle to extend in a direction transverse to the first aisle, the first area corresponding to a portion of the first aisle, the second area corresponding to a portion of the second aisle around the corner of the structure relative to the first aisle.

5. The traffic alert device of claim 4, wherein the housing includes a mounting surface and a stepped surface, the stepped surface extending between the mounting surface and the first surface, both the mounting surface and the stepped surface to engage the structure when the housing is mounted to the structure.

6. The traffic alert device of claim 4, further including a magnet carried by the housing, the housing to be mounted to the structure using the magnet.

7. The traffic alert device of claim 6, further including an elongate flexible member to attach to both the housing and the structure, the elongate flexible member to prevent the housing from falling to a ground when knocked off of the structure.

8. The traffic alert device of claim 7, wherein the elongate flexible member is to define a loop between first and second ends of the elongate flexible member attached to the housing, the loop to wrap around a portion of the structure.

9. The traffic alert device of claim 4, wherein the first surface is to extend away from the structure in a direction transverse to the first aisle when the housing is mounted to the structure.

10. The traffic alert device of claim 1, wherein the first surface of the housing is made of a semi-transparent material, the light emitter to be positioned underneath the first surface.

11. The traffic alert device of claim 10, wherein the housing includes a second surface to face in a second direction opposite the first direction, the second surface of the housing made of the semi-transparent material, the signal generated by the light emitter to be visible through both the first surface and the second surface.

12. A traffic alert device comprising:

a housing having a first surface to face in a first direction toward a first area;

a first directional motion sensor carried by the housing, the first sensor to monitor motion in a second area different than the first area, the second area in a second direction angled relative to the first direction;

a second directional motion sensor, the second sensor to monitor motion in a third area different than the first and second areas, the second and third areas to be on opposites sides of a line extending in the first direction; and a light emitter carried by the housing, the light emitter positioned to emit light that emanates from the first surface, the light emitter to generate a visual signal in response to the first sensor detecting an object in the second area approaching the first sensor.

13. The traffic alert device of claim 1, wherein the first-sensor includes a passive infrared (PIR) sensor and a microwave sensor, the microwave sensor to switch from a first power state to a second power state in response to the PIR sensor detecting movement of the object.

14. A traffic alert device comprising:

a housing including a main portion and a protruding portion, the main portion including a mounting surface to be adjacent a support structure for the housing, the protruding portion including a first protruding surface and a second protruding surface opposite the first protruding surface, the first and second protruding surfaces to protrude away from the support structure;

a light emitter carried by the housing between the first and second protruding surfaces of the protruding portion, the light emitter to emit light in a first direction away from the first protruding surface and to emit light in a second direction away from the second protruding surface, the second direction opposite the first direction; and a sensor carried by the housing, the sensor to monitor motion in a third direction different than the first direction and different than the second direction, the light emitter to be activated in response to feedback from the sensor, the sensor capable of distinguishing between motion moving toward the sensor and motion moving away from the sensor, the light emitter to be activated when the sensor detects motion moving toward the sensor, the light emitter not to be activated when the sensor detects motion moving away from the sensor.

15. A traffic alert device comprising:

a housing including a main portion and a protruding portion, the main portion including a mounting surface to be adjacent a support structure for the housing, the protruding portion including a first protruding surface and a second protruding surface opposite the first protruding surface, the first and second protruding surfaces to protrude away from the support structure;

a light emitter carried by the housing between the first and second protruding surfaces of the protruding portion, the light emitter to emit light in a first direction away from the first protruding surface and to emit light in a second direction away from the second protruding surface, the second direction opposite the first direction; and a sensor carried by the housing, the sensor to monitor motion in a third direction different than the first direction and different than the second direction, the light emitter to be activated in response to feedback from the sensor, the light emitter including a plurality of lights arranged in a plurality of rows, different ones of the rows of the lights are to be activated at different times.

16. The traffic alert device of claim 15, wherein different ones of the rows of the lights are on opposite sides of a circuit board.

17. The traffic alert device of claim 14, wherein the mounting surface is recessed relative to the first protruding surface with a stepped surface extending therebetween.

* * * * *